US012769398B2

(12) United States Patent
Park et al.

(10) Patent No.: US 12,769,398 B2
(45) Date of Patent: Oct. 20, 2026

(54) FOLDABLE ELECTRONIC DEVICE AND CONTROL METHOD THEREOF

(71) Applicant: Samsung Electronics Co., Ltd., Suwon-si (KR)

(72) Inventors: Changi Park, Suwon-si (KR); Jeongho Kang, Suwon-si (KR); Namwoo Kim, Suwon-si (KR); Minho Kim, Suwon-si (KR); Jaeyoung Jun, Suwon-si (KR); Hyunchul Hong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 19/286,821

(22) Filed: Jul. 31, 2025

(65) Prior Publication Data

US 2025/0355497 A1 Nov. 20, 2025

Related U.S. Application Data

(63) Continuation of application No. PCT/KR2024/006353, filed on May 10, 2024.

(30) Foreign Application Priority Data

May 11, 2023 (KR) ........................ 10-2023-0061270
May 31, 2023 (KR) ........................ 10-2023-0069950

(51) Int. Cl.
*G06F 3/01* (2006.01)
*G06F 1/16* (2006.01)

(52) U.S. Cl.
CPC ............ *G06F 3/016* (2013.01); *G06F 1/1615* (2013.01); *G06F 1/1641* (2013.01);
(Continued)

(58) Field of Classification Search
CPC .... G06F 1/1652; G06F 1/1615; G06F 1/1641; G06F 1/1677; G06F 3/016
See application file for complete search history.

(56) References Cited

U.S. PATENT DOCUMENTS 8,368,658 B2 * 2/2013 Brisebois .............. G06F 3/0488 345/173
10,219,077 B2 * 2/2019 Choi ........................ H04R 3/12
(Continued)

FOREIGN PATENT DOCUMENTS

CN 209627426 U 11/2019
EP 4 044 569 A1 8/2022
(Continued)

OTHER PUBLICATIONS

International Search Report with English translation and Written Opinion dated Aug. 20, 2024; International Appln. No. PCT/KR2024/006353.

(Continued)

*Primary Examiner* — Patrick F Marinelli
(74) *Attorney, Agent, or Firm* — Jefferson IP Law, LLP

(57) ABSTRACT

An electronic device is provided. The electronic device includes at least two housings rotatably coupled to each other; a flexible display disposed on the at least two housings, a first vibration motor disposed in a first housing among the at least two housings, a second vibration motor disposed in a second housing among the at least two housings and configured to vibrate in a different direction from the first vibration motor, at least one first sensor; at least one second sensor, memory, including one or more storage media, storing instructions, and at least one processor communicatively coupled to the flexible display, the first vibration motor, the second vibration motor, the at least one first sensor, the at least one second sensor, and the memory, wherein the instructions, when executed by the at least one
(Continued)

processor individually or collectively, cause the electronic device to acquire at least one measurement value from the at least one first sensor and the at least one second sensor, identify a folding state of the electronic device according to rotation between the at least two housings, based on the at least one measurement value measured from the at least one first sensor, identify a grip state with respect to at least one of the at least two housings, based on the at least one measurement value measured from the at least one second sensor, and operate the first vibration motor or the second vibration motor, based on the identified folding state and the identified grip state.

15 Claims, 36 Drawing Sheets

(52) U.S. Cl.
CPC .......... *G06F 1/1652* (2013.01); *G06F 1/1677* (2013.01); *G06F 2203/04102* (2013.01)

(56) References Cited

U.S. PATENT DOCUMENTS

| | | | | |
|---|---|---|---|---|
| 11,907,024 | B2 * | 2/2024 | Kim | G06F 1/1616 |
| 12,182,330 | B1 * | 12/2024 | Wang | G06F 3/0346 |
| 12,535,981 | B2 * | 1/2026 | Jin | G06F 3/1423 |
| 2006/0197750 | A1 * | 9/2006 | Kerr | G06F 1/1647 345/173 |
| 2009/0195959 | A1 * | 8/2009 | Ladouceur | G06F 3/0445 73/862.68 |
| 2009/0280860 | A1 | 11/2009 | Dahlke | |
| 2010/0073304 | A1 | 3/2010 | Grant et al. | |
| 2010/0134423 | A1 * | 6/2010 | Brisebois | G06F 3/038 345/173 |
| 2011/0006888 | A1 | 1/2011 | Bae et al. | |
| 2011/0075835 | A1 | 3/2011 | Hill | |
| 2011/0157052 | A1 | 6/2011 | Lee et al. | |
| 2013/0076639 | A1 * | 3/2013 | Brisebois | G06F 3/03547 345/169 |
| 2016/0357298 | A1 * | 12/2016 | Kim | G06F 3/04883 |
| 2016/0378190 | A1 | 12/2016 | Park et al. | |
| 2018/0035208 | A1 * | 2/2018 | Choi | H04R 1/028 |
| 2020/0125144 | A1 * | 4/2020 | Chung | H04M 1/0216 |
| 2020/0264826 | A1 * | 8/2020 | Kwon | G06F 1/1616 |
| 2020/0293093 | A1 * | 9/2020 | Kim | G06F 1/1616 |
| 2021/0058503 | A1 | 2/2021 | Lee et al. | |
| 2021/0216141 | A1 | 7/2021 | Chen et al. | |
| 2021/0359582 | A1 | 11/2021 | Takata | |
| 2022/0291751 | A1 | 9/2022 | Kim et al. | |
| 2023/0048158 | A1 * | 2/2023 | Kim | G06F 3/016 |
| 2025/0355497 | A1 * | 11/2025 | Park | G06F 1/1615 |
| 2026/0044259 | A1 * | 2/2026 | Chu | G06F 1/1684 |
| 2026/0056581 | A1 * | 2/2026 | Woo | G06F 1/1647 |

FOREIGN PATENT DOCUMENTS

| | | | | |
|---|---|---|---|---|
| JP | H07-336941 | A | 12/1995 | |
| KR | 10-2004-0036970 | A | 5/2004 | |
| KR | 10-2011-0005587 | A | 1/2011 | |
| KR | 10-2011-0074333 | A | 6/2011 | |
| KR | 10-2016-0039175 | A | 4/2016 | |
| KR | 10-2016-0042469 | A | 4/2016 | |
| KR | 10-2017-0129057 | A | 11/2017 | |
| KR | 10-2019-0032648 | A | 3/2019 | |
| KR | 10-2020-0109737 | A | 9/2020 | |
| KR | 10-2021-0022302 | A | 3/2021 | |
| KR | 10-2021-0058573 | A | 5/2021 | |
| KR | 10-2021-0091024 | A | 7/2021 | |
| KR | 10-2414356 | B1 | 6/2022 | |
| KR | 10-2023-0023486 | A | 2/2023 | |
| WO | 2020/162226 | A1 | 8/2020 | |
| WO | WO-2021096280 | A1 * | 5/2021 | H04M 1/0243 |

OTHER PUBLICATIONS

Extended European Search Report dated Apr. 8, 2026; European Appln. No. 24803772.3-1218/4645031 PCT/KR2024006353.

* cited by examiner

FOLDABLE ELECTRONIC DEVICE AND CONTROL METHOD THEREOF

CROSS-REFERENCE TO RELATED APPLICATION(S)

This application is a continuation application, claiming priority under 35 U.S.C. § 365(c), of an International application No. PCT/KR2024/006353, filed on May 10, 2024, which is based on and claims the benefit of a Korean patent application number 10-2023-0061270, filed on May 11, 2023, in the Korean Intellectual Property Office, and of a Korean patent application number 10-2023-0069950, filed on May 31, 2023, in the Korean Intellectual Property Office, the disclosure of each of which is incorporated by reference herein in its entirety.

BACKGROUND

1. Field

The disclosure relates to a foldable electronic device including a flexible display and a control method thereof.

2. Description of Related Art

With the increasing demand for mobile communication and the higher integration of electronic devices, a wide range of technologies are being developed to improve the portability of electronic devices, such as mobile terminals, and to enhance user convenience in multimedia applications.

For example, in the case of a laptop computer, an automatic opening module utilizing shape memory alloys may be provided, allowing the housing with the display to be automatically opened, thereby enhancing user convenience.

In foldable electronic devices, where frequent folding and unfolding of the display occurs, similar efforts are underway to enhance user convenience by incorporating an automatic opening module utilizing shape memory alloys, in a manner similar to that of the laptop computer.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a foldable electronic device including a flexible display and a control method thereof.

Additional aspects will be set forth in part in the description which follows and, in part, will be apparent from the description, or may be learned by practice of the presented embodiments.

In accordance with an aspect of the disclosure, an electronic device is provided. The electronic device includes at least two housings rotatably coupled to each other, a flexible display disposed on the at least two housings, a first vibration motor disposed in a first housing among the at least two housings, a second vibration motor disposed in a second housing among the at least two housings and configured to vibrate in a different direction from the first vibration motor, at least one first sensor, at least one second sensor, memory, including one or more storage media, storing instructions, and at least one processor communicatively coupled to the flexible display, the first vibration motor, the second vibration motor, the at least one first sensor, the at least one second sensor, and the memory, wherein the instructions, when executed by the at least one processor individually or collectively, cause the electronic device to acquire at least one measurement value from the at least one first sensor and the at least one second sensor, identify a folding state of the electronic device according to rotation between the at least two housings, based on the at least one measurement value measured from the at least one first sensor, identify a grip state with respect to at least one of the at least two housings, based on the at least one measurement value measured from the at least one second sensor, and operate the first vibration motor or the second vibration motor, based on the identified folding state and the identified grip state.

In accordance with another aspect of the disclosure, a method performed by an electronic device, the electronic device including at least two housings rotatably coupled to each other, a flexible display disposed on the at least two housings, a first vibration motor disposed in a first housing among the at least two housings, a second vibration motor disposed in a second housing among the at least two housings and configured to vibrate in a different direction from the first vibration motor, at least one first sensor, and at least one second sensor, is provided. The method includes acquiring, by the electronic device, at least one measurement value from the at least one first sensor and the at least one second sensor; identifying, by the electronic device, a folding state of the electronic device according to rotation between the at least two housings, based on the at least one measurement value; identifying, by the electronic device, a grip state with respect to at least one of the at least two housings, based on the at least one measurement value; and operating, by the electronic device, at least one of the first vibration motor or the second vibration motor, based on the identified folding state and the identified grip state.

In accordance with another aspect of the disclosure, one or more non-transitory computer-readable storage media storing one or more computer programs including computer-executable instructions that, when executed by at least one processor of an electronic device individually or collectively, the electronic device including at least two housings rotatably coupled to each other, a flexible display disposed on the at least two housings, a first vibration motor disposed in a first housing among the at least two housings, a second vibration motor disposed in a second housing among the at least two housings and configured to vibrate in a different direction from the first vibration motor, at least one first sensor, and at least one second sensor, cause the electronic device to perform operations, are provided. The operations include acquiring at least one measurement value from the at least one first sensor and the at least one second sensor, identifying a folding state of the electronic device according to rotation between the at least two housings, based on the at least one measurement value, identifying a grip state with respect to at least one of the at least two housings, based on the at least one measurement value; and operating at least one of the first vibration motor or the second vibration motor, based on the identified folding state and the identified grip state.

In accordance with another aspect of the disclosure, an electronic device is provided. The electronic device includes at least two housings rotatably coupled to each other, a flexible display disposed on the at least two housings, a first vibration motor disposed in a first housing among the at least two housings, a second vibration motor disposed in a second housing among the at least two housings and configured to vibrate in a different direction from the first vibration motor, at least one sensor, memory, including one or more storage media, storing instructions, and at least one processor communicatively coupled to the flexible display, the first vibration motor, the second vibration motor, the at least one sensor, and the memory, wherein the instructions, when executed by the at least one processor individually or collectively, cause the electronic device to acquire at least one measurement value from the at least one sensor, identify a folding state of the electronic device according to rotation between the at least two housings, based on the at least one measurement value, and operate at least one of the first vibration motor or the second vibration motor, based on the identified folding state of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a wireless fidelity (Wi-Fi) chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
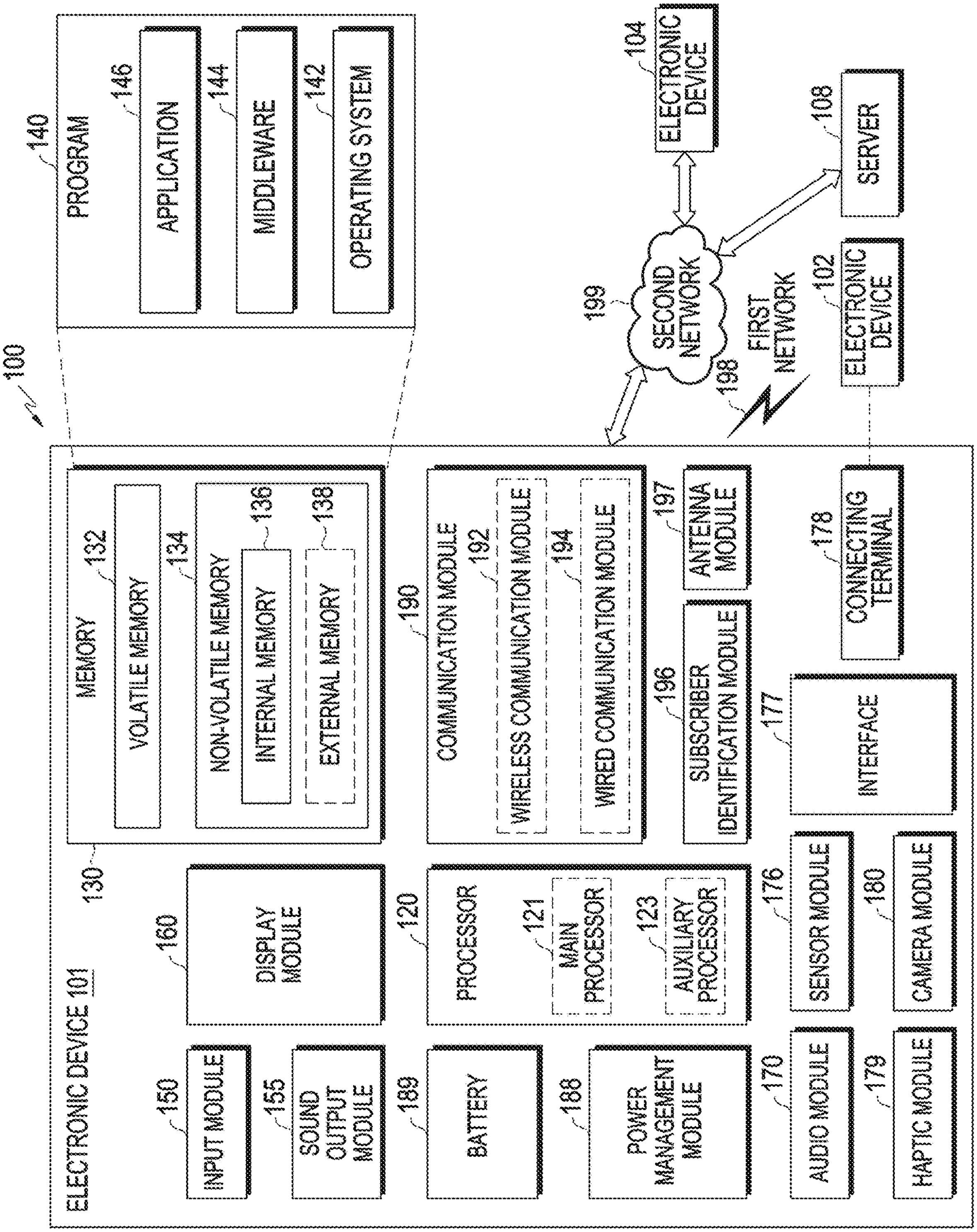
FIG. 1 is a block view illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
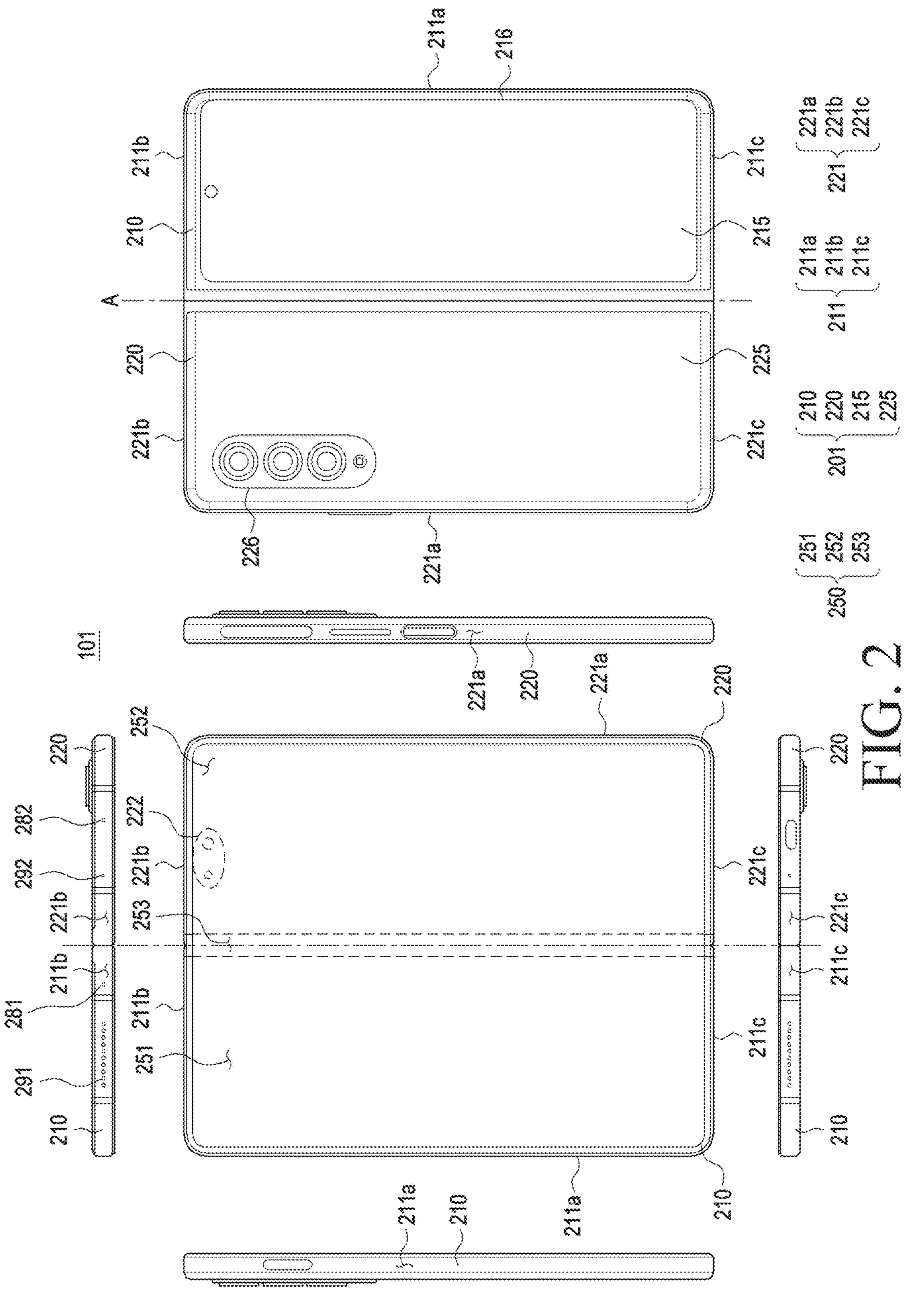
FIG. 2 is a view illustrating an unfolded status of an electronic device according to an embodiment of the disclosure.
Figure 3:
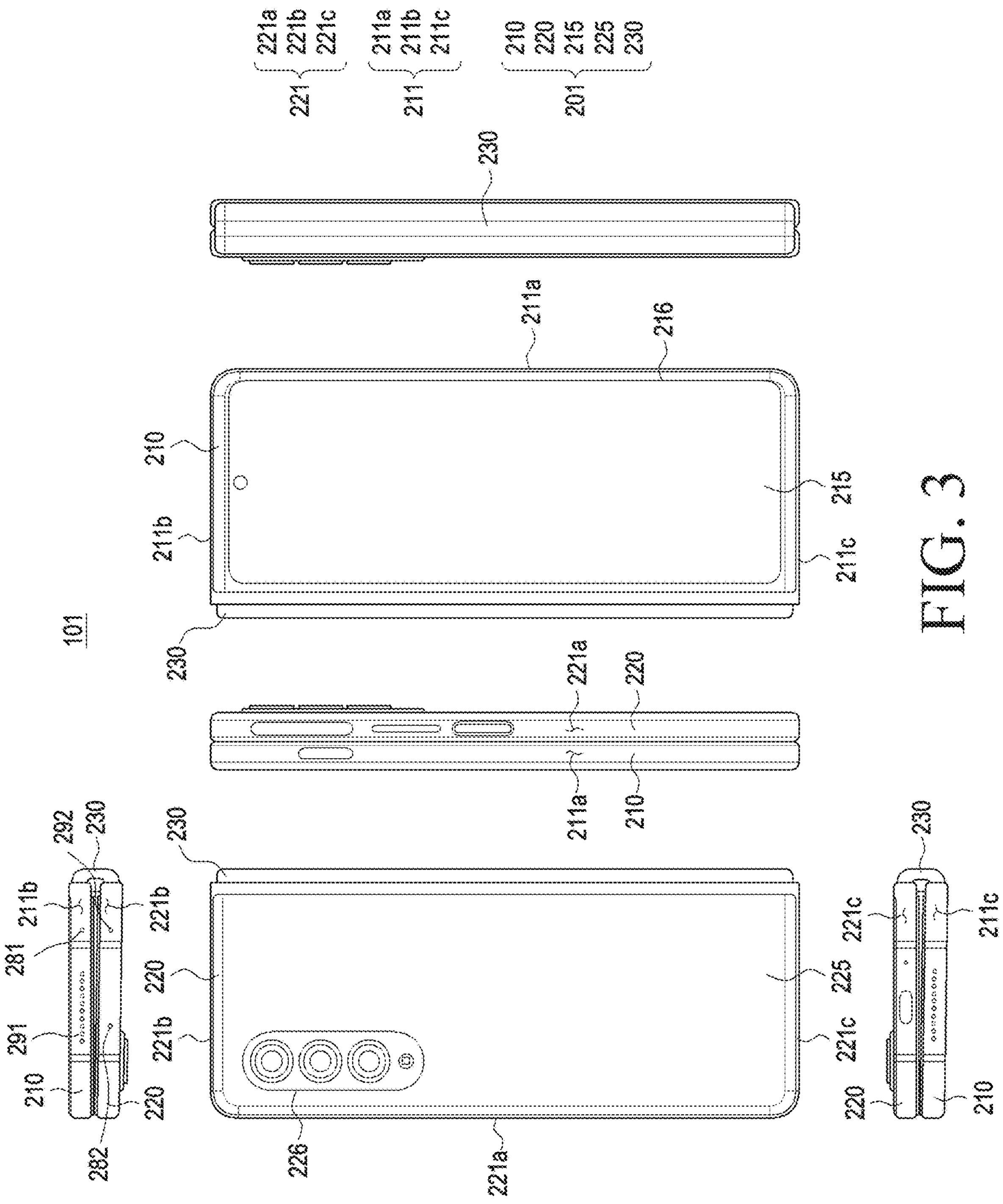
FIG. 3 is a view illustrating a folded status of an electronic device according to an embodiment of the disclosure.

FIG. 2 is a view illustrating an unfolded status of an electronic device 101 according to an embodiment of the disclosure. FIG. 3 is a view illustrating a folded status of an electronic device 101 according to an embodiment of the disclosure. The electronic device 101 may be an example of the electronic device 101 shown in FIG. 1 and may be a foldable (or bendable) electronic device.

Referring to FIGS. 2 and 3, in an embodiment, an electronic device 101 may include a foldable housing 201, and a flexible or foldable display 250 (hereinafter, for short, "display" 250) (e.g., the display module 160 in FIG. 1) disposed in a space configured by the foldable housing 201. According to embodiment, a surface on which the display 250 is disposed (or through which the display 250 is exposed to the outside of the electronic device 101) may be defined as a front surface of the electronic device 101. A surface opposite to the front surface may be defined as a rear surface of the electronic device 101. The surface surrounding a space between the front surface and the rear surface may be defined as a lateral surface of the electronic device 101.

According to various embodiments, the foldable housing 201 may include a first housing 210, a second housing 220 including a sensor area 222, a first rear cover 215, a second rear cover 225, and a hinge structure 230. Here, the hinge structure 230 may include a hinge cover configured to cover a foldable area of the foldable housing 201. The foldable housing 201 of the electronic device 101 is not limited to the shape and combination shown in FIGS. 2 and 3, and may be implemented by another shape or a combination and/or coupling of components. For example, in another embodiment, the first housing 210 and the first rear cover 215 may be integrally configured and the second housing 220 and the second rear cover 225 may be integrally configured.

According to an embodiment, the sensor area 212 may include an illuminance sensor and an image sensor (not shown) disposed thereon. The illuminance sensor may detect an light amount around the electronic device 101 and the image sensor may convert light incident through a camera lens into a digital signal. The illuminance sensor and the image sensor may be visually exposed to the flexible display 250. According to another embodiment, the illuminance sensor and the image sensor may not be visually exposed. For example, a camera may include an under-display camera. A pixel of an area of the flexible display 250 corresponding to a location of the UDC may be configured different from that of another area and the image sensor and/or the camera may not be visually exposed.

According to an embodiment, the first housing 210 may be connected to the hinge structure 230 and include a first surface facing a first direction and a second surface facing a second direction opposite to the first direction. The second housing 220 may be connected to the hinge structure 230 and include a third surface facing a third direction and a fourth surface facing a fourth direction opposite to the third direction. The second housing 220 may rotate around the hinge structure 230 with respect to the first housing 210. The electronic device 101 may vary into the folded status or the unfolded status.

According to an embodiment, the first housing 210 may include a first lateral surface 211*a* disposed parallel with a folding axis A of the hinge structure 230 between the first surface and the second surface, and the second housing 220 may include a second lateral surface 221*a* disposed parallel with the folding axis A of the hinge structure 230 between the third surface and the fourth surface. In addition, the first housing 210 may include a third lateral surface 211*b* which is perpendicular to the first lateral surface 211*a* and has one end connected to the first lateral surface 211*a* and the other end connected to the hinge structure 230, and a fourth lateral surface 211*c* which is perpendicular to the first lateral surface 211*a*, has one end connected to the first lateral surface 211*a* and the other end connected to the hinge structure 230, and is spaced apart from the third lateral surface 211*b* in a parallel direction. The second housing 220 may include a fifth lateral surface 221*b* which is perpendicular to the second lateral surface 221*a* and has one end connected to the second lateral surface 221*a* and the other end connected to the hinge structure 230, and a sixth lateral surface 221*c* which is perpendicular to the second lateral surface 221*a*, has one end connected to the second lateral surface 221*a* and the other end connected to the hinge structure 230, and is spaced apart from the fifth lateral surface 221*b* in a parallel direction. When the second housing 220 is folded with respect to the first housing 210 around the hinge structure 230, the first lateral surface 211*a* may be closer to the second lateral surface 221*a*, and when the second housing 220 is unfolded with respect to the first housing 210 around the hinge structure 230, the first lateral surface 211*a* may be farther away from the second lateral surface 221*a*.

According to an embodiment, in the electronic device 101, the first surface may face the third surface in a fully folded status and the third direction may be the same as the first direction in a fully unfolded status. In the fully unfolded status, the distance between the first lateral surface 211*a* and the second lateral surface 221*a* may be formed to be longest.

According to an embodiment, the first housing 210 and the second housing 220 may be arranged at opposite sides around the folding axis A and have generally symmetric shapes with respect to the folding axis A. As described below, an angle and distance between the first housing 210 and the second housing 220 may vary according to whether a status of the electronic device 101 is an unfolded status, a folded status, or partially unfolded (or partially folded) intermediate status.

According to an embodiment, as shown in FIG. 2, the first housing 210 and the second housing 220 may together configure a recess configured to receive the display 250. According to an embodiment, at least a portion of the first housing 210 and the second housing 220 may be configured by a metal or non-metal material having a selected strength for supporting the display 250. At least a portion formed of the metal material may provide a ground plane for the electronic device 101 and may be electrically connected to a ground line formed on a printed circuit board disposed in the foldable housing 201.

According to an embodiment, a protection member (not shown) may be disposed on an edge of the flexible display 250. The protection member may be configured integrally with the lateral surface of the foldable housing 201 or as a separate structure. The flexible display 250 may not be adhered to the lateral surface of the foldable housing 201 and/or the protection member. A gap may be configured between the flexible display 250 and the protection member. The protection member may be configured to cover a component inside the electronic device 101 from the outside or protect a component inside the electronic device 101 from an external impact. According to an embodiment, the protection member may be configured to cover a wire mounted on the flexible display 250 or protect the wire from an external impact.

According to an embodiment, the first rear cover 215 may be disposed on one side of the folding axis A on the rear surface of the electronic device 101, and have, for example, a substantially rectangular periphery which may be surrounded by the first housing 210. Similarly, the second rear cover 225 may be disposed on the other side of the folding axis A on the rear surface of the electronic device 101, and may have a periphery surrounded by the second housing 220.

According to an embodiment, the first rear cover 215 and the second rear cover 225 may have substantially symmetrical shapes to each other with reference to the folding axis A. However, the first rear cover 215 and the second rear cover 225 do not necessarily have symmetric shapes and in another embodiment, the electronic device 101 may include the first rear cover 215 and the second rear cover 225 having various shapes. In another embodiment, the first rear cover 215 and the first housing 210 may be integrally configured and the second rear cover 225 and the second housing 220 may be integrally configured.

According to an embodiment, the first rear cover 215, the second rear cover 225, the first housing 210, and the second housing 220 may define a space for receiving various components (e.g., a printed circuit board or a battery) of the electronic device 101 disposed therein. According to an embodiment, one or more components may be arranged on or visually exposed through the rear surface of the electronic device 101. By way of example, at least a portion of a sub-display may be visually exposed through a first rear area 216 of the first rear cover 215. For another example, one or more components or sensors may be visually exposed through a second rear area 226 of the second rear cover 225. In various embodiments, the sensor may include a proximity sensor and/or a rear camera.

According to an embodiment, a front camera disposed on the front surface of the electronic device 101 and a rear camera exposed through the second rear area 226 of the second rear cover 225 may include one or more lenses, an image sensor, and/or an image signal processor. The flash may include, for example, a light-emitting diode or a xenon lamp. In some embodiments, two or more lenses (an infrared camera, and wide-angle and telephoto lens) and image sensors may be arranged on one surface of the electronic device 101.

Referring to FIG. 3, the hinge cover (e.g., the hinge cover 232 in FIG. 4) included in the hinge structure 230 may be disposed between the first housing 210 and the second housing 220 and configured to cover an internal component (e.g., a hinge plate 231). According to an embodiment, the hinge structure 230 may be covered or exposed by a portion of the first housing 210 and the second housing 220 according to a status (a unfolded status, intermediate status, or folded status) of the electronic device 101.

According to an embodiment, as shown in FIG. 2, when the electronic device 101 is in the unfolded status (e.g., a fully unfolded status), the hinge structure 230 may be covered by the first housing 210 and the second housing 220 not to be exposed. For another example, as shown in FIG. 3, when the electronic device 101 is in the folded status (e.g., a fully folded status), the hinge structure 230 may be exposed to the outside between the first housing 210 and the second housing 220. For another example, in the case of the intermediate status in which the first housing 210 and the second housing 220 are folded with a certain angle, the hinge structure 230 may be partially exposed to the outside between the first housing 210 and the second housing 220. In this case, the exposed area may be smaller than that of the fully folded status. In an embodiment, the hinge structure 230 may include a curved surface.

According to an embodiment, the display 250 may be disposed in a space configured by the foldable housing 201. For example, the display 250 may be seated in a recess formed by the foldable housing 201 and exposed to the outside through the front surface of the electronic device 101. For example, the display 250 may occupy substantially most of the front surface of the electronic device 101. Accordingly, the front surface of the electronic device 101 may include the display 250 and a portion of the first housing 210 and a portion of the second housing 220 which are adjacent to the display 250. The rear surface of the electronic device 101 may include the first rear cover 215, a portion of the first housing 210 adjacent to the first rear cover 215, the second rear cover 225, and a portion of the second housing 220 adjacent to the second rear cover 225.

According to an embodiment, the display 250 may be referred to as a display having an area transformable to a flat surface or a curved surface. According to an embodiment, the display 250 may include a folding area 253, a first area 251 disposed at one side (for example, a left side of the folding area 253 shown in FIG. 2) with reference to the folding area 253, and a second area 252 disposed at the other side (for example, a right side of the folding area 253 shown in FIG. 2).

However, the division of areas in the display 250 of FIG. 2 is exemplary and the display 250 may be divided into multiple areas (for example, two or more than four) according to the structure or function thereof. For example, the area of the display 200 may be divided by the folding area 203 extending parallel with the folding axis A in the embodiment of FIG. 2, and in another embodiment, the area of the display 200 may be divided with reference to another folding axis (for example, the folding axis parallel with the width direction of the electronic device).

According to an embodiment of the disclosure, the display 250 may be combined to or disposed adjacent to a touch panel including a touch sensing circuit and a pressure sensor for measuring a strength (pressure) of a touch. For example, the display 250, as an example of a touch panel, may be coupled or disposed adjacent to a touch panel for detecting a stylus pen in an electromagnetic resonance (EMR) manner.

According to an embodiment, the first area 251 and the second area 252 may have overall symmetrical shapes with respect to the folding area 253.

Hereinafter, operations of the first housing 210 and the second housing 220 and each area of the display 250 will be described according to the status (e.g., the folded status, the unfolded status, or the intermediate status) of the electronic device 101.

According to an embodiment, in case that the electronic device 101 is in the unfolded status (e.g., FIG. 2), the first housing 210 and the second housing 220 may be arranged to have an angle of 180 degrees therebetween and face the same direction. A surface of the first area 251 and a surface of the second area 252 of the display 250 may have an angle of 180 degrees therebetween and face the same direction (e.g., the front direction of the electronic device). The folding area 253 may define the same plane with the first area 251 and the second area 252.

According to an embodiment, in case that the electronic device 101 is in the folded status (e.g., FIG. 3), the first housing 210 and the second housing 220 may be arranged to face each other. A surface of the first area 251 and a surface of the second area 252 of the display 250 may have a narrow angle (e.g., between 0 degrees and 10 degrees) therebetween and face to each other. At least a portion of the folding area 253 may be configured to have a curved surface having a certain curvature.

According to an embodiment, in case that the electronic device 101 is in the intermediate status, the first housing 210 and the second housing 220 may be arranged at a certain angle. The surface of the first area 251 and the surface of the second area 252 of the display 250 may have an angle therebetween larger than that of the folded status and smaller than that of the unfolded status. At least a portion of the folding area 253 may be configured to be a curved surface having a certain curvature, and in this case, the curvature may be smaller than that of the folded status.

Referring to FIGS. 2 and 3, a first vent hole 281, a second vent hole 282, a first electrical component hole 291, and a second electrical component hole 292 may be configured in the electronic device 101.

According to an embodiment, the first vent hole 281 and the first electrical component hole 291 may be disposed on an upper surface of the first housing 210. According to an embodiment, the first vent hole 281 may be disposed closer to the hinge structure 230 than the first electrical component hole 291.

According to an embodiment, the second vent hole 282 and the second electrical component hole 290 may be disposed on an upper surface of the second housing 220. According to an embodiment, the second electrical component hole 292 may be disposed closer to the hinge structure 230 than the second vent hole 282.

According to an embodiment, in a state in which the second housing 220 is folded with respect to the first housing 210, the second electrical component hole 292 disposed on the second housing 220 may be disposed in the same line with the first vent hole 281 disposed on the first housing 210 of the electronic device 101 in the folded status.

According to an embodiment, in a state in which the second housing 220 is folded with respect to the first housing 210, the second vent hole 282 disposed on the second housing 220 may be disposed in the same line with one of first electrical component holes 291 disposed on the first housing 210 of the electronic device 101 in the folded status.

As such, as the first electrical component hole 291 and the second vent hole 282, and the first vent hole 281 and the second electrical component hole 292 are arranged on the same line, the user may appreciate an aesthetic feeling from the arrangement of each configuration.

Figure 4:
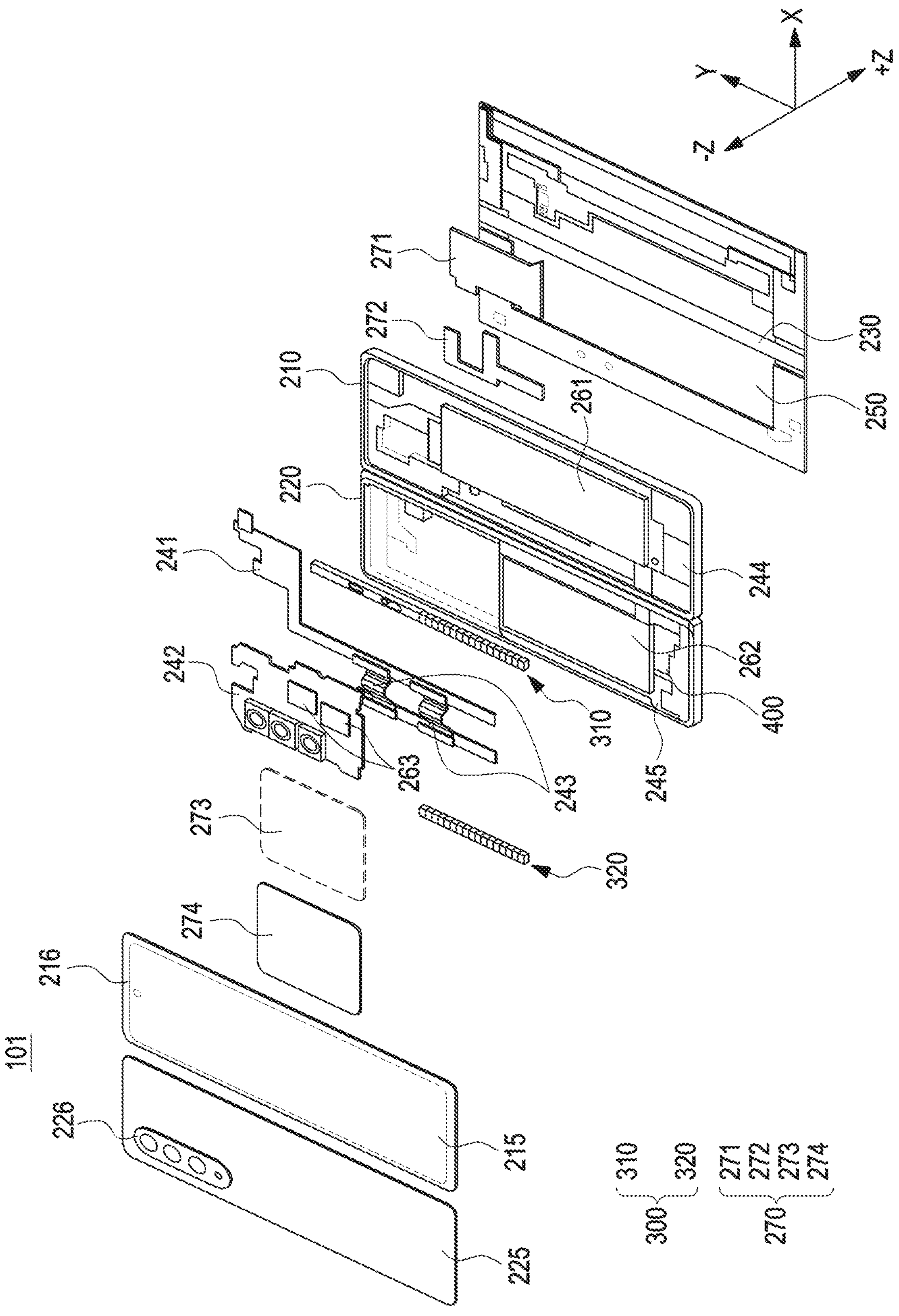
FIG. 4 is an exploded perspective view of an electronic device according to an embodiment of the disclosure.

According to an embodiment, the first vent hole 281 and the second vent hole 282 may be configured to communicate with a closed space defined by a first waterproof member to a fourth waterproof member (e.g., the first waterproof member to the fourth waterproof member 271 to 274 in FIG. 4)

arranged on the front surface and the rear surface of the foldable housing 201 described below. The first vent hole 281 and the second vent hole 282 may be configured to allow gases to pass through and may be configured to prevent liquids from entering.

According to an embodiment, the second electrical component hole 292 and the second vent hole 282 may be configured to change locations, and the first electrical component hole 291 and the first vent hole 281 may also be configured to change locations.

FIG. 4 is an exploded perspective view of an electronic device 101 according to an embodiment of the disclosure. FIG. 4 shows a spatial coordinate system defined by the X-axis, the Y-axis, and the Z-axis orthogonal to each other. The X-axis may represent a width direction of the electronic device, the Y-axis may represent a length direction of the electronic device, and the Z-axis may represent a height (or thickness) direction of the electronic device. In describing an embodiment of the disclosure, "a first direction (or a third direction)" may represent a direction parallel with the +Z-axis, and "a second direction (or a fourth direction)" may represent a direction parallel with the −Z-axis.

In describing components of the electronic device 101 shown in FIG. 4, the description of the components described above with reference to FIGS. 2 and 3 will be omitted within an overlapping range.

The electronic device 101 according to an embodiment of the disclosure may include various electronic components arranged inside and outside the first housing 210 and the second housing 220. The various electronic components may include, for example, a processor 263 (e.g., the processor 120 in FIG. 1), memory (e.g., the memory 130 in FIG. 1), an input module (e.g., the input module 150 in FIG. 1), an sound output module (e.g., the sound output module 155 in FIG. 1), a display 250 (e.g., the display module 160 in FIG. 1), an audio module (e.g., the audio module 170 in FIG. 1), a sensor (e.g., the sensor module 176 in FIG. 1), an interface (e.g., the interface 177 in FIG. 1), a connection terminal (e.g., the connection terminal 178 in FIG. 1), a haptic module (e.g., the haptic module 179 in FIG. 1), a camera module (e.g., the camera module 180 in FIG. 1), a power management module 188, a battery 261 or 262 (e.g., the battery 189 in FIG. 1), a communication module (e.g., the communication module 190 in FIG. 1), a subscriber identification module (e.g., the subscriber identification module 196 in FIG. 1), or an antenna module (e.g., the antenna module 197 in FIG. 1), and the electronic components may be appropriately sorted and arranged inside or outside the first housing 210 and the second housing 220. At least one (e.g., the connection terminal 178) of the components may be omitted from the electronic device 101 or one or more components may be added to the electronic device. Alternatively, portions of the components may be integrated into one component.

According to an embodiment, the electronic device 101 as a foldable electronic device may include multiple batteries in order to feed power required for driving to electronic components or store power. For example, the first housing 210 and the second housing 220 may include a first battery 261 and a second battery 262 disposed therein, respectively.

According to an embodiment, the electronic device 101 as a foldable electronic device may each include a support member (or a plate 244 or 245) configured to dispose components in the first housing 210 and the second housing 220, respectively. Various electronic components and/or printed circuit boards 241 and 242 may be disposed on the support member 244 or 245. For example, a first support member (or a first plate 244) and a first printed circuit board 241 may be disposed in the first housing 210, and a second support member (or a second plate 245) and a second circuit board 242 may be disposed in the second housing 220. By way of example, the second printed circuit board 242 may correspond to a main printed circuit board no which the processor 263 is disposed. In order to implement various functions and operations of the electronic device 101, signals of the processor 263 may be transferred to electronic components through various conductive lines and/or connectors arranged on the printed circuit boards 241 and 242.

According to an embodiment, the flexible display 250 may include a display panel (not shown). In an embodiment, the first support member 243 and the second support member 244 may be disposed between the display panel and the first printed circuit board 241 and the second printed circuit board 242. The hinge structure 230 may be disposed between the first support member 243 and the second support member 244.

According to an embodiment, the hinge structure 230 may include a hinge plate and a hinge cover. The hinge cover may cover the hinge plate disposed inside the hinge structure 230 and hinge modules coupled to the hinge plate.

According to an embodiment, the first housing 210 and the second housing 220 may be assembled to be coupled to opposite sides of the hinge structure 230 in a state in which the first support member 243 and the second support member 244 are coupled to the flexible display 250. For example, the first housing 210 may be slid to be coupled to one side of the hinge structure 230, and the second housing 220 may be slid to be coupled to the other side of the hinge structure 230.

According to an embodiment, various members may be arranged inside the electronic device 101. According to an embodiment, various members may be arranged between the first housing 210 and/or the first support member 243 and the flexible display 250. According to an embodiment, various members may be arranged between the second housing 220 and/or the second support member 244 and the flexible display 250. According to another embodiment, various members may be arranged between the first printed circuit board 241 and/or the first housing 210 and the first rear cover 215 and may be arranged between the second printed circuit board 242 and/or the second housing 220 and the second rear cover 225. According to an embodiment, various members may include a waterproof member 270, an adhesive member, a support member, and a buffering member.

According to an embodiment, FIG. 4 shows multiple waterproof members 270 as various members. For example, the electronic device may include a first waterproof member 271, a second waterproof member 272, a third waterproof member 273, and/or a fourth waterproof member 274.

According to an embodiment, the first waterproof member 271 may be disposed between the first support member 243 of the first housing 210 and the first area (e.g., the first area 251 in FIG. 1) of the flexible display 250. According to an embodiment, the first waterproof member 271 may be configured by a waterproof tape. The first waterproof member 271 may be adhered to the first housing and/or the first support member 243 and may be adhered to the flexible display 250. The first waterproof member 271 may be configured as a closed curve. The first waterproof member 271 configured as a closed curve may include at least one area. As the first waterproof member 271 includes a waterproof tape and includes at least one area configured as a closed curve, a liquid may be prevented from entering the closed curve from the outside of the closed curve of the first waterproof member 271.

According to an embodiment, the second waterproof member 272 may be disposed between the second support member 244 of the second housing 220 and the second area (e.g., the second area 252 in FIG. 2) of the flexible display 250. According to an embodiment, the second waterproof member 272 may be configured by a waterproof tape. The second waterproof member 272 may be adhered to the second housing 220 and/or the second support member 244 and may be adhered to the flexible display 250. The second waterproof member 272 may be configured as a closed curve. The second waterproof member 272 configured as a closed curve may include at least one area. As the second waterproof member 272 includes a waterproof tape and include at least one area configured as a closed curve, a liquid may be prevented from entering the closed curve from the outside of the closed curve of the second waterproof member 272.

According to an embodiment, the first waterproof member 271 and the second waterproof member 272 may be arranged not to be in contact with the hinge structure 230.

According to an embodiment, the third waterproof member 273 may be disposed between the first housing 210 and the first rear cover 215. According to an embodiment, the third waterproof member 273 may be configured by a bond and/or a waterproof tape. The third waterproof member 273 may be adhered to the first housing 210 and may be adhered to the first rear cover 215. The third waterproof member 273 may be configured as a closed curve. The third waterproof member 273 configured as a closed curve may include at least one area. As the third waterproof member 273 includes a waterproof tape and include at least one area configured as a closed curve, a liquid may be prevented from entering the closed curve from the outside of the closed curve of the third waterproof member 273.

According to an embodiment, the fourth waterproof member 274 may be disposed between the second housing 220 and the second rear cover 225. According to an embodiment, the fourth waterproof member 274 may be configured by a waterproof tape. The fourth waterproof member 274 may be adhered to the second housing 220 and may be adhered to at least a portion of the second rear cover 225. The fourth waterproof member 274 may be configured as a closed curve. The fourth waterproof member 274 configured as a closed curve may include at least one area. As the fourth waterproof member 274 includes a bond and include at least one area configured as a closed curve, a liquid may be prevented from entering the closed curve from the outside of the closed curve of the fourth waterproof member 274.

Accordingly, as the waterproof member 270 is disposed inside the electronic device 101, thereby preventing a liquid from entering the electronic device 101 from the outside of the electronic device 101.

In addition, at least one of various other members (e.g., an adhesive member, a support member, and/or a buffering member) may be disposed within the electronic device 101.

According to an embodiment, a motor 400 (e.g., the haptic module 179 of FIG. 1) configured to generate a physical stimulus may be disposed inside the electronic device 101. According to an embodiment, the motor 400 may provide a tactile stimulus to the user by generating vibrations in a designated direction in a notification, alert, or ringtone condition.

According to an embodiment, the motor 400 may be disposed between the second housing 220 and the second rear cover 225. According to an embodiment, the motor 400 may be also disposed between the first housing 210 and the first rear cover 215.

Figure 5:
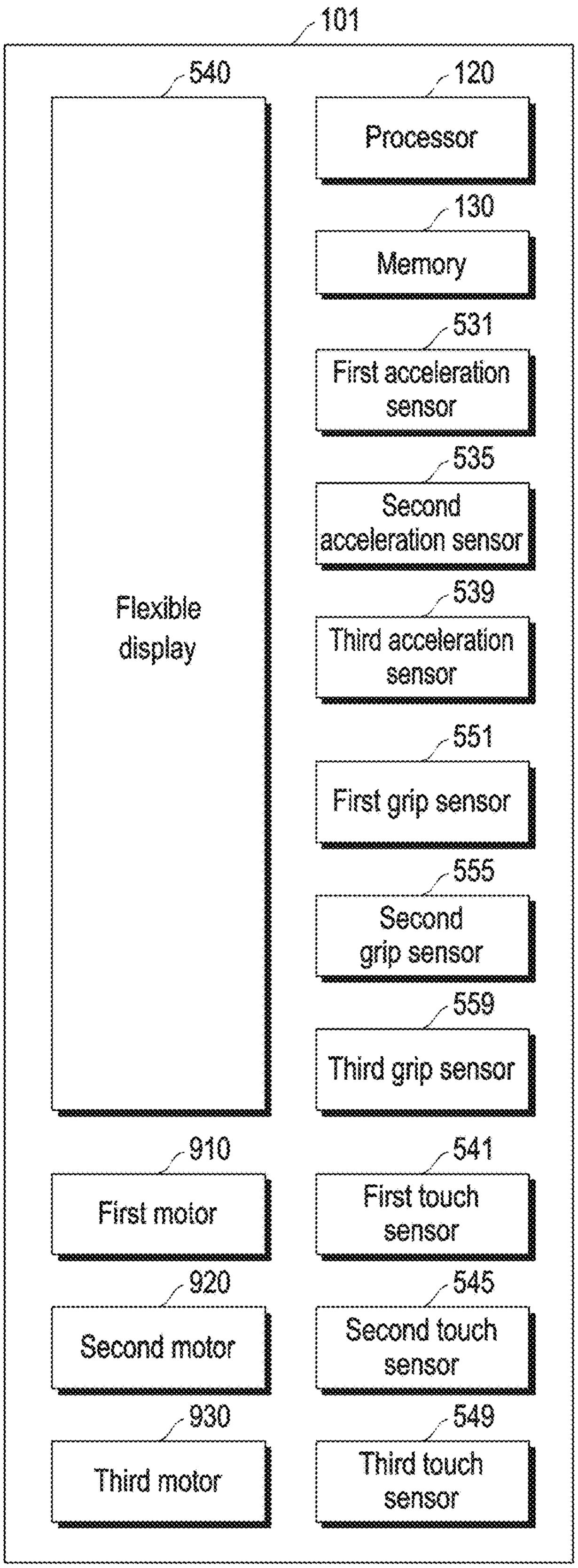
FIG. 5 is a block view illustrating an electronic device according to an embodiment of the disclosure.

FIG. 5 is a block view illustrating an electronic device 101 according to an embodiment of the disclosure.

Referring to FIG. 5, the electronic device 101 according to an embodiment may include a processor 120, memory 130, a flexible display 540, an inertial sensor 531, 535, or 539, a grip sensor 551, 555, or 559, a touch sensor 541, 545, or 549, and/or a motor 910, 920, or 930 (e.g., the motor 400 in FIG. 4).

According to an embodiment, the processor 120 may control at least one other component (e.g., a hardware or software component) of the electronic device 101. According to an embodiment, the processor 120 may perform various data processing or operations, and as at least a portion of the data processing or operations, may store instructions or data received from another component in the memory 130, process the instructions or data stored in the memory 130, and store result data in the memory 130.

According to an embodiment, the flexible display 540 may display a screen configured to visually provide information to the outside of the electronic device 101. In an embodiment, the flexible display 540 may be rollable, foldable, or bendable. In an embodiment, the flexible display 540 may be divided into multiple areas and may be folded between multiple areas.

The flexible display 540 according to an embodiment may be integrated with the touch sensor 541, 545, or 549 configured to detect a touch. According to an embodiment, the touch sensor 541, 545, or 549 may detect a touch occurring on the flexible display 540 and detect a location and/or a strength of the touch. According to an embodiment, the touch sensor 541, 545, or 549 may include a first touch sensor 541, a second touch sensor 545, and/or a third touch sensor 549 provided on each divided area of the flexible display 540. For example, the first touch sensor 541, the second touch sensor 545, and the third touch sensor 549 may be provided on multiple areas of the flexible display 540, respectively, which are divided to correspond to the first housing 510, the second housing 520, and the third housing 530, respectively.

According to an embodiment, the inertial sensor 531, 535, or 539 may detect acceleration and/or angular acceleration of the electronic device 101. In an embodiment, the inertial sensor 531, 535, or 539 may measure acceleration in three axis directions, measure angular acceleration in three axis directions, measure a gravity direction of the electronic device 101, or detect motion of the electronic device 101. For example, the inertial sensor 531, 535, or 539 may correspond to an acceleration sensor or a gyro sensor, or an inertial measurement unit (IMU) sensor in which an acceleration sensor and a gyro sensor is integrated.

In an embodiment, the inertial sensor 531, 535, or 539 may include a first inertial sensor 531, a second inertial sensor 535, and/or a third inertial sensor 539. For example, the first inertial sensor 531, the second inertial sensor 535, and the third inertial sensor 539 may be provided in the first housing 510, the second housing 520, and the third housing 530, respectively and may detect acceleration, angular acceleration, a gravity direction, and/or a motion of each of the first housing 510, the second housing 520, and the third housing 530.

According to an embodiment, the grip sensor 551, 555, or 559 may detect the proximity of a portion of the user's body, and thus may detect whether the user is gripping the electronic device 101 (e.g., the housing). For example, the grip sensor 551, 555, or 559 may be provided in a lateral portion or a metal portion provided at a lower portion of the housing of the electronic device 101 and may use an electrostatic method.

In an embodiment, the grip sensor 551, 555, or 559 may include a first grip sensor 551, a second grip sensor 555, and/or a third grip sensor 559. For example, the first grip sensor 551, the second grip sensor 555, and the third grip sensor 559 may be provided in the first housing 510, the second housing 520, and the third housing 530, respectively and may detect whether each of the first housing 510, the second housing 520, and the third housing 530 is gripped.

According to an embodiment, the electronic device 101 may include a first motor 910 disposed in the first housing 510 and configured to generate vibration. According to an embodiment, the electronic device 101 may include a second motor 920 disposed in the second housing 520 or the third housing 530 and configured to generate vibration in a direction different from that of the first motor 910. As an embodiment, in case that the second motor 920 is disposed in the third housing 530, the third motor 930 may be additionally provided in the second housing 520.

Figure 6A:
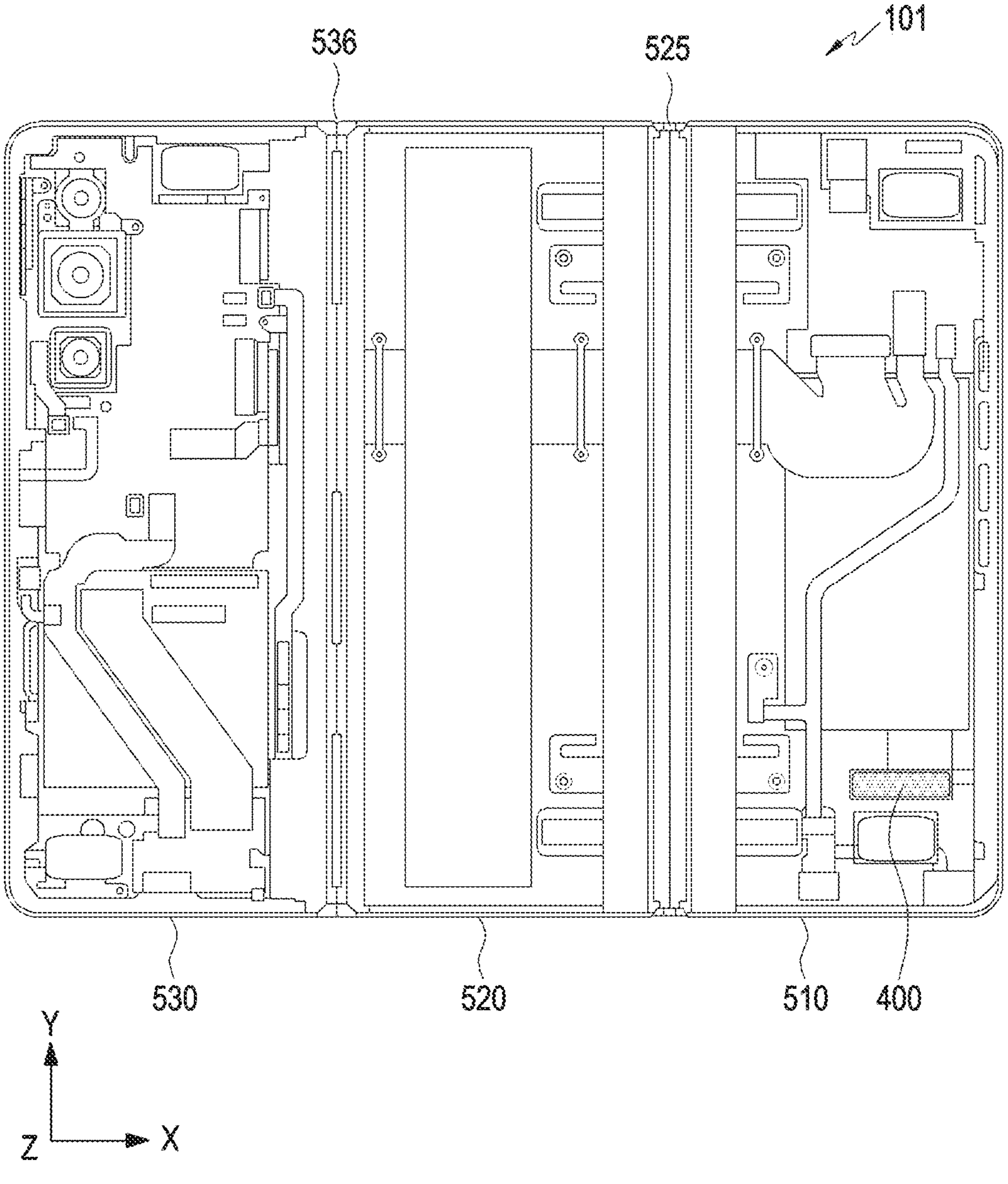
FIG. 6A is a rear view illustrating an exploded state of an electronic device according to an embodiment of the disclosure.
Figure 6B:
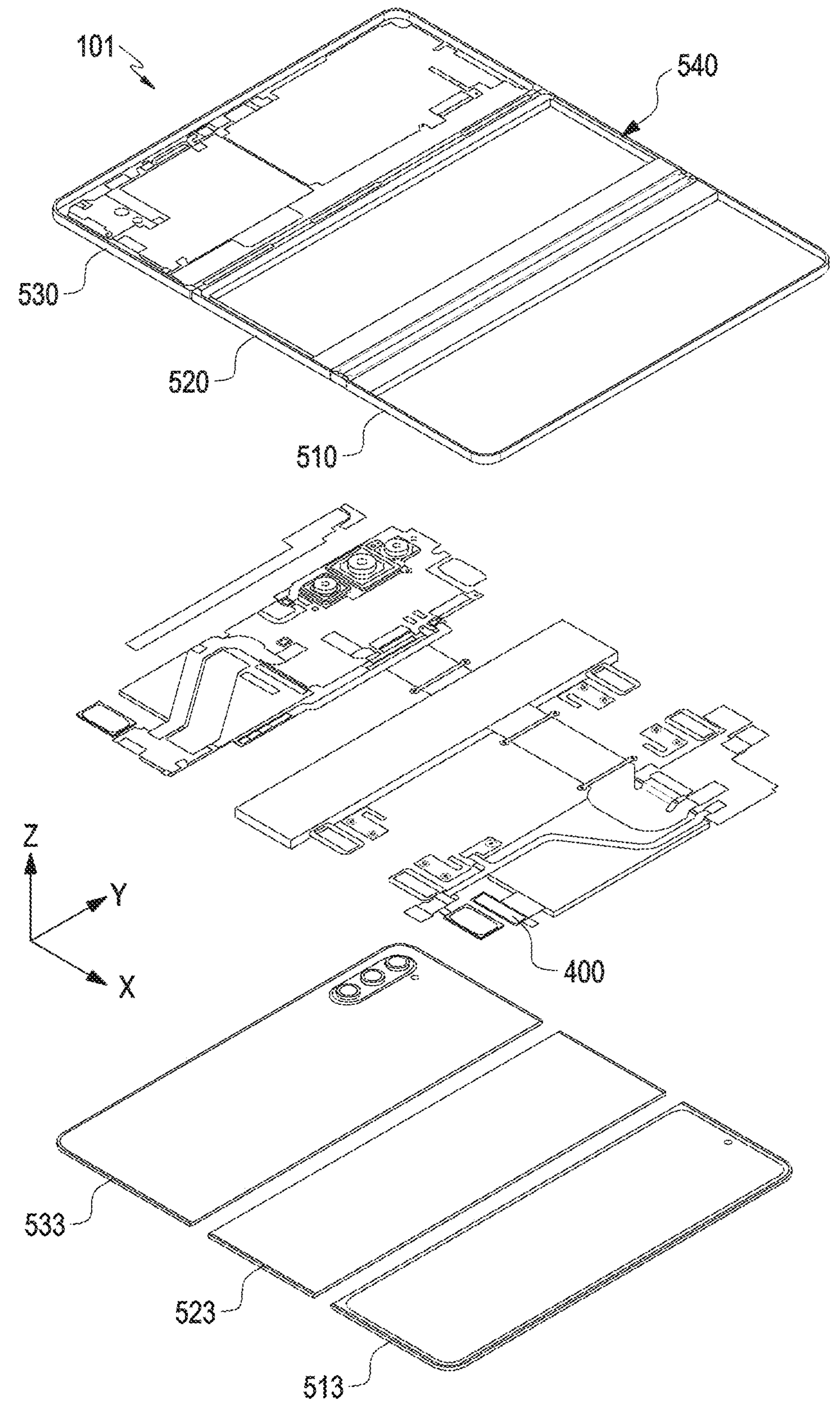
FIG. 6B is a rear perspective view illustrating an exploded state of an electronic device according to an embodiment of the disclosure.

FIG. 6A is a rear view illustrating an exploded state of an electronic device 101 according to an embodiment of the disclosure. FIG. 6B is a rear perspective view illustrating an exploded state of an electronic device 101 according to an embodiment of the disclosure.

Referring to FIGS. 6A and 6B, the electronic device 101 according to an embodiment may include a flexible display 540 which is partitioned into a first display area, a second display area, and a third display area and may include a first housing 510, a second housing 520, and a third housing 530 provided to correspond to each of the first display area, the second display area, and the third display area of the flexible display 540.

In an embodiment, the first housing 510 and the second housing 520 may be rotatably coupled to each other. In an embodiment, the second housing 520 and the third housing 530 may be rotatably coupled to each other. For example, the first housing 510 and the second housing 520 and/or the second housing 520 and the third housing 530 may be rotatably coupled through a hinge coupling 515, 525, or 536.

In an embodiment, the first housing 510 and the second housing 520 may be folded, by relative rotation, from the unfolded state in which the first display area and the second display area of the flexible display 540 are disposed parallel to each other laterally such that the first display area and the second display area extend in a planar direction to a state in which the first housing 510 and the second housing 520 are at least partially overlapping in an upward and downward direction. As an embodiment, the first housing 510 and the second housing 520 may be folded at various angles from the unfolding state and may be fixed in the folding state.

As an embodiment, the first housing 510 and the second housing 520 may be folded in an outward direction by a hinge structure 525 such that the first display area and the second display area of the flexible display 540 are exposed to the outside. For example, the first housing 510 and the second housing 520 may be folded in a direction such that a rear cover 513 of the first housing 510 and a rear cover 523 of the second housing 520 are adjacent to each other.

In an embodiment, the second housing 520 and the third housing 530 may be folded, by relative rotation, from the unfolded state in which the second display area and the third display area of the flexible display 540 are disposed parallel to each other laterally such that the second display area and the third display area extend in a planar direction to a state in which the first housing 510 and the second housing 520 are at least partially overlapping in an upward and downward direction. As an embodiment, the second housing 520 and the third housing 530 may be folded at various angles from the unfolding state and may be fixed in the folding state.

As an embodiment, the second housing 520 and the third housing 530 may be folded in an inward direction by a hinge structure 536 such that the second display area and the third display area of the flexible display are adjacent to the outside. For example, the second housing 520 and the third housing 530 may be folded in a direction such that the second display area and the third display area contact each other.

For example, the flexible display 540 may extend in a planar direction in a state in which the first housing 510 and the second housing 520 and the second housing 520 and the third housing 530 are fully unfolded. By way of example, in case that the first housing 510 and the second housing 520 are folded, and the second housing 520 and the third housing 530 are folded, the first housing 510, the second housing 520, and the third housing 530 may at least partially overlap in an upward and downward direction in a "Z" shape. For example, the third housing 530, the second housing 520, and the first housing 510 may be sequentially stacked in the upward and downward direction.

For example, in case that the first housing 510 and the second housing 520 are folded, and the second housing 520 and the third housing 530 are folded, the first display area of the flexible display 540 and the rear cover 533 of the third housing 530 may be exposed to the outside, and the second display area and the third display area of the flexible display 540 may be covered from the outside with the second display area and the third display area of the flexible display 540 in contact with each other.

According to an embodiment, the motor 400 may be disposed between the first housing 510 and the first rear cover 513.

Figure 7A:
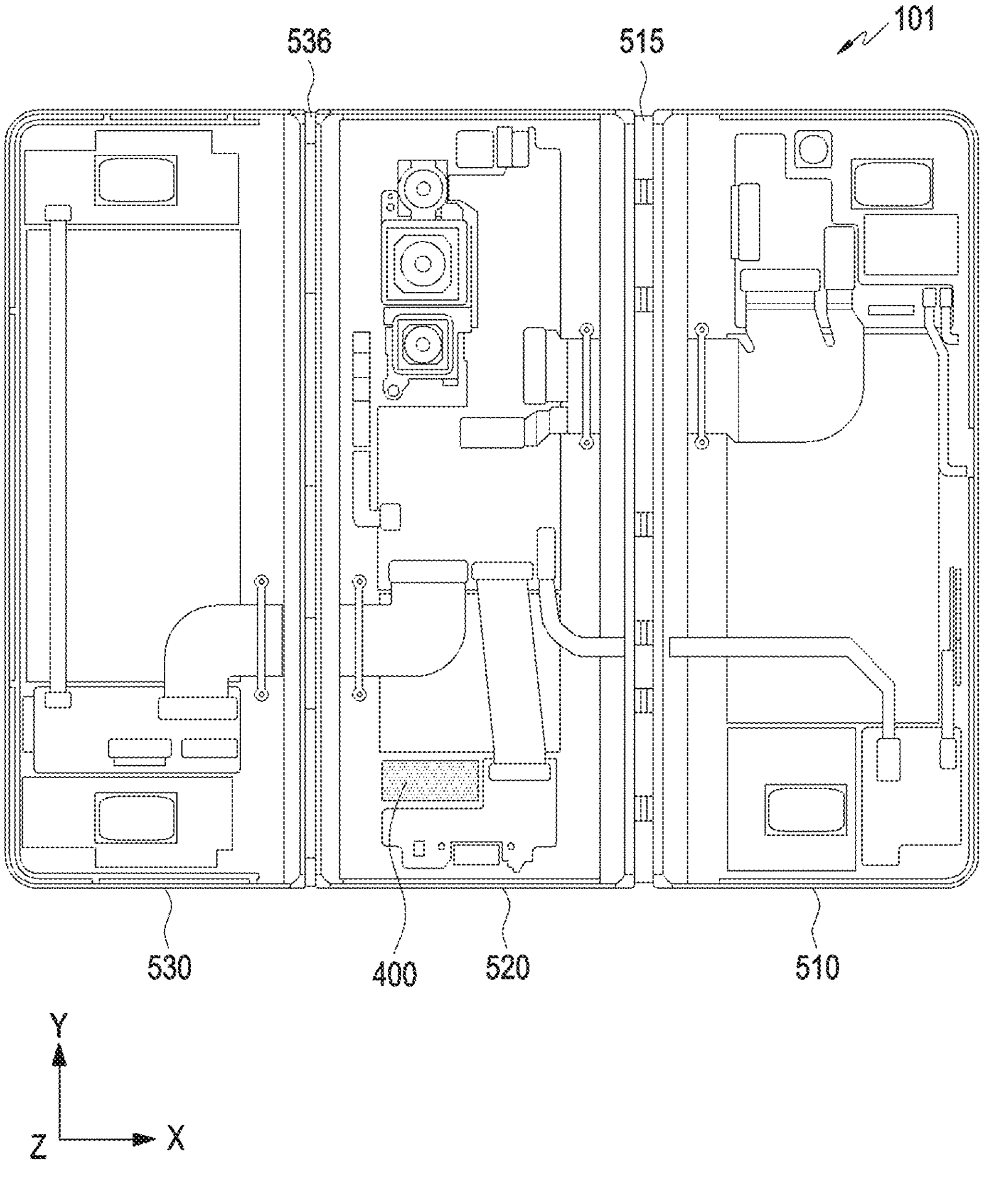
FIG. 7A is a rear view illustrating an exploded state of an electronic device according to an embodiment of the disclosure.
Figure 7B:
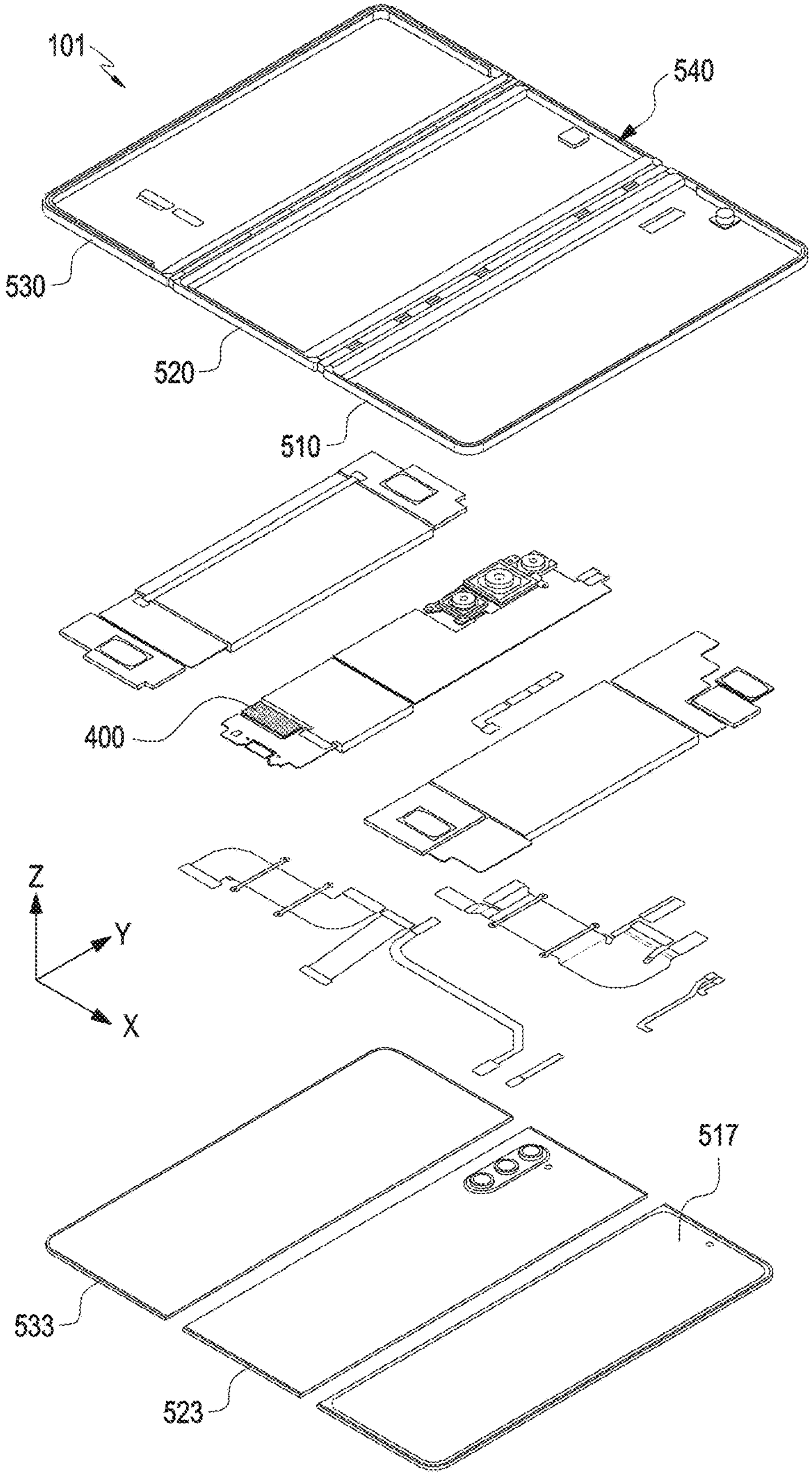
FIG. 7B is a rear perspective view illustrating an exploded state of an electronic device according to an embodiment of the disclosure.

FIG. 7A is a rear view illustrating an exploded state of an electronic device 101 according to an embodiment of the disclosure. FIG. 7B is a rear perspective view illustrating an exploded state of an electronic device 101 according to an embodiment of the disclosure.

Referring to FIGS. 7A and 7B, the electronic device 101 according to an embodiment may include a first housing 510, a second housing 520, and a third housing 530 provided to correspond to each of the first display area, the second display area, and the third display area of the flexible display 540.

In an embodiment, the first housing 510 and the second housing 520 may be folded, by relative rotation, from the unfolded state in which the first display area and the second display area of the flexible display 540 are disposed parallel to each other laterally such that the first display area and the second display area extend in a planar direction to a state in which the first housing 510 and the second housing 520 are at least partially overlapping in an upward and downward direction. As an embodiment, the first housing 510 and the second housing 520 may be folded at various angles from the unfolding state and may be fixed in the folding state.

As an embodiment, the first housing 510 and the second housing 520 may be folded in an inward direction by the hinge structure 515 such that the first display area and the second display area of the flexible display 540 are adjacent to the outside. For example, the first housing 510 and the second housing 520 may be folded in a direction such that the first display area and the second display area contact each other.

In an embodiment, the second housing 520 and the third housing 530 may be folded, by relative rotation, from the unfolded state in which the second display area and the third display area of the flexible display 540 are disposed parallel to each other laterally such that the second display area and the third display area extend in a planar direction to a state in which the first housing 510 and the second housing 520 are at least partially overlapping in an upward and downward direction. As an embodiment, the second housing 520 and the third housing 530 may be folded at various angles from the unfolding state and may be fixed in the folding state.

As an embodiment, the second housing 520 and the third housing 530 may be folded in the inward direction such that the second display area and the third display area of the flexible display are adjacent to the outside. For example, the second housing 520 and the third housing 530 may be folded in a direction such that the second display area and the third display area contact each other.

In an embodiment, the first housing 510 may be folded on the rear surface of the third housing 530 to surround the third housing 530 from the outside, so as to avoid interference with the third housing 530, in a state in which the second housing 520 and the third housing 530 are folded in the inward direction. For example, the first housing 510 may be rotatably coupled to the second housing 520 while spaced away from the second housing 520 by a distance corresponding to the thickness of the third housing 530 so as to surround the third housing 530 from the outside.

For example, the flexible display 540 may extend in a planar direction in a state in which the first housing 510 and the second housing 520 and the second housing 520 and the third housing 530 are fully unfolded. By way of example, in case that the first housing 510 and the second housing 520 are folded, and the second housing 520 and the third housing 530 are folded, the first housing 510, the second housing 520, and the third housing 530 may at least partially overlap in an upward and downward direction in a "G" shape. For example, the second housing 520, the third housing 530, and the first housing 510 may be sequentially stacked in the upward and downward direction.

For example, in case that the second housing 520 and the third housing 530 are folded, and the first housing 510 and the second housing 520 are folded, the second display area and the third display area of the flexible display 540 may be covered from the outside while being in contact with each other, and the first display area of the flexible display 540 may be covered from the outside while being in contact with the rear cover 513 of the first housing 510. For example, the rear cover 523 of the second housing 520 may be exposed to the outside, and a sub-display 517 may be provided on the rear surface of the first housing 510 exposed to the outside.

According to an embodiment, the motor 400 may be disposed between the second housing 520 and the second rear cover 523.

Figure 8A:
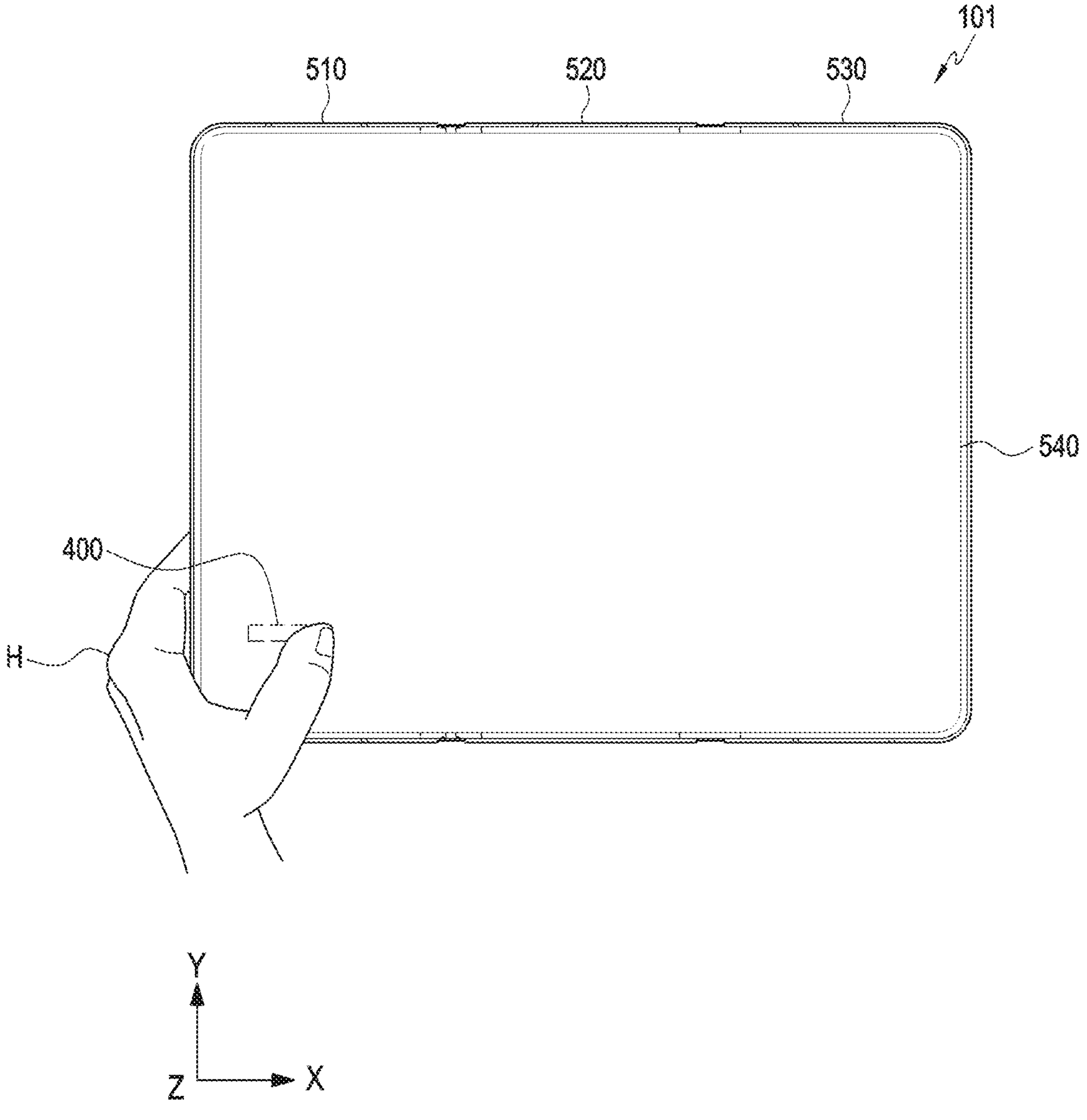
FIG. 8A is a state view illustrating a state in which a first housing of an electronic device having a motor in the first housing is gripped according to an embodiment of the disclosure.
Figure 8B:
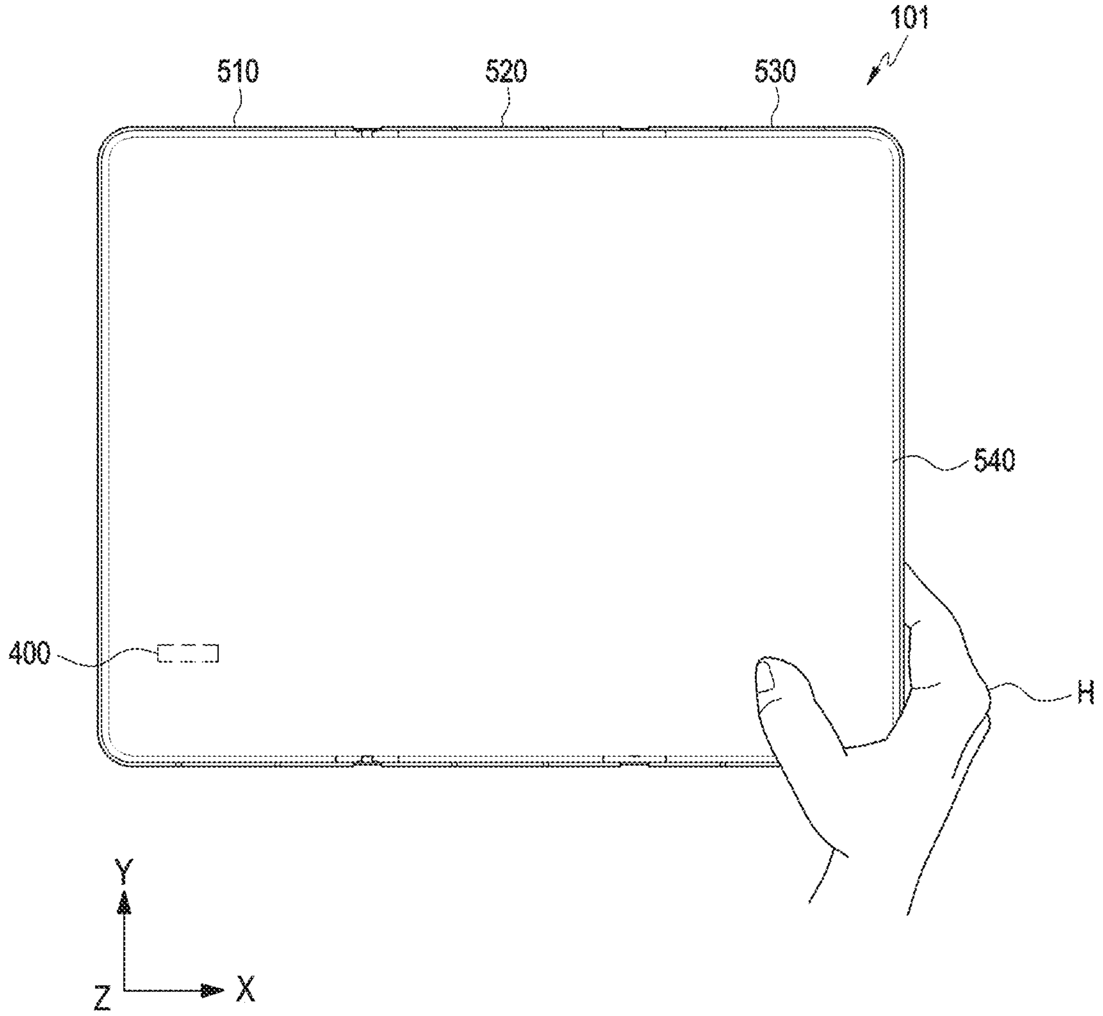
FIG. 8B is a state view illustrating a state in which a third housing of an electronic device having a motor in a first housing is gripped according to an embodiment of the disclosure.
Figure 8C:
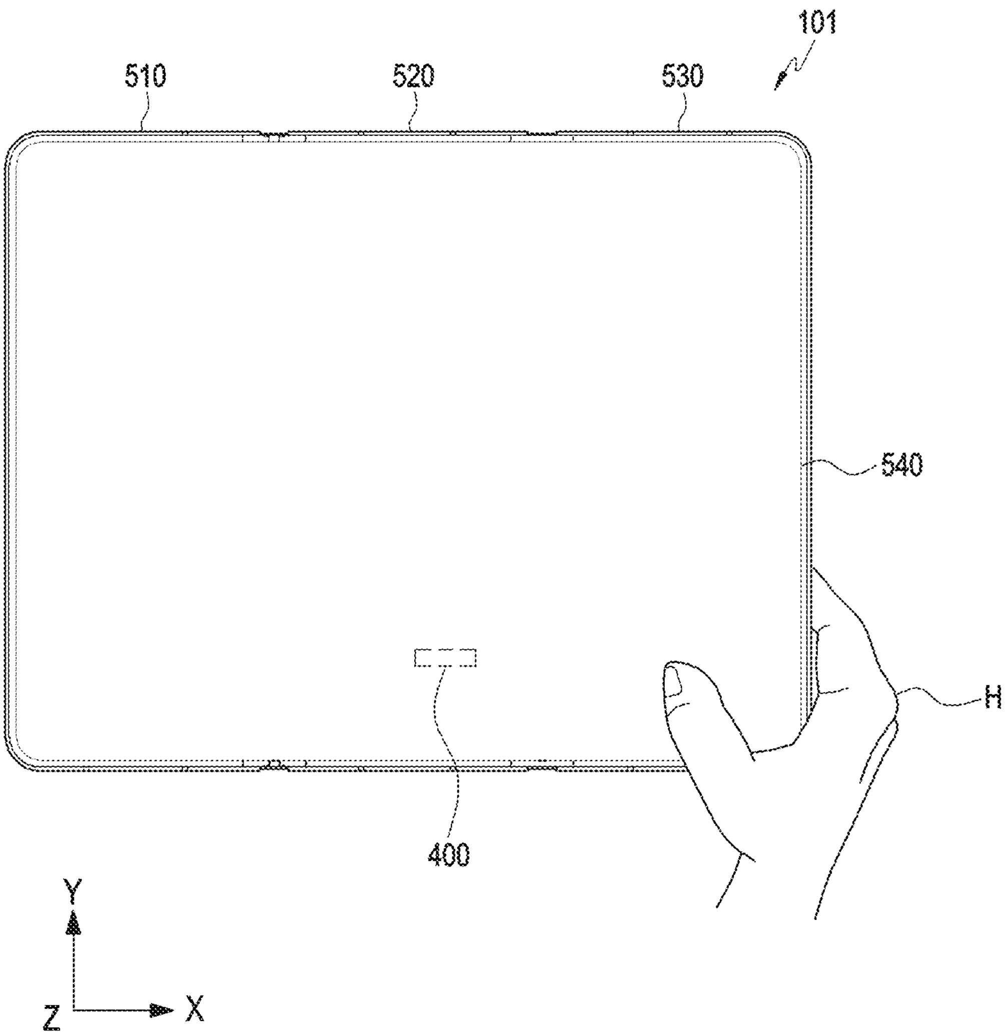
FIG. 8C is a state view illustrating a state in which a first housing of an electronic device having a motor in a second housing is gripped according to an embodiment of the disclosure.

FIG. 8A is a state view illustrating a state in which a first housing 510 of an electronic device 101 having a motor 910, 920, or 930 in the first housing 510 is gripped according to an embodiment of the disclosure. FIG. 8B is a state view illustrating a state in which a third housing 530 of an electronic device 101 having a motor 910, 920, or 930 in a first housing 510 is gripped according to an embodiment of the disclosure. FIG. 8C is a state view illustrating a state in which a first housing 510 of an electronic device 101 having a motor 910, 920, or 930 in a second housing 520 is gripped according to an embodiment of the disclosure.

Referring to FIGS. 8A and 8B, in the electronic device 101 according to an embodiment, a motor 400 may be disposed in the first housing 510. For example, as shown in FIG. 8A, in case that the user's hand H grips the motor 400 disposed in the first housing 510, a vibration force according to the vibration of the motor 400 may be strongly transmitted to the user's hand H. Accordingly, the motor 400 of the electronic device 101 may deliver a strong stimulus to the user by vibration.

However, as shown in FIG. 8B, in case that the user's hand H grips the third housing 530, the vibration force caused by the vibration of the motor 400 may be transferred through the two hinge coupling structures 515, 525, and 536 and weakly transferred to the user's hand H. Accordingly, the motor 400 of the electronic device 101 may deliver a very weak vibration stimulus to the user, such that the user may have difficulty perceiving the vibration force of the motor 400.

Referring to FIG. 8C, in the electronic device 101 according to an embodiment, the motor 400 may be disposed in the second housing 520. For example, in case that the user's hand H grips the first housing 510 or the third housing 530, the vibration force caused by the vibration of the motor 400 may be transferred through the hinge coupling structure 515, 525, or 536 and weakly transferred to the user's hand H.

Considering that gripping the first housing 510 or the third housing 530 is relatively more frequent than gripping the second housing 520 in the electronic device 101 according to an embodiment, the arrangement of the motor 400 may not be efficient because the vibration force generated by the motor 400 disposed in the second housing 520 is weakened when transferred to the first housing 510 or the third housing 530.

Figure 9A:
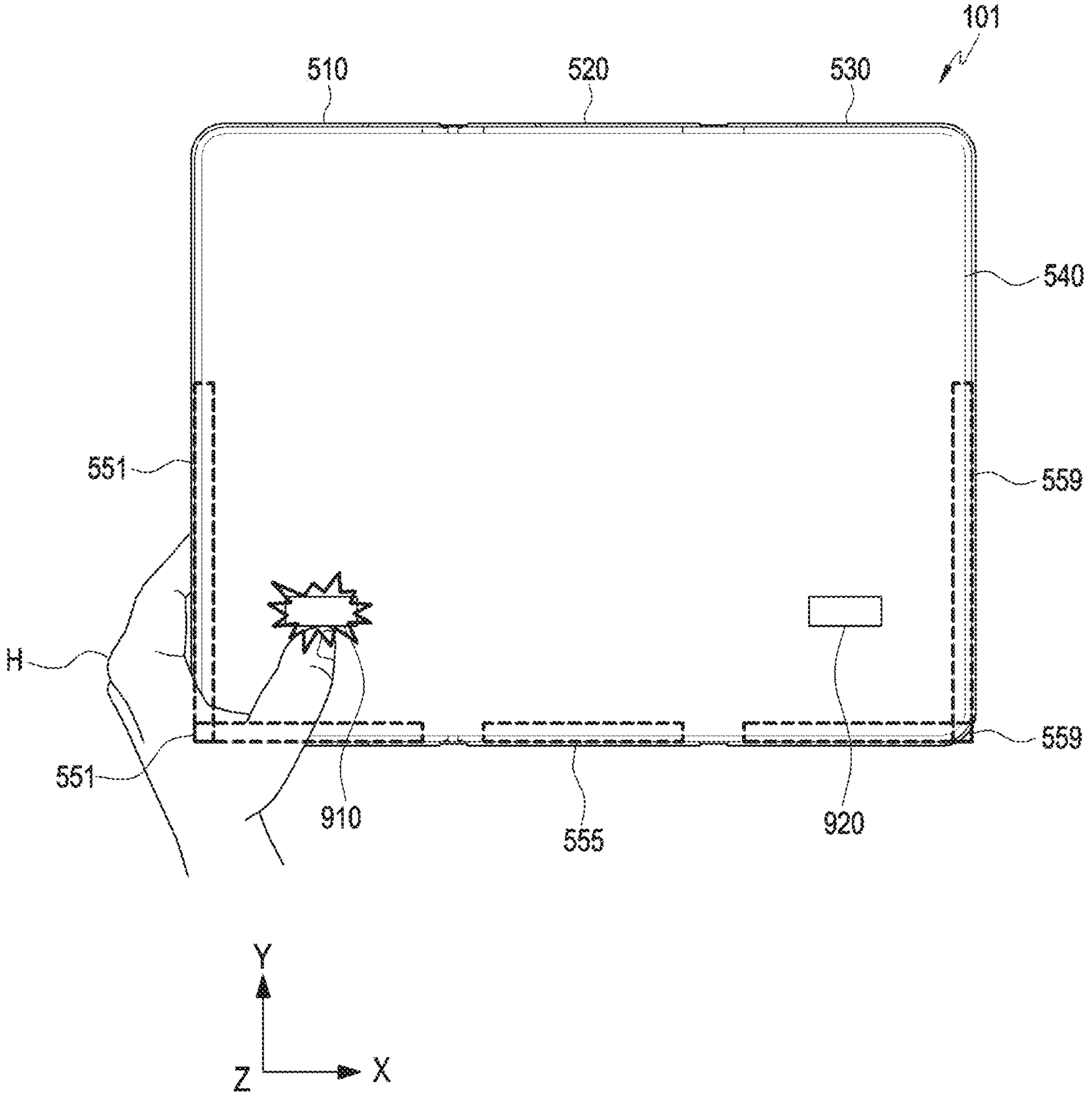
FIGS. 9A and 9B illustrate disposition of a motor in an electronic device according to an embodiment of the disclosure.
Figure 9B:
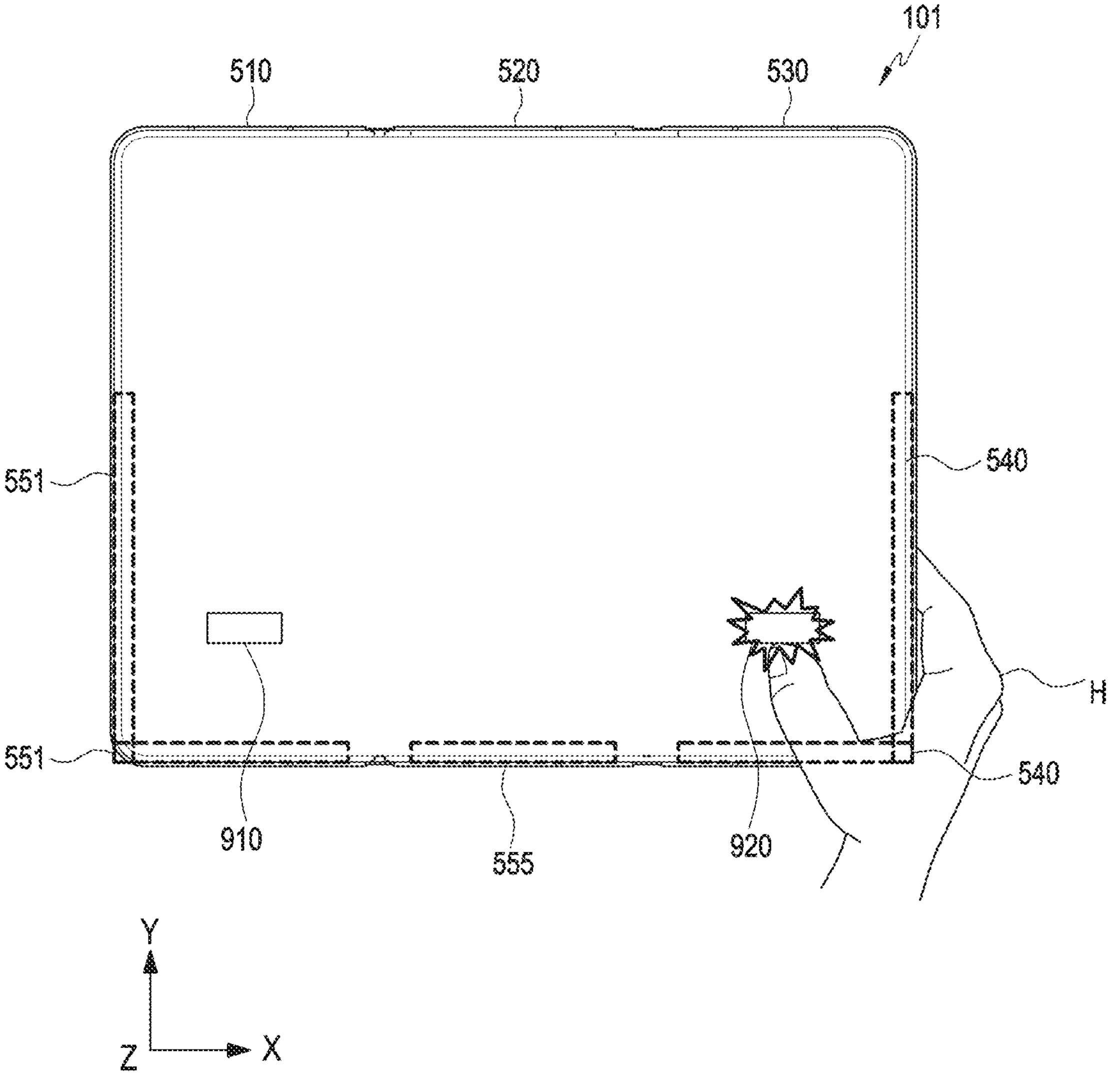

FIGS. 9A and 9B illustrate disposition of a motor 910, 920, or 930 in an electronic device 101 according to an embodiment of the disclosure.

Referring to FIGS. 9A and 9B, the electronic device 101 according to an embodiment may include a first motor 910 disposed in the first housing 510 and a second motor 920 disposed in the second housing 520 or the third housing 530. For example, the second motor 920 may be disposed in the second housing 520 and may be disposed in the third housing 530.

In the electronic device 101 according to an embodiment, the first motor 910 may be disposed in the first housing 510, and the second motor 920 may be disposed in the third housing 530.

In an embodiment, the electronic device 101 may identify whether the first housing 510, the second housing 520, or the third housing 530 is gripped and selectively operate (or control) at least one of the first motor 910 or the second motor 920, based on the first housing 510, the second housing 520, or the third housing 530 being gripped.

In an embodiment, the electronic device 101 may operate (or control) at least one of the first motor 910 or the second motor 920 disposed in a housing identified as being gripped among the first housing 510, the second housing 520, or the third housing 530.

In an embodiment, the electronic device 101 may acquire at least one measurement value from the first grip sensor 551, the second grip sensor 555, the third grip sensor 559, the first touch sensor 541, the second touch sensor 545, and/or the third touch sensor 549 and identify whether at least one of the first housing 510, the second housing 520, or the third housing 530 is gripped based on the acquired at least one measurement value.

As an embodiment, in case of identifying the grip of the first housing 510, the electronic device 101 may operate the first motor 910 based on satisfaction of a designated first condition in relation to provision of repeated notifications or a designated second condition in relation to provision of a notification once or more.

As an embodiment, in case of identifying the grip of the third housing 530, the electronic device 101 may operate the second motor 920 based on satisfaction of the designated first condition in relation to provision of repeated notifications or the designated second condition in relation to provision of a notification once or more.

As an embodiment, in case of concurrently identifying the grip of the first housing 510 and the third housing 530, the electronic device 101 may operate the first motor 910 and the second motor 920 together based on satisfaction of the designated first condition in relation to provision of repeated notifications or the designated second condition in relation to provision of a notification once or more.

For example, in the case where the second motor 920 is disposed in the third housing 530, as an embodiment, when the grip of the second housing 520 is identified, the electronic device 101 may select and operate one of the first motor 910 or the second motor 920 or operate the first motor 910 and the second motor 920 together, based on satisfaction of the designated first condition in relation to provision of repeated notifications or the designated second condition in relation to provision of a notification once or more.

For example, in the case where the second motor 920 is disposed in the second housing 520, as an embodiment, in case of identifying the grip of the second housing 520, the electronic device 101 may operate the second motor 920 based on satisfaction of the designated first condition in relation to provision of repeated notifications or the designated second condition in relation to provision of a notification once or more.

Accordingly, by selectively operating the motors 910, 920, and 930 relative to the user's hand H gripping the electronic device 101, a strong stimulus by vibration may be provided to the user.

For example, in case that the vibration direction of the first motor 910 and the second motor 920 is identical, operating the first motor 910 and the second motor 920 concurrently may result in similar vibration forces, or even reduced vibration strength, compared to operating one of the first motor 910 or the second motor 920 alone. That is, in case that the vibration direction of the first motor 910 and the second motor 920 is identical, the vibration force may not increase in proportion to the number of motors 910, 920, and 930 due to a change in resonance frequency.

In an embodiment, the first motor 910 may be configured to vibrate in a designated first direction. In an embodiment, the second motor 920 may be configured to vibrate in a designated second direction to be different from the designated first direction in which the first motor 910 vibrates. For example, the designated second direction may be configured to be a direction intersecting the designated first direction. For example, the designated second direction may be configured to be a direction orthogonal to the designated first direction.

For example, in case that the designated first direction in which the first motor 910 vibrates is configured to be the Z-axis direction, the designated second direction in which the second motor 920 vibrates may be configured to be the X-axis direction. For example, in case that the designated first direction in which the first motor 910 vibrates is configured to be the Z-axis direction, the designated second direction in which the second motor 920 vibrates may be configured to be the Y-axis direction. For example, in case that the designated first direction in which the first motor 910 vibrates is configured to be the X-axis direction, the designated second direction in which the second motor 920 vibrates may be configured to be the Z-axis direction.

For example, in case that the designated first direction in which the first motor 910 vibrates is configured to be the X-axis direction, the designated second direction in which the second motor 920 vibrates may be configured to be the Y-axis direction. For example, in case that the designated first direction in which the first motor 910 vibrates is configured to be the Y-axis direction, the designated second direction in which the second motor 920 vibrates may be configured to be the X-axis direction.

For example, in case that the designated first direction of the first motor 910 or the designated second direction of the second motor 920 is configured to be the horizontal direction (e.g., a plane on the X-axis and the Y-axis), a vibration force perception level of the electronic device 101 mounted on a floor may be reduced. According to an embodiment, at least one of the designated first direction of the first motor 910 or the designated second direction of the second motor 920 of the electronic device 101 may be configured to be the vertical direction (e.g., the Z-axis).

Figure 10A:
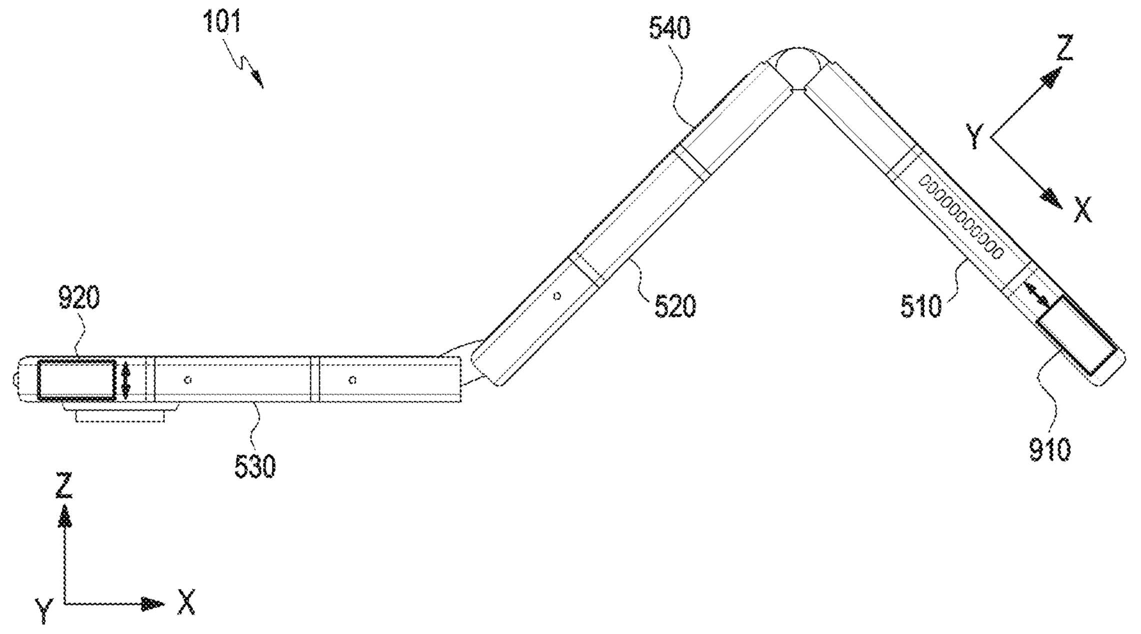
FIGS. 10A and 10B illustrate various mounting positions of an electronic device according to an embodiment of the disclosure.
Figure 10B:
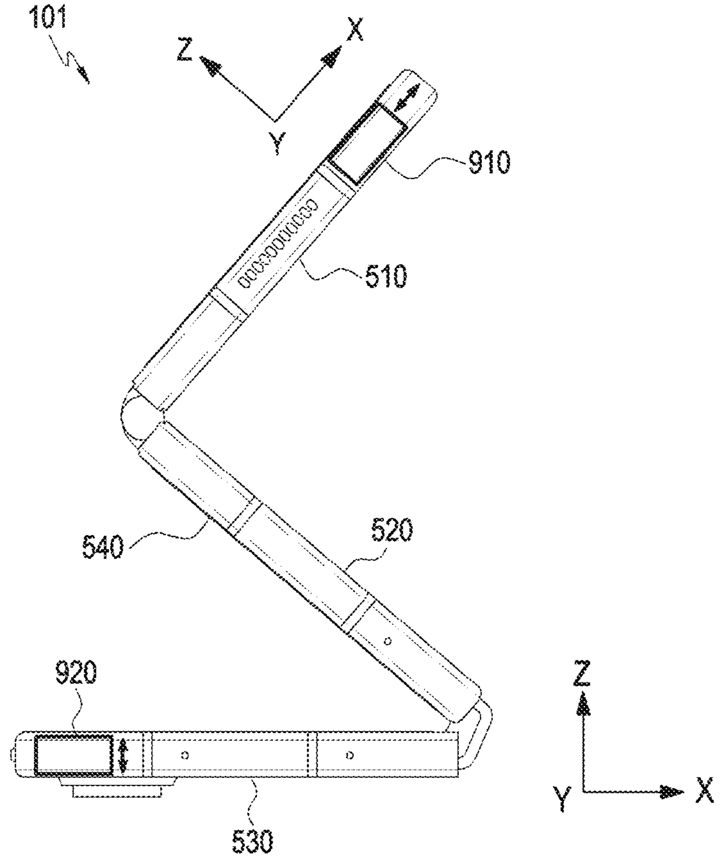

FIGS. 10A and 10B illustrate various mounting positions of an electronic device 101 according to an embodiment of the disclosure.

Referring to FIGS. 10A and 10B, in the electronic device 101 according to an embodiment, the first housing 510 and the second housing 520 may be folded in the outward direction, and the second housing 520 and the third housing 530 may be folded in the inward direction. In an embodiment, the first housing 510 and the second housing 520 of the electronic device 101 may be fixed at various angles between the unfolded state, in which the flexible display 540 is fully unfolded, and the folded state, in which the rear surface of the first housing 510 and the rear surface of the second housing 520 are in contact. In an embodiment, the second housing 520 and the third housing 530 of the electronic device 101 may be fixed at various angles between the unfolded state, in which the flexible display 540 is fully unfolded, and the folded state, in which the second display area and the third display area of the flexible display 540 are in contact.

As an embodiment, the electronic device 101 may display different contents on the first display area of the flexible display 540 corresponding to the first housing 510, the second display area of the flexible display 540 corresponding to the second housing 520, and/or the third display area of the flexible display 540 corresponding to the third housing 530, respectively. For example, an image may be displayed on the first display area of the flexible display 540 corresponding to the mounted first housing 510, and a screen of an application for note-taking may be displayed on the second display area and the third display area of the flexible display 540 corresponding to the second housing 520 and the third housing 530 that are placed on the floor.

As an embodiment, the first motor 910 may be configured to vibrate in a planar direction (e.g., the X-axis or the Y-axis) in which the first housing 510 extends. For example, the vibration direction of the first motor 910 may be configured as a direction parallel with a direction in which the first housing 510 and the second housing 520 are coupled and extend.

In an embodiment, the second motor 920 may be configured to vibrate in a direction intersecting that of the first motor 910. For example, the vibration direction of the second motor 920 may be configured as a direction (e.g., the Z-axis) that is intersecting the planar direction in which the second display area or the third display area extends, or as a direction perpendicular to the planar direction in which the second housing 520 or the third housing 530 extends. For example, the vibration direction of the second motor 920 may be configured as a direction (e.g., the Z-axis) intersecting (e.g., orthogonal to) a plane in which the flexible display 540 extends.

In an embodiment, in case of identifying that none of the first housing 510, the second housing 520, or the third housing 530 is gripped, based on whether at least one of the first housing 510, the second housing 520, or the third housing 530 is gripped based on at least one measurement value, the electronic device 101 may identify a folding state of the electronic device 101 according to folding of the second housing 520 or folding of the third housing 530 based on at least one measurement value.

In an embodiment, the electronic device 101 may identify whether at least one of the first housing 510, the second housing 520, or the third housing 530 is gripped, based on a measurement value of the touch sensor 541, 545, or 549 or the grip sensor 551, 555, or 559. In an embodiment, the electronic device 101 may identify a folding state of the electronic device 101 according to folding of the second housing 520 or folding of the third housing 530 based on a measurement value of the inertial sensor 531, 535, or 539.

In an embodiment, the electronic device 101 may identify the folding state of the electronic device 101 by using a measurement value of one of the first inertial sensor 531, the second inertial sensor 535, or the third inertial sensor 539 in the folding state of the second housing 520 and the third housing 530. In an embodiment, the electronic device 101 may identify the folding state of each of the first housing 510, the second housing 520, and the third housing 530 based on a measurement value of one of the first inertial sensor 531, the second inertial sensor 535, or the third inertial sensor 539 in the unfolding state of the second housing 520 or the third housing 530.

As an embodiment, the electronic device 101 may, based on a measurement value of a separately provided Hall sensor (e.g., a Hall IC), detect whether the first housing 510 and the second housing 520 are folding (e.g., by a designated angle or more) or whether the second housing 520 and the third housing 530 are folding (e.g., by a designated angle or more and, in case that the first housing 510 and the second housing 520 or the second housing 520 and the third housing 530 are unfolded by a designated angle or more, activate the first inertial sensor 531, the second inertial sensor 535, and the third inertial sensor 539.

In an embodiment, the electronic device 101 may identify an arrangement direction of the first housing 510 based on a measurement value of the first inertial sensor 531. In an embodiment, the electronic device 101 may identify an arrangement direction of the second housing 520 based on a measurement value of the second inertial sensor 535. In an embodiment, the electronic device 101 may identify an arrangement direction of the third housing 530 based on a measurement value of the third inertial sensor 539. For example, the electronic device 101 may identify an arrangement direction of each of the first housing 510, the second housing 520, and the third housing 530 with respect to the floor and accordingly, identify a folding state of the electronic device 101.

In an embodiment, the electronic device 101 may operate at least one of the first motor 910 or the second motor 920, based on the identified folding state.

In an embodiment, the electronic device 101 may identify a housing placed on the floor among the first housing 510, the second housing 520, or the third housing 530 based on the identified folding state and selectively operate a motor disposed in the identified housing, among the first motor 910 or the second motor 920. For example, the electronic device 101 may, in case of identifying that the first housing 510 is placed on the floor, operate the first motor 910 disposed in the first housing 510.

As an embodiment, the electronic device 101 may select and operate one of the first motor 910 or the second motor 920 having a vibration direction having a relatively large angle with the floor or ground on which the electronic device 101 is mounted, based on the arrangement direction of at least one of the first housing 510, the second housing 520, or the third housing 530. Accordingly, the vibration force perception level of the electronic device 101 mounted on the floor may be improved.

For example, as shown in FIGS. 10A and 10B, in case that the second motor 920 provided in the third housing 530 disposed parallel with the ground is configured to vibrate in a direction (e.g., the Z direction) perpendicular to the extension direction of the third housing 530, the electronic device 101 may select and operate the second motor 920 having the vibration direction perpendicular to the ground.

For example, in case that the first motor 910 provided in the first housing 510 is configured to vibrate in a direction (e.g., the X direction or the Y direction) parallel with the extension direction of the first housing 510, the electronic device 101 may not operate the first motor 910 having an angle between the vibration direction and the ground relatively smaller than that of the second motor 920.

Figure 11A:
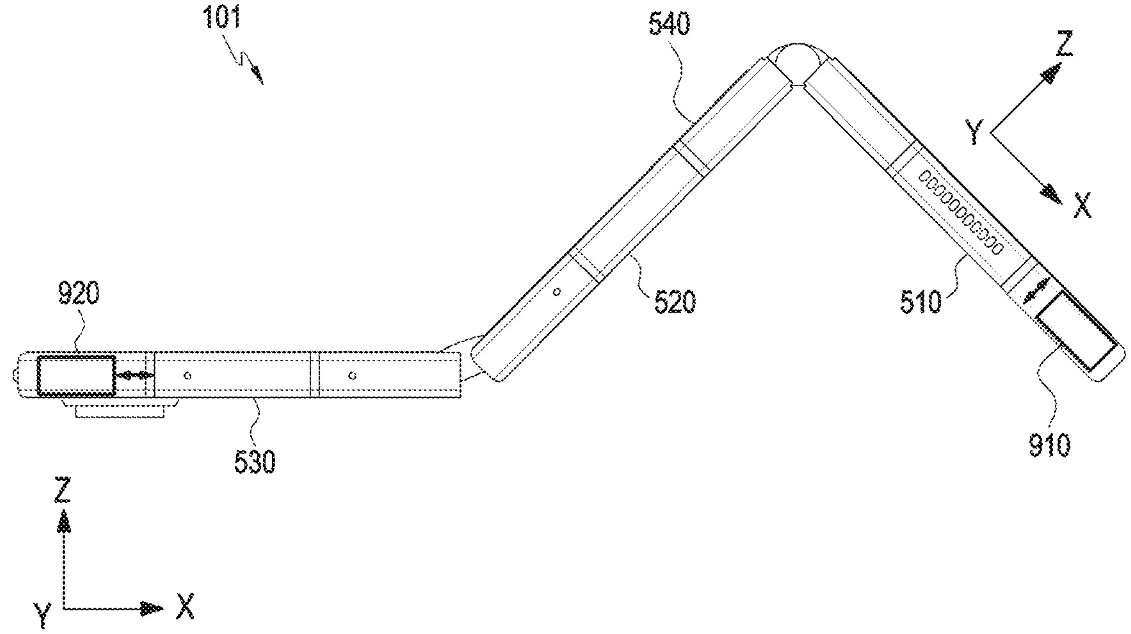
FIGS. 11A and 11B illustrate various mounting positions of an electronic device according to an embodiment of the disclosure.
Figure 11B:
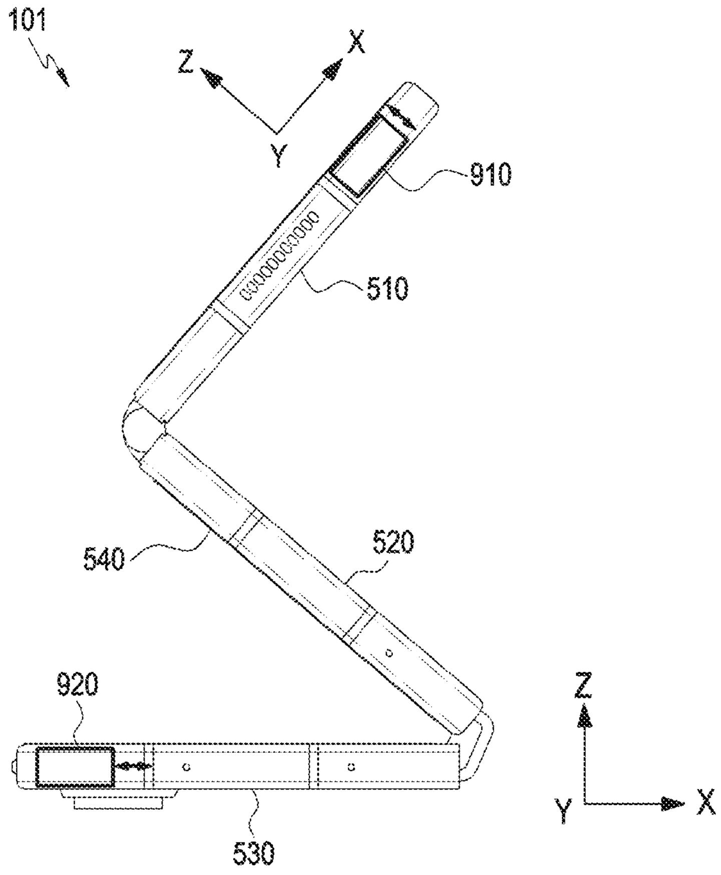

FIGS. 11A and 11B illustrate various mounting positions of an electronic device 101 according to an embodiment of the disclosure.

Referring to FIGS. 11A and 11B, as an embodiment, the first motor 910 may be configured to vibrate in a direction (e.g., the Z-axis) intersecting the planar direction in which the first housing 510 extends.

In an embodiment, the second motor 920 may be configured to vibrate in a direction intersecting that of the first motor 910. For example, the vibration direction of the second motor 920 may be configured to be a planar direction (e.g., the X axis or the Y axis) in which the second display area or the third display area extends.

According to an embodiment, the electronic device 101 may select and operate one of the first motor 910 or the second motor 920 having a vibration direction having a relatively small angle with the floor or ground on which the electronic device 101 is mounted, based on the arrangement direction of at least one of the first housing 510, the second housing 520, or the third housing 530.

According to an embodiment, the electronic device 101 may reduce the vibration force perception level of the electronic device 101 mounted on the floor, manually by user input, or automatically by position data or noise data of the electronic device 101. According to an embodiment, the electronic device 101 may select and operate one of the first motor 910 or the second motor 920 having a vibration direction having a relatively small angle with the floor or ground on which the electronic device 101 is mounted, so as to reduce the vibration force perception level of the electronic device 101 in a quiet space, such as a conference room or library.

For example, as shown in FIGS. 11A and 11B, in case that the second motor 920 provided in the third housing 530 disposed parallel with the ground is configured to vibrate in a direction (e.g., the X axis direction or the Y-axis direction) parallel to the extension direction of the third housing 530, the electronic device 101 may select and operate the second motor 920 having the vibration direction parallel to the ground.

For example, in case that the first motor 910 provided in the first housing 510 is configured to vibrate in a direction (e.g., the X direction or the Y direction) parallel with the extension direction of the first housing 510, the electronic device 101 may not operate the second motor 920 having an angle between the vibration direction and the ground relatively larger than that of the first motor 910.

Figure 12A:
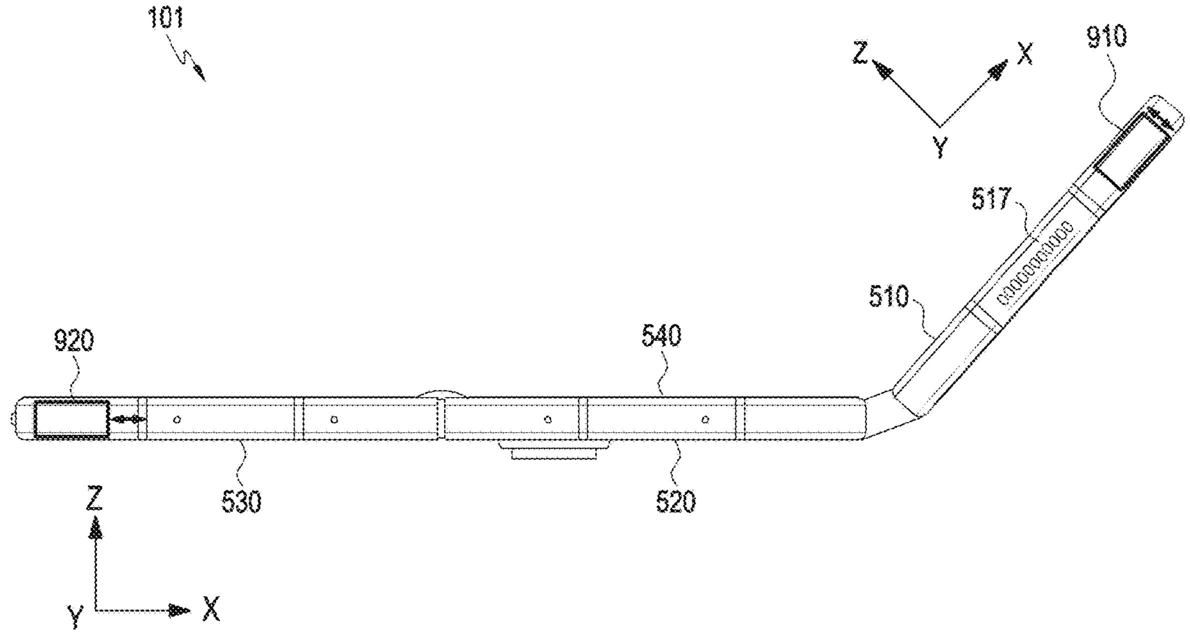
FIGS. 12A and 12B illustrate various mounting positions of an electronic device according to an embodiment of the disclosure.
Figure 12B:
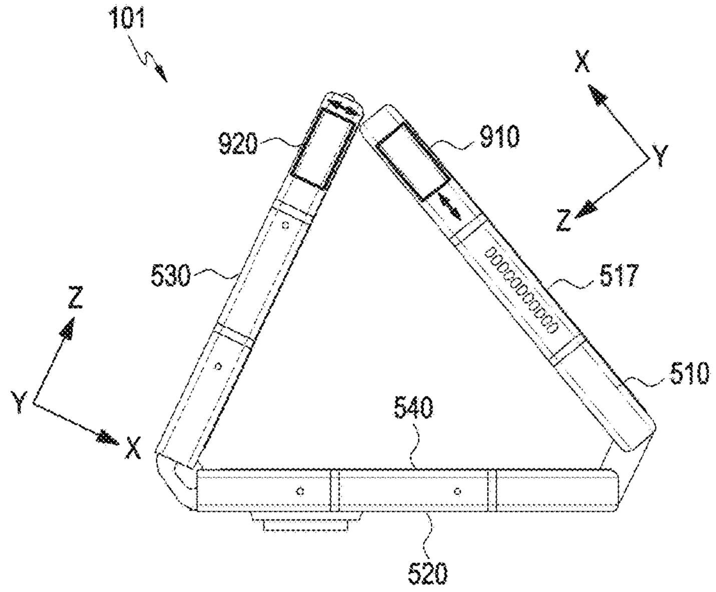

FIGS. 12A and 12B illustrate various mounting positions of an electronic device 101 according to an embodiment of the disclosure.

Referring to FIGS. 12A and 12B, in the electronic device 101 according to an embodiment, the first housing 510 and the second housing 520 may be folded in the inward direction, and the second housing 520 and the third housing 530 may be folded in the inward direction. For example, the first housing 510 may be folded in an inward direction from an outer side of the third housing 530 to surround the third housing 530 folded in an inward direction to the second housing 520.

In an embodiment, the second housing 520 and the third housing 530 of the electronic device 101 may be fixed at various angles between the unfolded state, in which the flexible display 540 is fully unfolded, and the folded state, in which the second display area and the third display area of the flexible display 540 are in contact.

In an embodiment, the first housing 510 and the second housing 520 of the electronic device 101 may be fixed at various angles between the unfolded state in which the flexible display 540 is fully unfolded and the folded state in which the first display area of the flexible display 540 and the rear surface of the third housing 530 are in contact.

As shown in FIG. 12A, as an embodiment, the first motor 910 disposed in the first housing 510 may be configured to vibrate in a direction (e.g., the Z axis) perpendicular to a direction in which the first housing 510 extends. As an embodiment, the third motor 930 disposed in the third housing 530 may be configured to vibrate in a direction (e.g., the X axis or the Y axis) parallel to a direction in which the third housing 530 extends.

As shown in FIG. 12B, as an embodiment, the first motor 910 disposed in the first housing 510 may be configured to vibrate in a direction (e.g., the X axis or the Y axis) parallel to a direction in which the first housing 510 extends. As an embodiment, the third motor 930 disposed in the third housing 530 may be configured to vibrate in a direction (e.g., the Z axis) perpendicular to a direction in which the third housing 530 extends.

As an embodiment, the electronic device 101 may select and operate one of the first motor 910 or the second motor 920 having a vibration direction having a relatively large angle with the floor or ground on which the electronic device 101 is mounted, based on the arrangement direction of at least one of the first housing 510, the second housing 520, or the third housing 530 so as to improve the vibration force perception level of the electronic device 101 mounted on the floor.

As an embodiment, the electronic device 101 may select and operate one of the first motor 910 or the second motor 920 having a vibration direction having a relatively small angle with the floor or ground on which the electronic device 101 is mounted, based on the arrangement direction of at least one of the first housing 510, the second housing 520, or the third housing 530 so as to reduce the vibration force perception level of the electronic device 101 mounted on the floor.

Figure 13:
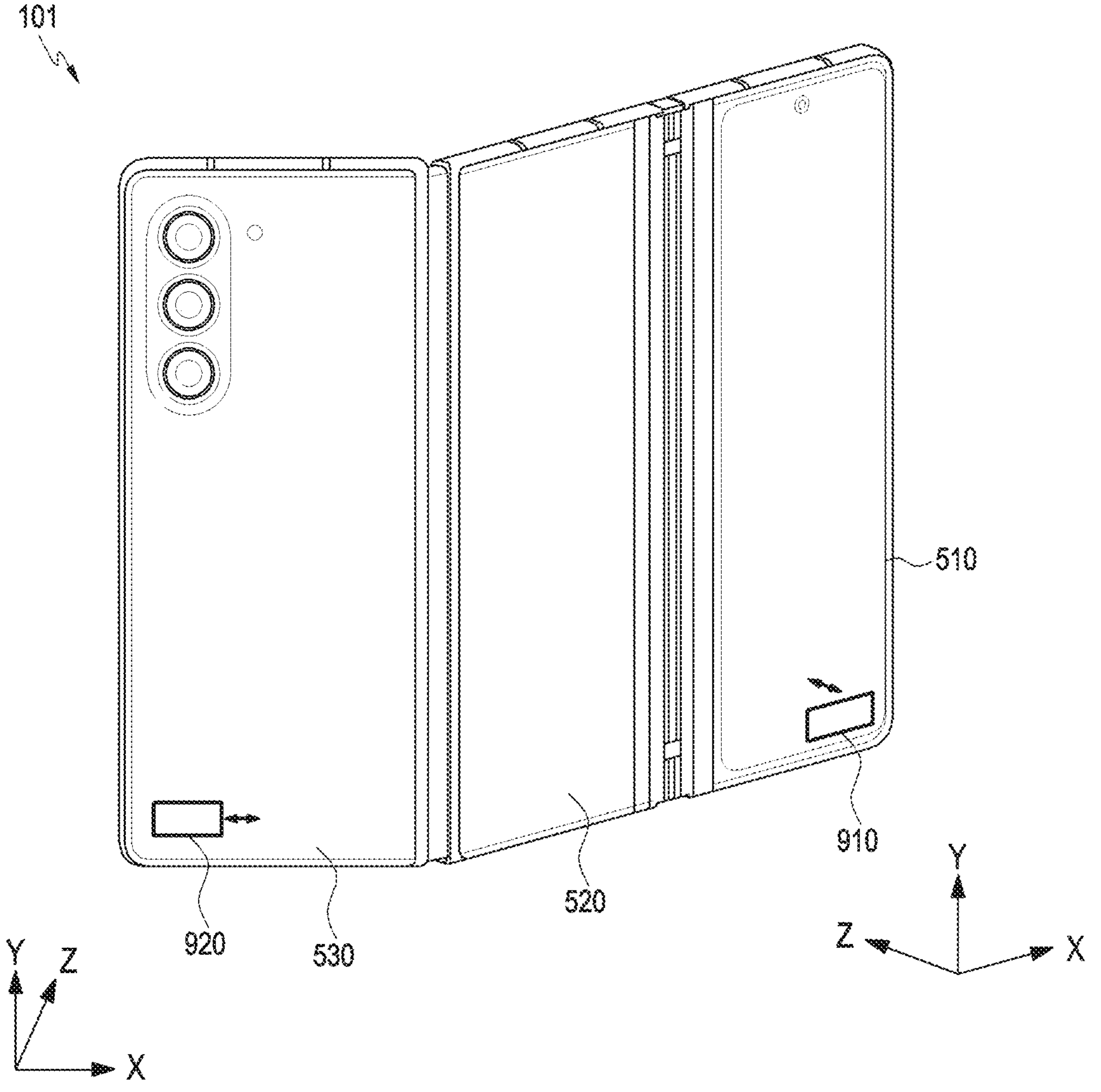
FIG. 13 illustrates various mounting positions of an electronic device according to an embodiment of the disclosure.

FIG. 13 illustrates various mounting positions of an electronic device 101 according to an embodiment of the disclosure.

Referring to FIG. 13, the electronic device 101 according to an embodiment may be mounted in an upright position such that a lower edge of the first housing 510, the second housing 520, and the third housing 530 contacts the ground or floor. For example, the electronic device 101 according to an embodiment may be mounted such that a direction perpendicular to a direction in which the first housing 510, second housing 520, and third housing 530 extend and are coupled in a plane of the flexible display 540 is perpendicular to the ground or floor. For example, a space between the first housing 510 and the second housing 520 or the second housing 520 and the third housing 530 may be partially folded.

According to an embodiment, the sub-display 517 may be exposed in a direction opposite to a direction in which the flexible display 540 is exposed to the outside and may display a screen by the electronic device 101. As an embodiment, a fourth touch sensor 541, 545, or 549 configured to detect a user's touch may be provided in the sub-display 517.

As an embodiment, the first motor 910 disposed in the first housing 510 may be configured to vibrate in a direction (e.g., the Z axis) perpendicular to a direction in which the first housing 510 extends. As an embodiment, the second motor 920 disposed in the third housing 530 may be configured to vibrate in a direction (e.g., the X axis or the Y axis) parallel to a direction in which the third housing 530 extends.

As an embodiment, the electronic device 101 may select and operate one of the first motor 910 or the second motor 920 having a vibration direction having a relatively large angle with the floor or ground on which the electronic device 101 is mounted, based on the arrangement direction of at least one of the first housing 510, the second housing 520, or the third housing 530 so as to improve the vibration force perception level of the electronic device 101 mounted on the floor.

As an embodiment, the electronic device 101 may select and operate one of the first motor 910 or the second motor 920 having a vibration direction having a relatively small angle with the floor or ground on which the electronic device 101 is mounted, based on the arrangement direction of at least one of the first housing 510, the second housing 520, or the third housing 530 so as to reduce the vibration force perception level of the electronic device 101 mounted on the floor.

Figure 14A:
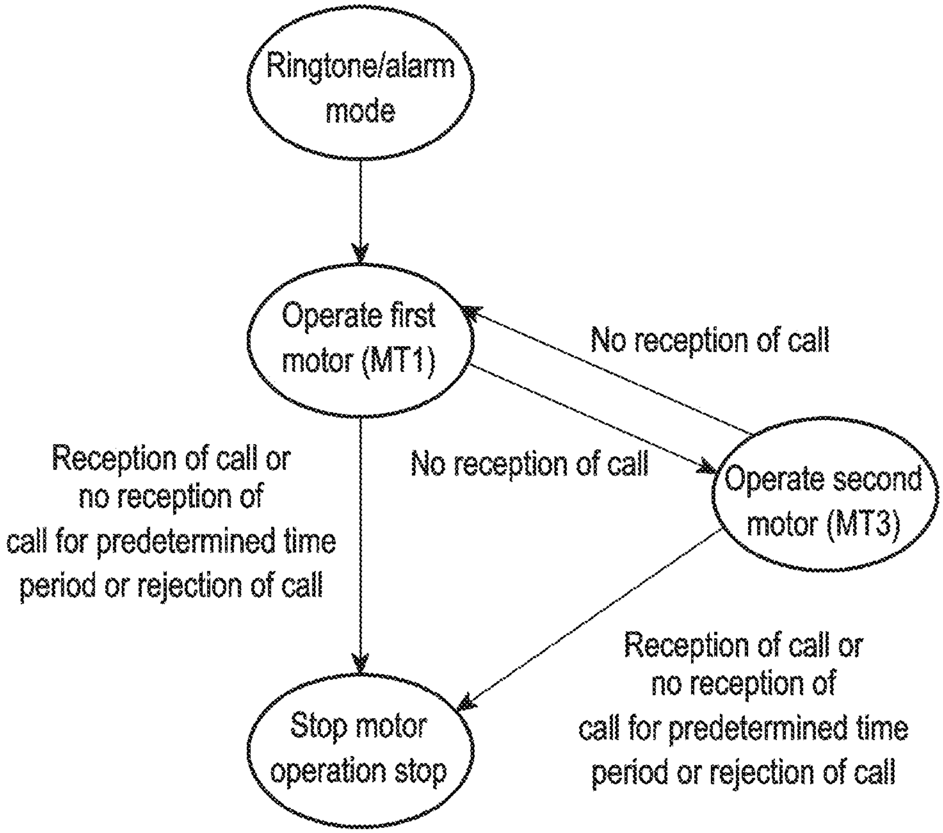
FIGS. 14A and 14B illustrate a control operation of an electronic device in case that a designated first condition is satisfied in relation to provision of repeated notifications according to an embodiment of the disclosure.
Figure 14B:
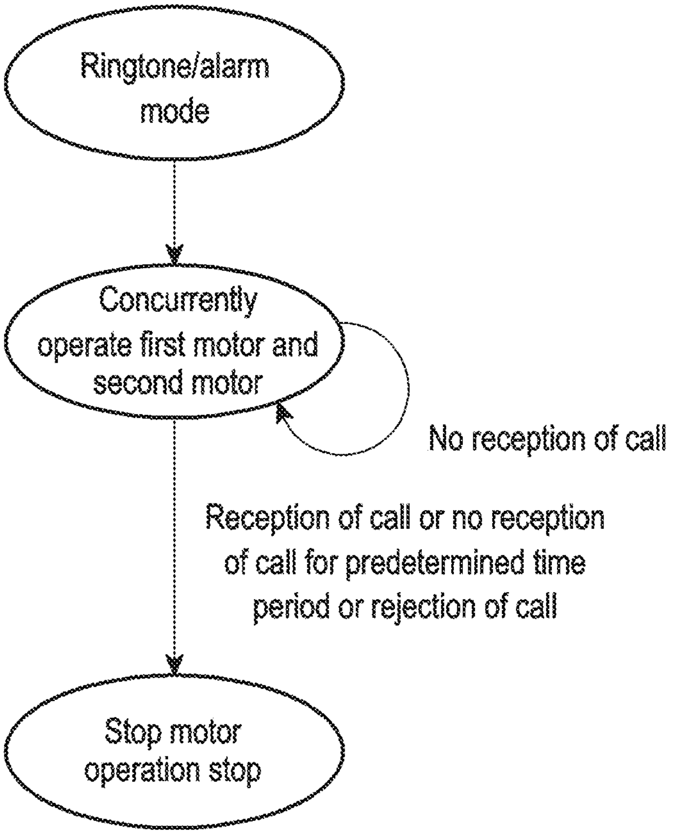

FIGS. 14A and 14B illustrate a control operation of an electronic device 101 in case that a designated first condition is satisfied in relation to provision of repeated notifications according to an embodiment of the disclosure.

Referring to FIGS. 14A and 14B, the electronic device 101 according to an embodiment may detect whether a designated first condition is satisfied in relation to provision of repeated notifications. For example, the designated first condition may be detected as satisfied in case that a call is received, a configured alarm is provided, or provision of repeated notifications is required. In an embodiment, the electronic device 101 may, in case that the designated first condition is satisfied in relation to provision of repeated notifications, enter a ringtone/alarm mode.

According to an embodiment, the electronic device 101 may alternately operate the first motor 910 and the second motor 920 in the ringtone/alarm mode as shown in FIG. 14A. According to an embodiment, the electronic device 101 may, in case that the call is not answered, or the alarm is not turned off, alternately operate the first motor 910 and the second motor 920 in a continuous repetitive manner. According to an embodiment, the electronic device 101 may, in case that a call is received, a designated time elapses, or a call or alarm is rejected, stop an operation of the first motor 910 and the second motor 920.

According to an embodiment, the electronic device 101 may concurrently operate the first motor 910 and the second motor 920 in the ringtone/alarm mode as shown in FIG. 14B. According to an embodiment, the electronic device 101 may, in case that the call is not answered, or the alarm is not turned off, concurrently operate the first motor 910 and the second motor 920 in a continuous repetitive manner. According to an embodiment, the electronic device 101 may, in case that a call is received, a designated time elapses, or a call or alarm is rejected, stop an operation of the first motor 910 and the second motor 920.

Figure 14C:
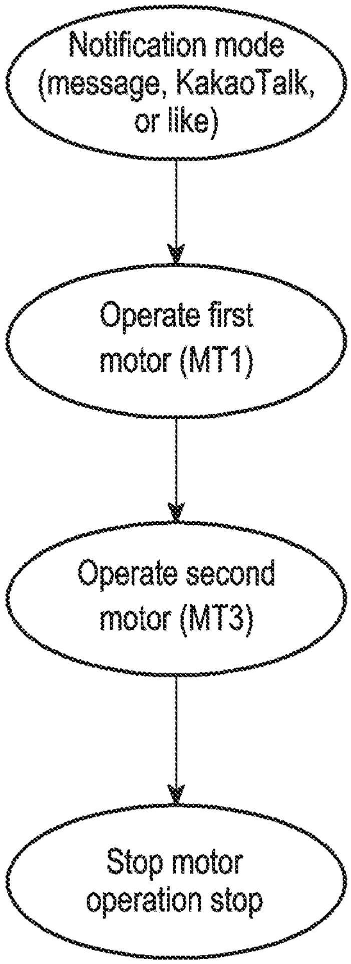
FIGS. 14C and 14D illustrate a control operation of an electronic device in case that a designated second condition is satisfied in relation to provision of a notification once or more according to an embodiment of the disclosure.
Figure 14D:
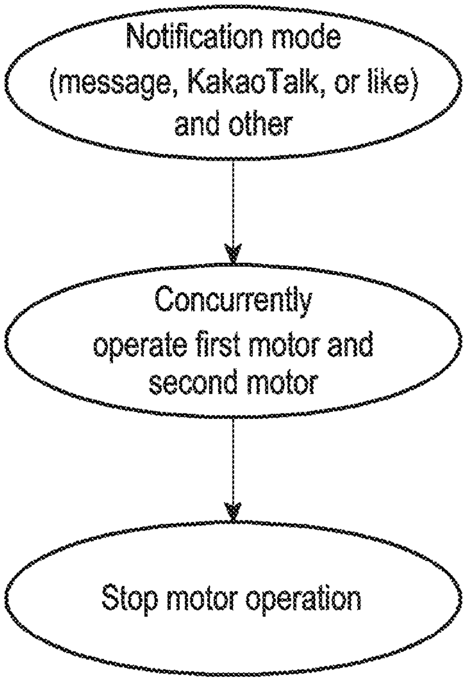

FIGS. 14C and 14D illustrate a control operation of an electronic device 101 in case that a designated second condition is satisfied in relation to provision of a notification once or more according to an embodiment of the disclosure.

Referring to FIGS. 14C and 14D, the electronic device 101 according to an embodiment may detect whether a designated second condition is satisfied in relation to provision of a notification once or more. For example, the designated second condition may be detected as satisfied in case that a text message is received, a messenger is received, or a notification of an application is received. In an embodiment, the electronic device 101 may, in case that the designated second condition is satisfied in relation to provision of a notification once or more, enter a notification mode.

According to an embodiment, the electronic device 101 may alternately operate the first motor 910 and the second motor 920 a designated number of times in the notification mode as shown in FIG. 14C. For example, the electronic device 101 may alternately operate the first motor 910 and the second motor 920 once each and stop an operation of the motor 910, 920, or 930.

According to an embodiment, the electronic device 101 may concurrently operate the first motor 910 and the second motor 920 a designated number of times in the notification mode as shown in FIG. 14D. For example, the electronic device 101 may concurrently operate the first motor 910 and the second motor 920 once each and stop an operation of the motor 910, 920, or 930.

Figure 15A:
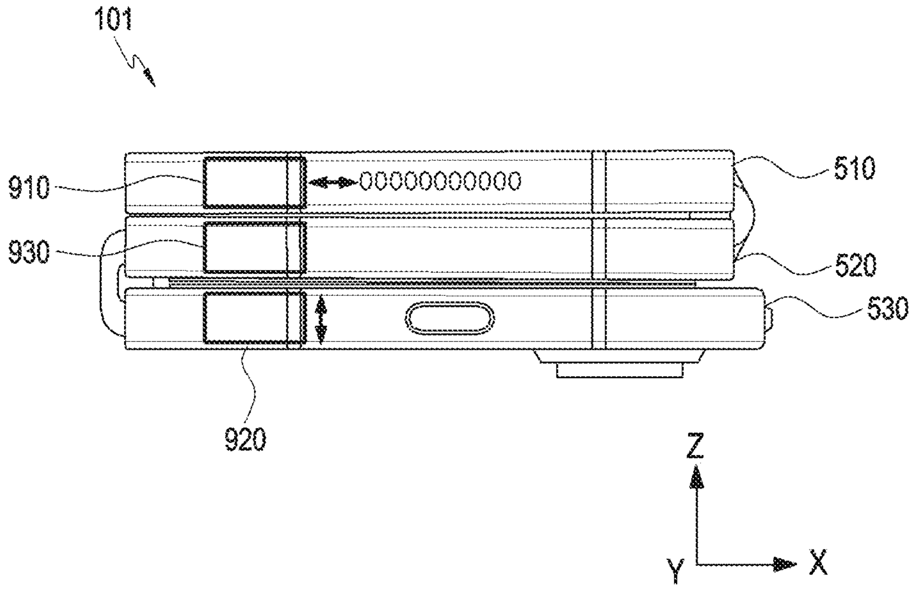
FIG. 15A illustrates a folding state of an electronic device according to an embodiment of the disclosure.
Figure 15B:
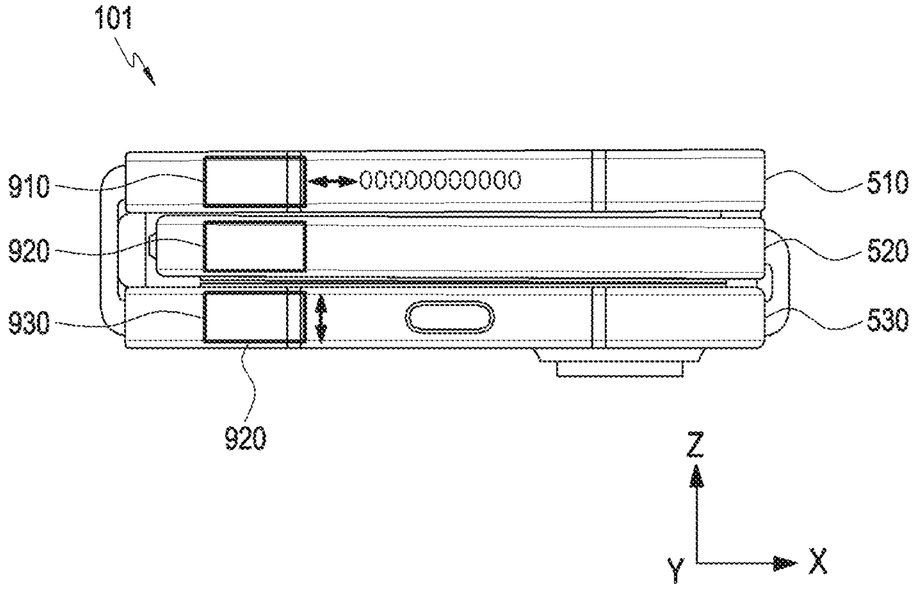
FIG. 15B illustrates a folding state of an electronic device according to an embodiment of the disclosure.

FIG. 15A illustrates a folding state of an electronic device 101 according to an embodiment of the disclosure. FIG. 15B illustrates a folding state of an electronic device according to an embodiment of the disclosure.

Referring to FIGS. 15A and 15B, the electronic device 101 according to an embodiment may include a first motor 910 disposed in the first housing 510, a second motor 930 disposed in the third housing 530, and a third motor 930 disposed in the second housing 520.

In an embodiment, the first motor 910, the second motor 920, and the third motor 930 may be configured to vibrate in different directions. In an embodiment, the first motor 910 may be configured to vibrate in a designated first direction. In an embodiment, the second motor 920 may be configured to vibrate in a designated second direction to be different from the designated first direction in which the first motor 910 vibrates. For example, the designated second direction may be configured to be a direction intersecting the designated first direction. For example, the designated second direction may be configured to be a direction orthogonal to the designated first direction. In an embodiment, the third motor 930 may be configured to vibrate in a designated third direction configured to be different from a designated first direction in which the first motor 910 vibrates and a designated second direction in which the second motor 920 vibrates. For example, the designated third direction may be configured to be a direction intersecting each of the designated first direction and the designated second direction. For example, the designated third direction may be configured to be a direction orthogonal to each of the designated first direction and the designated second direction.

By way of example, the vibration direction of the first motor 910, the second motor 920, and the third motor 930 may be configured as shown in Table 1 below.

TABLE 1

| | CASE1 | CASE2 | CASE3 | CASE4 | CASE5 | CASE6 |
|---|---|---|---|---|---|---|
| First motor | X direction | X direction | Y direction | Y direction | Z direction | Z direction |
| Second motor | Y direction | Z direction | X direction | Z direction | X direction | Y direction |
| Third motor | Z direction | Y direction | Z direction | X direction | Y direction | X direction |

According to an embodiment, the electronic device 101 may operate at least one of the first motor 910, the second motor 920, or the third motor 930 in the folding state, based on satisfaction of the designated first condition in relation to provision of repeated notifications or the designated second condition in relation to provision of a notification once or more. According to an embodiment, the electronic device 101 may operate at least one of the first motor 910, the second motor 920, or the third motor 930 in the folding state, regardless of the folding state or the grip state. As an embodiment, the electronic device 101 may, in case that the designated first condition in relation to provision of repeated notifications or the designated second condition is satisfied in relation to provision of a notification once or more, concurrently operate the first motor 910, the second motor 920, and the third motor 930 configured to vibrate in different directions. In an embodiment, the electronic device 101 may concurrently operate the first motor 910 and the second motor 920 in the folding state. In an embodiment, the electronic device 101 may concurrently operate the first motor 910 and the third motor 930 in the folding state. In an embodiment, the electronic device 101 may concurrently operate the second motor 920 and the third motor 930 in the folding state.

As an embodiment, the electronic device 101 may, in case that the designated first condition in relation to provision of repeated notifications or the designated second condition is satisfied in relation to provision of a notification once or more, sequentially operate at least one of the first motor 910, the second motor 920, or the third motor 930 configured to vibrate in different directions in the folding state.

As an embodiment, the electronic device 101 may, in case that the designated first condition in relation to provision of repeated notifications or the designated second condition is satisfied in relation to provision of a notification once or more, select and operate at least one designated from among the first motor 910, the second motor 920, or the third motor 930.

For example, the electronic device 101 may select and operate a motor (e.g., the second motor 920 in FIG. 15A or the third motor 930 in FIG. 15B) disposed in a housing (e.g., the third housing 530 in FIG. 15A or the second housing 520 in FIG. 15B) located on a lower portion thereof in the folding state. For example, the electronic device 101 may select and operate a motor (e.g., the first motor 910 in FIG. 15A or the first motor 910 in FIG. 15B) disposed in a housing (e.g., the first housing 510 in FIG. 15A or the first housing 510 in FIG. 15B) located on an upper portion thereof in the folding state. For example, the electronic device 101 may concurrently or sequentially operate the motor disposed in the housing located on the upper portion and the motor disposed in the housing located on the lower portion in the folding state.

Figure 15C:
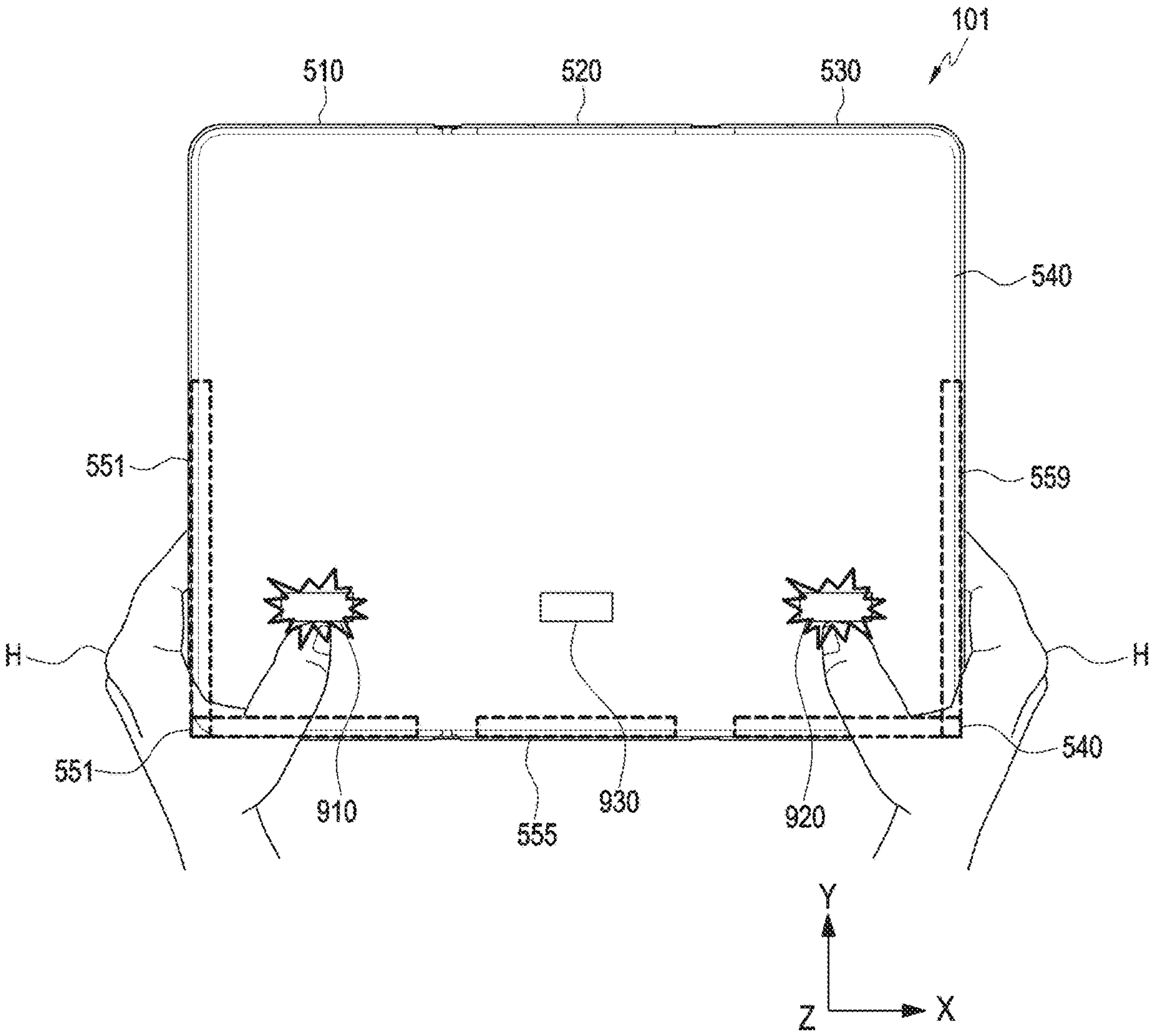
FIGS. 15C and 15D illustrate an unfolding state of an electronic device according to an embodiment of the disclosure.
Figure 15D:
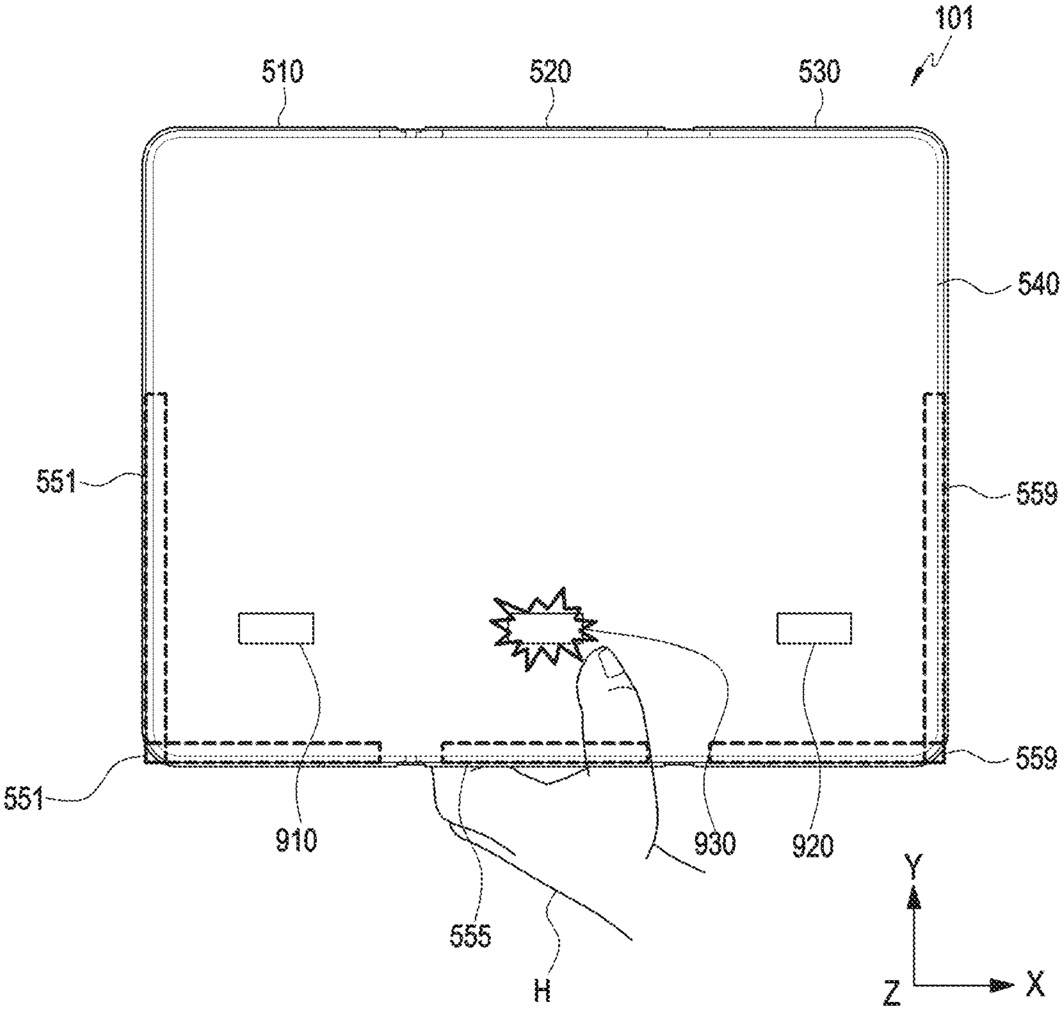

FIGS. 15C and 15D illustrate an unfolding state of an electronic device 101 according to an embodiment of the disclosure.

Referring to FIGS. 15C and 15D, in an embodiment, the electronic device 101 may identify whether the first housing 510, the second housing 520, or the third housing 530 is gripped and selectively operate at least one of the first motor 910, the second motor 920, or the third motor 930, based on the first housing 510, the second housing 520, or the third housing 530 being gripped or not.

In an embodiment, the electronic device 101 may operate at least one of the first motor 910, the second motor 920, or the third motor 930 disposed in a housing identified as being gripped among the first housing 510, the second housing 520, or the third housing 530.

As an embodiment, in case of identifying the grip of the first housing 510, the electronic device 101 may operate the first motor 910 based on satisfaction of a designated first condition in relation to provision of repeated notifications or a designated second condition in relation to provision of a notification once or more.

As an embodiment, in case of identifying the grip of the second housing 520, the electronic device 101 may operate the third motor 930 based on satisfaction of the designated first condition in relation to provision of repeated notifications or the designated second condition in relation to provision of a notification once or more.

As an embodiment, in case of identifying the grip of the third housing 530, the electronic device 101 may operate the second motor 920 based on satisfaction of the designated first condition in relation to provision of repeated notifications or the designated second condition in relation to provision of a notification once or more.

Figure 16A:
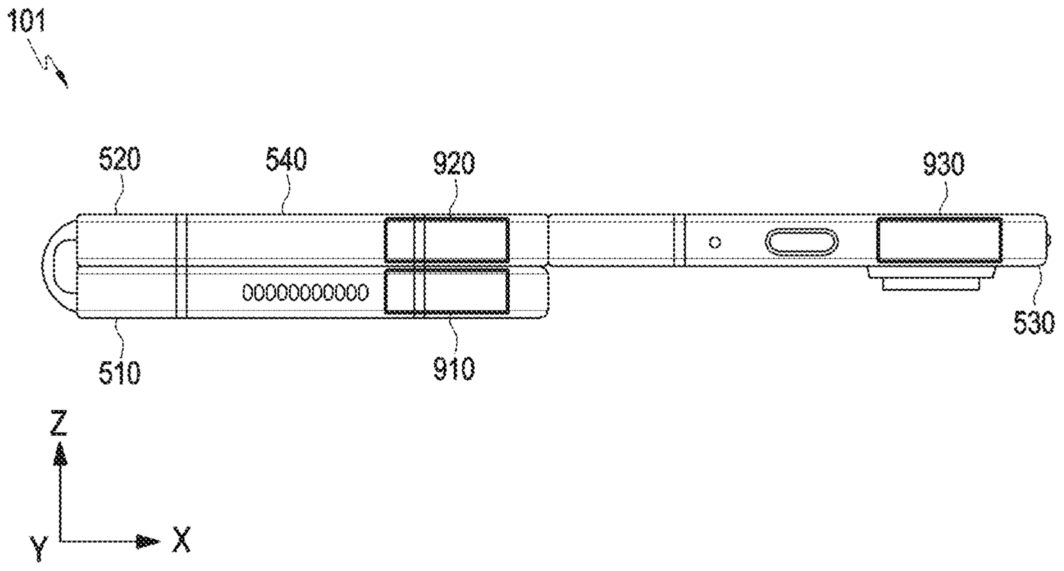
FIGS. 16A and 16B illustrate a state in which a portion of an electronic device is folded according to an embodiment of the disclosure.
Figure 16B:
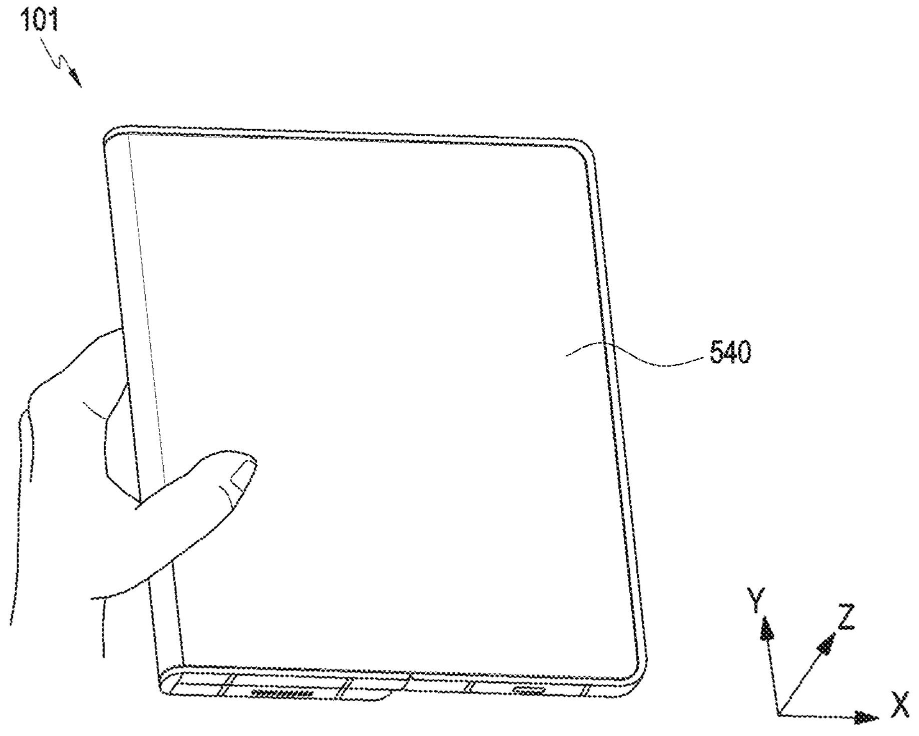

FIGS. 16A and 16B illustrate a state in which a portion of an electronic device 101 is folded according to an first embodiment of the disclosure.

Referring to FIGS. 16A and 16B, in the electronic device 101 according to an embodiment, only a portion of the first housing 510, the second housing 520, and the third housing 530 may be folded. For example, as shown in the drawing, the electronic device 101 may be in a state in which the first housing 510 and the second housing 520 are folded and the second housing 520 and the third housing 530 are unfolded. For example, folding of the first housing 510 and the second housing 520 may cause the first display area of the flexible display 540 to be exposed facing downward and the second display area of the flexible display 540 to be exposed facing upward.

According to an embodiment, the electronic device 101 may identify the folding state of the electronic device 101 by using a measurement value of one of the first grip sensor 551, the second grip sensor 555, the third grip sensor 559, the first touch sensor 541, the second touch sensor 545, or the third touch sensor 549. As an embodiment, the electronic device 101 may, in case that the designated first condition in relation to provision of repeated notifications or the designated second condition is satisfied in relation to provision of a notification once or more, operate at least one of the first motor 910, the second motor 920, or the third motor 930 based on the grip state of the electronic device 101.

For example, as shown in FIG. 16B, the first housing 510 and the second housing 520 in the folding state may be gripped by the user, and the electronic device 101 may identify the grip state of the electronic device 101 by using a measurement value of the first grip sensor 551 and/or the second grip sensor 555. As an embodiment, the electronic device 101 may, in case that the designated first condition in relation to provision of repeated notifications or the designated second condition is satisfied in relation to provision of a notification once or more, select and operate the first motor 910 and/or the third motor 930 based on the identified grip state of the electronic device 101.

Figure 17A:
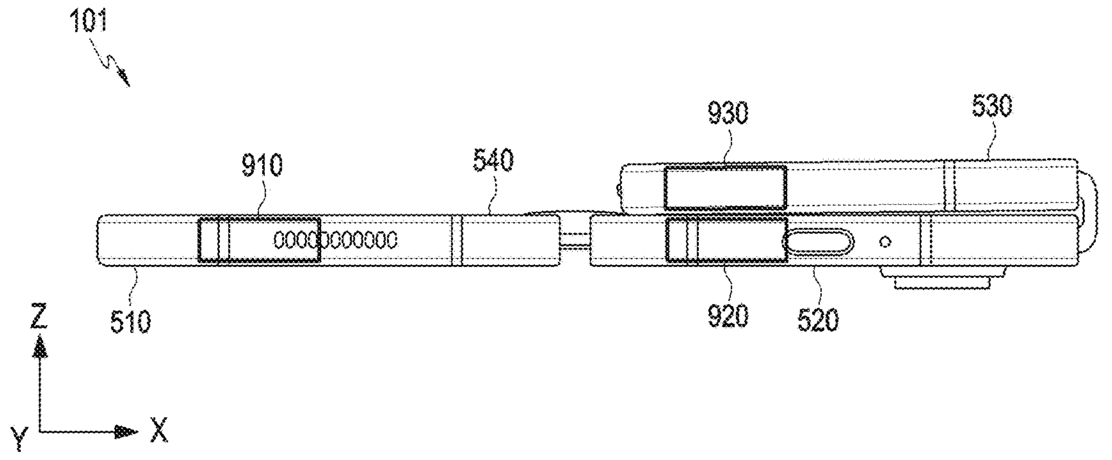
FIGS. 17A and 17B illustrate a state in which a portion of an electronic device is folded according to an embodiment of the disclosure.
Figure 17B:
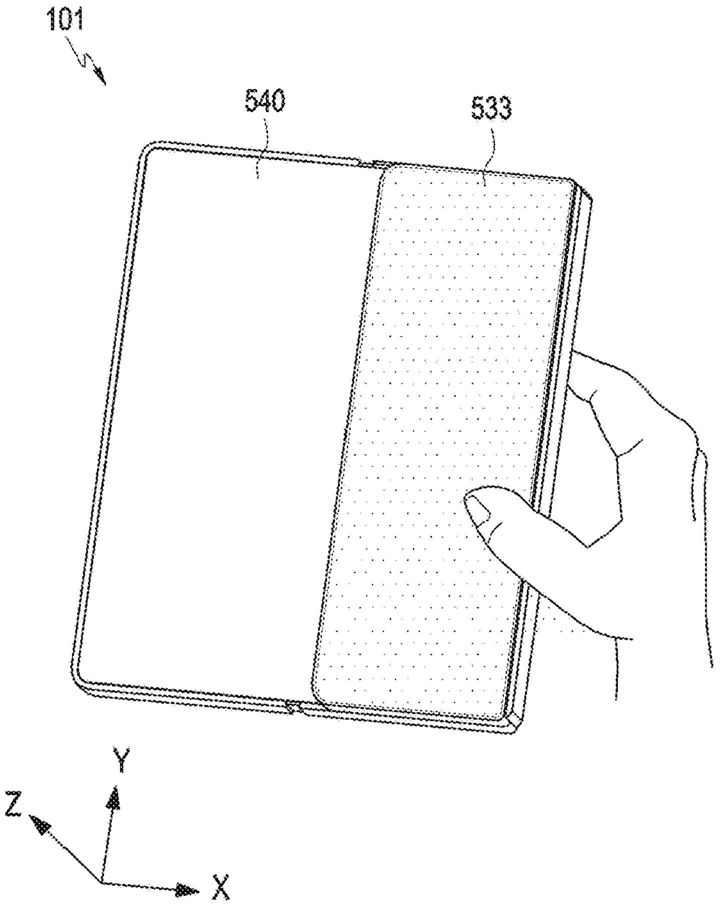

FIGS. 17A and 17B illustrate a state in which a portion of an electronic device 101 is folded according to an embodiment of the disclosure.

Referring to FIGS. 17A and 17B, in the electronic device 101 according to an embodiment, only a portion of the first housing 510, the second housing 520, and the third housing 530 may be folded. For example, as shown in the drawing, the electronic device 101 may be in a state in which the second housing 520 and the third housing 530 are folded and the first housing 510 and the second housing 520 are unfolded. For example, folding of the second housing 520 and the third housing 530 may cause the second display area and the third display area of the flexible display 540 not to be exposed while in contact with each other and the first display area of the flexible display 540 to be exposed facing upward.

According to an embodiment, the electronic device 101 may identify the folding state of the electronic device 101 by using a measurement value of one of the first grip sensor 551, the second grip sensor 555, the third grip sensor 559, the first touch sensor 541, the second touch sensor 545, or the third touch sensor 549. As an embodiment, the electronic device 101 may, in case that the designated first condition in relation to provision of repeated notifications or the designated second condition is satisfied in relation to provision of a notification once or more, operate at least one of the first motor 910, the second motor 920, or the third motor 930 based on the grip state of the electronic device 101.

For example, as shown in FIG. 17B, in case that the second housing 520 and the third housing 530 in the folded state are gripped by the user, the rear cover 523 of the second housing 520 and the rear cover 533 of the third housing 530 may be gripped by the user so that the grip state of the electronic device 101 may not be identified using a measurement value of the second grip sensor 555, the third grip sensor 559, the second touch sensor 545, or the third touch sensor 549. In this case, according to an embodiment, the electronic device 101 may operate in other modes for selecting and operating the second motor 920 and the third motor 930. In an embodiment, the electronic device 101 may operate all the first motor 910, the second motor 920, and the third motor 930 or identify the folding state of the electronic device 101 and operate at least one of the first motor 910, the second motor 920, or the third motor 930 based on the identified folding state.

FIGS. 18A, 18B, 18C, and 18D illustrate a control operation of an electronic device 101 in case that a designated first condition is satisfied in relation to provision of repeated notifications according to an embodiment of the disclosure.

Referring to FIGS. 18A, 18B, 18C, and 18D, the electronic device 101 according to an embodiment may detect whether the designated first condition is satisfied in relation to provision of repeated notifications.

Figure 18A:
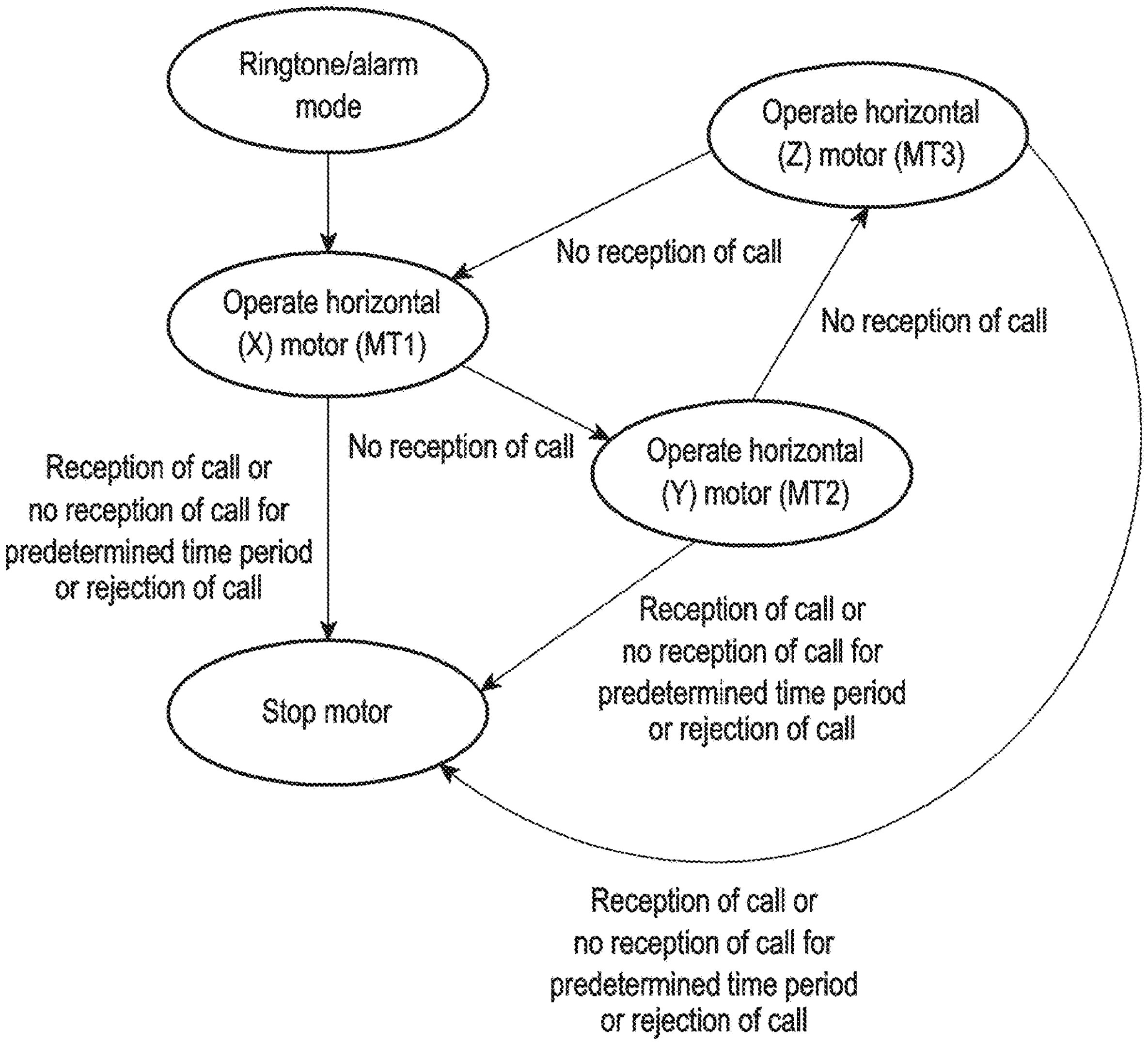
FIGS. 18A, 18B, 18C, and 18D illustrate a control operation of an electronic device in case that a designated first condition is satisfied in relation to provision of repeated notifications according to an embodiment of the disclosure.

According to an embodiment, the electronic device 101 may alternately operate the first motor 910, the second motor 920, and the third motor 930 in the ringtone/alarm mode as shown in FIG. 18A. According to an embodiment, the electronic device 101 may, in case that the call is not answered, or the alarm is not turned off, alternately operate the first motor 910, the second motor 920, and the third motor 930 in a continuous repetitive manner. According to an embodiment, the electronic device 101 may, in case that a call is received, a designated time elapses, or a call or alarm is rejected, stop an operation of the first motor 910, the second motor 920, and the third motor 930. Here, it is assumed, but not limited to, that the first motor 910 vibrates in the horizontal (X) direction, the second motor 920 vibrates in the horizontal (Y) direction, and the third motor 930 vibrates in the vertical (Z) direction.

Figure 18B:
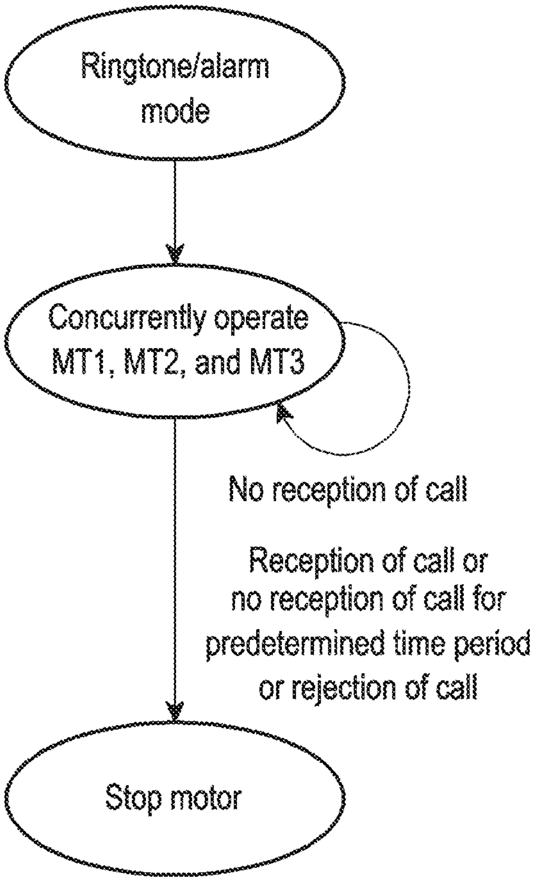

According to an embodiment, the electronic device 101 may concurrently operate the first motor 910, the second motor 920, and the third motor 930 in the ringtone/alarm mode as shown in FIG. 18B. According to an embodiment, the electronic device 101 may, in case that the call is not answered, or the alarm is not turned off, concurrently operate the first motor 910, the second motor 920, and the third motor 930 in a continuous repetitive manner. According to an embodiment, the electronic device 101 may, in case that a call is received, a designated time elapses, or a call or alarm is rejected, stop an operation of the first motor 910, the second motor 920, and the third motor 930.

Figure 18C:
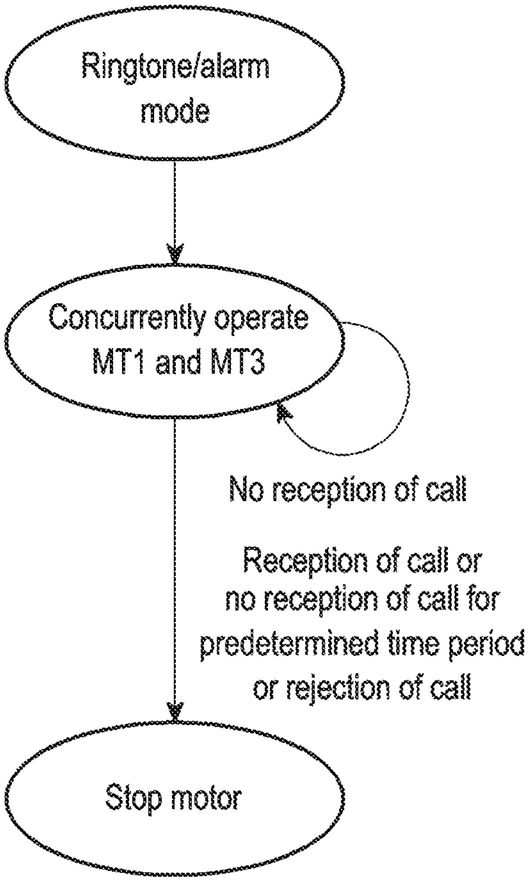
Figure 18D:
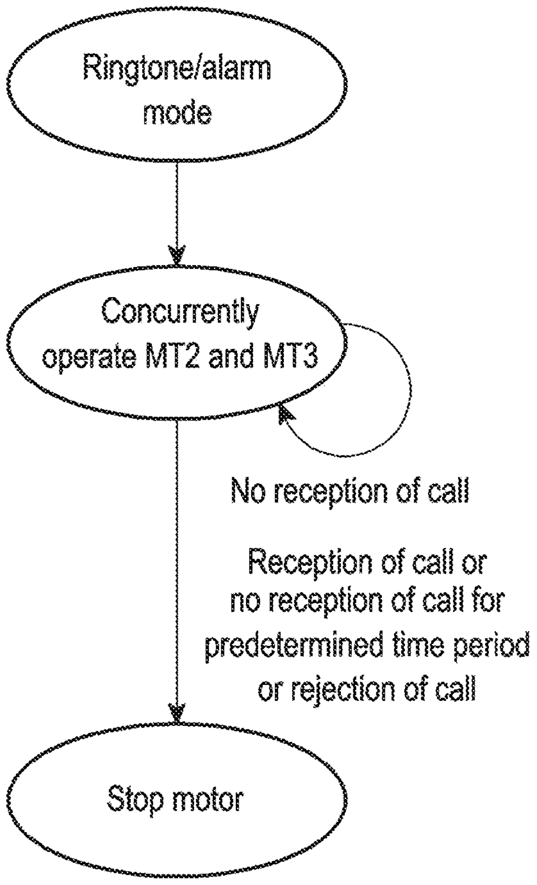

According to an embodiment, the electronic device 101 may concurrently operate the first motor 910 and the third motor 930 in the ringtone/alarm mode as shown in FIG. 18C. According to an embodiment, the electronic device 101 may concurrently operate the second motor 920 and the third motor 930 in the ringtone/alarm mode as shown in FIG. 18D. For example, the electronic device 101 may concurrently operate one of the motors 910, 920, and 930 vibrating in a direction parallel to the plane in which the first housing 510, the second housing 520, or the third housing 530 extends, and another of the motors 910, 920, and 930 vibrating in a direction perpendicular to the plane in which the first housing 510, the second housing 520, or the third housing 530 extends.

Figure 18E:
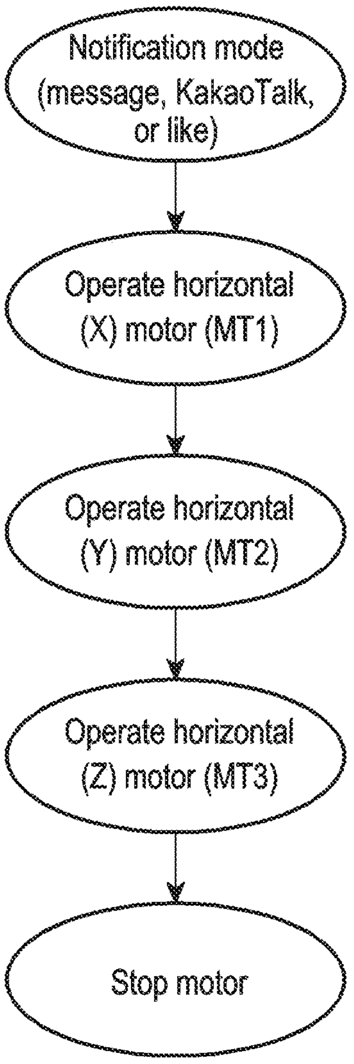
FIGS. 18E, 18F, and 18G illustrate a control operation of an electronic device in case that a designated second condition is satisfied in relation to provision of a notification once or more according to an embodiment of the disclosure.
Figure 18F:
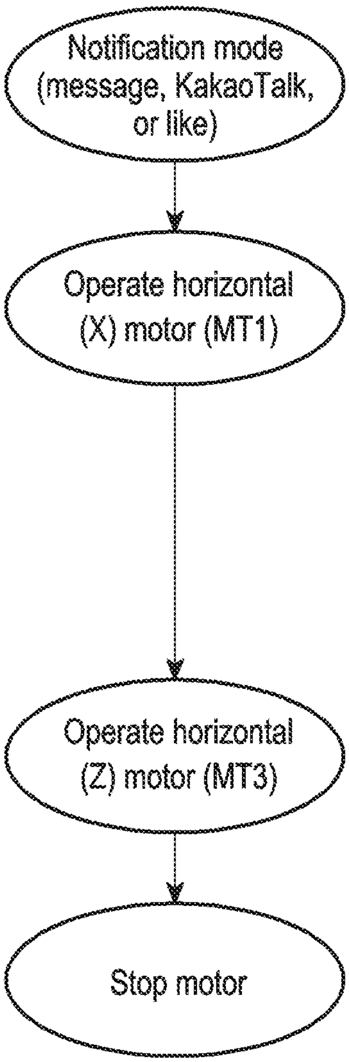
Figure 18G:
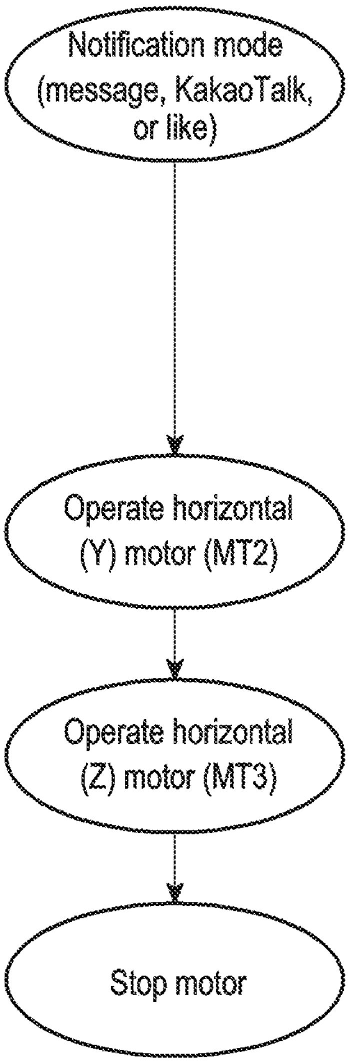

FIGS. 18E, 18F, and 18G illustrate a control operation of an electronic device 101 in case that a designated second condition is satisfied in relation to provision of a notification once or more according to an embodiment of the disclosure.

Referring to FIGS. 18E, 18F, and 18G, the electronic device 101 according to an embodiment may detect whether the designated second condition is satisfied in relation to provision of a notification once or more.

According to an embodiment, the electronic device 101 may alternately operate the first motor 910, the second motor 920, and the third motor 930 a designated number of times in the notification mode as shown in FIG. 18E. For example, the electronic device 101 may alternately operate the first motor 910, the second motor 920, and the third motor 930 once each and stop an operation of the motor 910, 920, or 930.

According to an embodiment, the electronic device 101 may alternately operate the first motor 910 and the third motor 930 a designated number of times in the notification mode as shown in FIG. 18F. For example, the electronic device 101 may alternately operate the first motor 910 and the second motor 920 once each and stop an operation of the motor 910, 920, or 930. According to an embodiment, the electronic device 101 may alternately operate the second motor 920 and the third motor 930 a designated number of times in the notification mode as shown in FIG. 18G. For example, the electronic device 101 may alternately operate the second motor 920 and the third motor 930 once each and stop an operation of the motor 910, 920, or 930. For example, the electronic device 101 may alternately operate one of the motors 910, 920, and 930 vibrating in a direction parallel to the plane in which the first housing 510, the second housing 520, or the third housing 530 extends, and another of the motors 910, 920, and 930 vibrating in a direction perpendicular to the plane in which the first housing 510, the second housing 520, or the third housing 530 extends.

Figure 19:
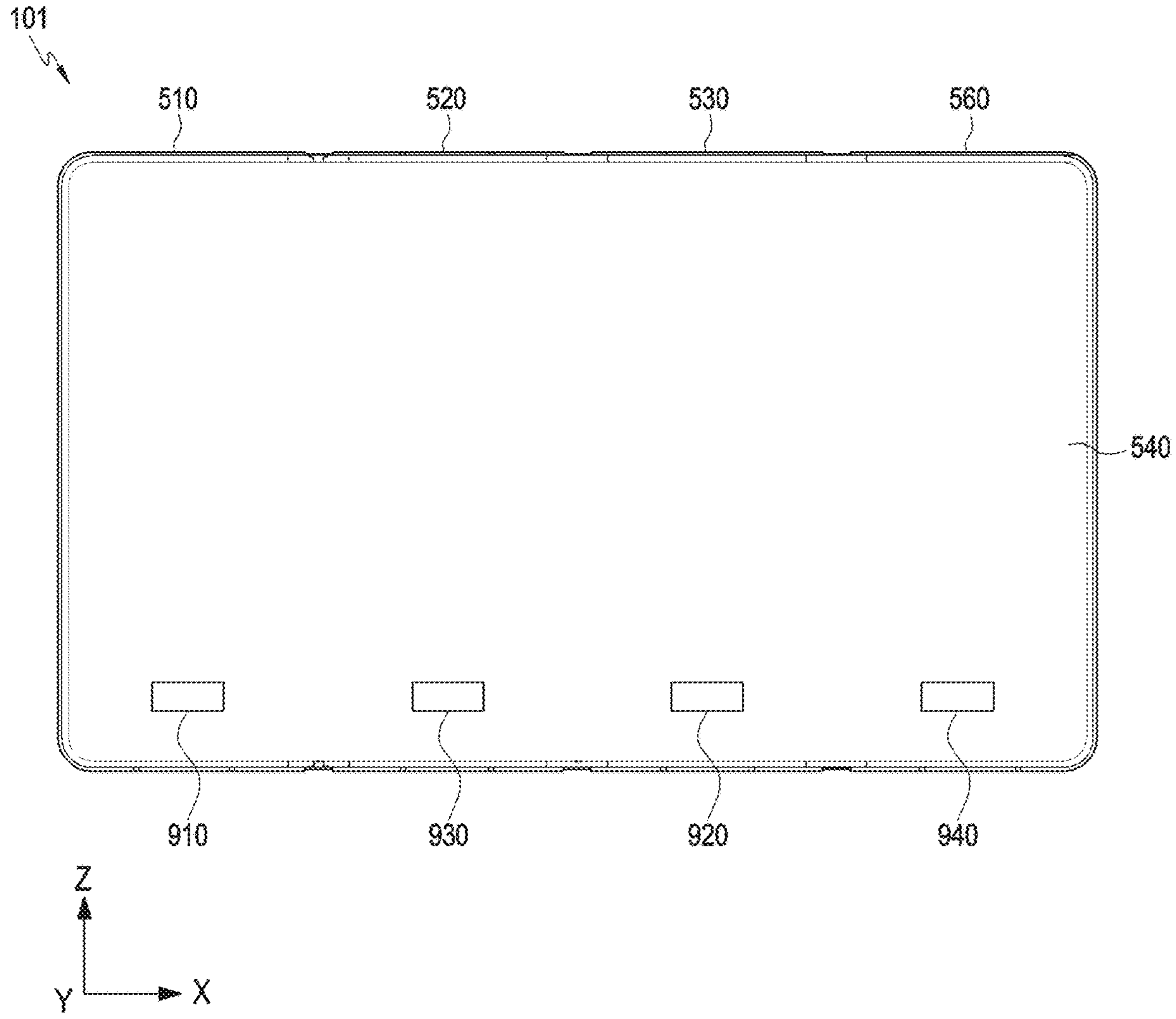
FIG. 19 is a front view illustrating an electronic device according to an embodiment of the disclosure.

FIG. 19 is a front view illustrating an electronic device 101 according to an embodiment of the disclosure.

Referring to FIG. 19, the electronic device 101 according to an embodiment may include a first housing 510, a second housing 520, a third housing 530, and a fourth housing 560 provided to correspond to each of different areas of the flexible display 540. For example, the second housing 520 may be rotatably coupled to the first housing 510 to be foldable while overlapping the first housing 510 in the upward and downward direction. For example, the third housing 530 may be rotatably coupled to the second housing 520 to be foldable while overlapping the second housing 520 in the upward and downward direction. For example, the third housing 530 may be rotatably coupled to the second housing 520 to be foldable while overlapping the second housing 520 in the upward and downward direction. For example, the fourth housing 560 may be rotatably coupled to the third housing 530 to be foldable while overlapping the third housing 530 in the upward and downward direction.

On the electronic device 101 according to an embodiment, multiple motors 910, 920, and 930 may be mounted. For example, two motors 910, 920, and 930 may be mounted on the electronic device 101. As an embodiment, in the electronic device 101, a first motor 910 disposed in the first housing 510 and a third motor 930 disposed in the third housing 530 may be provided. For example, the first motor 910 and the third motor 930 may be configured to vibrate in directions intersecting each other. By way of example, the first motor 910 may be configured to vibrate in the X-axis direction, and the third motor 930 may be configured to vibrate in the Z-axis direction. By way of example, the first motor 910 may be configured to vibrate in the Z-axis direction, and the third motor 930 may be configured to vibrate in the X-axis direction.

According to an embodiment, three motors 910, 920, and 930 may be mounted on the electronic device 101. In an embodiment, the electronic device 101 may include the first motor 910 disposed in the first housing 510 and a fourth motor 940 disposed in the fourth housing 560 and further include one of the second motor 920 disposed in the second housing 520 and the third motor 930 disposed in the third housing 530. For example, three motors 910, 920, and 930 mounted on the electronic device 101 may be configured to vibrate in directions intersecting each other.

By way of example, the vibration directions of the three motors 910, 920, and 930 (e.g., the first motor 910 and the fourth motor 940 and one of the second motor 920 or the third motor 930) may be configured as shown in Table 2 below.

TABLE 2

| | CASE1 | CASE2 | CASE3 | CASE4 | CASE5 | CASE6 |
|---|---|---|---|---|---|---|
| First motor | X direction | X direction | Y direction | Y direction | Z direction | Z direction |
| Second motor | Y direction | | X direction | | X direction | |
| Third motor | | Y direction | | Z direction | | Y direction |
| Fourth motor | Z direction | Z direction | Z direction | X direction | Y direction | X direction |

In an embodiment, the electronic device 101 may identify a folding state of the electronic device 101 according to folding of the second housing 520 or folding of the third housing 530 based on at least one measurement value.

In an embodiment, the electronic device 101 may identify an arrangement direction of the first housing 510, the second housing 520, or the third housing 530 based on at least one measurement value acquired from a first acceleration sensor disposed in the first housing 510, a second acceleration sensor disposed in the second housing 520, or a third acceleration sensor disposed in the third housing 530, and identify a folding state of the electronic device 101 based on the identified arrangement direction of first housing 510, the second housing 520, or the third housing 530.

According to an embodiment, four motors 910, 920, and 930 may be mounted on the electronic device 101. In an embodiment, the electronic device 101 may include the first motor 910 disposed in the first housing 510, the second motor 920 disposed in the second housing 520, the third motor 930 disposed in the third housing 530, and the fourth motor 940 disposed in the fourth housing 560. For example, three motors among the four motors 910, 920, and 930 mounted on the electronic device 101 may be configured to vibrate in directions intersecting each other. By way of example, the vibration direction of the first motor 910, the second motor 920, the third motor 930, and the fourth motor 940 may be configured as shown in Table 3 below.

TABLE 3

| | CASE1 | CASE2 | CASE3 | CASE4 | CASE5 | CASE6 | CASE7 | CASE8 |
|---|---|---|---|---|---|---|---|---|
| First motor | X direction | X direction | Y direction | Y direction | Z direction | Z direction | X direction | Z direction |
| Second motor | Y direction | Y direction | X direction | Z direction | X direction | Z direction | Y direction | Z direction |
| Third motor | Y direction | Y direction | X direction | Z direction | X direction | Y direction | Z direction | X direction |
| Fourth motor | Z direction | Z direction | Z direction | X direction | Y direction | X direction | Z direction | Y direction |

According to an embodiment, the electronic device 101 may identify a grip state with respect to at least one of at least two housings, based on at least one measurement value in operation 2030. In an embodiment, the electronic device 101 may identify whether at least one of the first housing 510, the second housing 520, or the third housing 530 is gripped.

For example, the electronic device 101 may identify whether the first housing 510 is gripped, based on at least one measurement value acquired from the first grip sensor 551 or the first touch sensor 541 disposed in the first housing 510.

Figure 20:
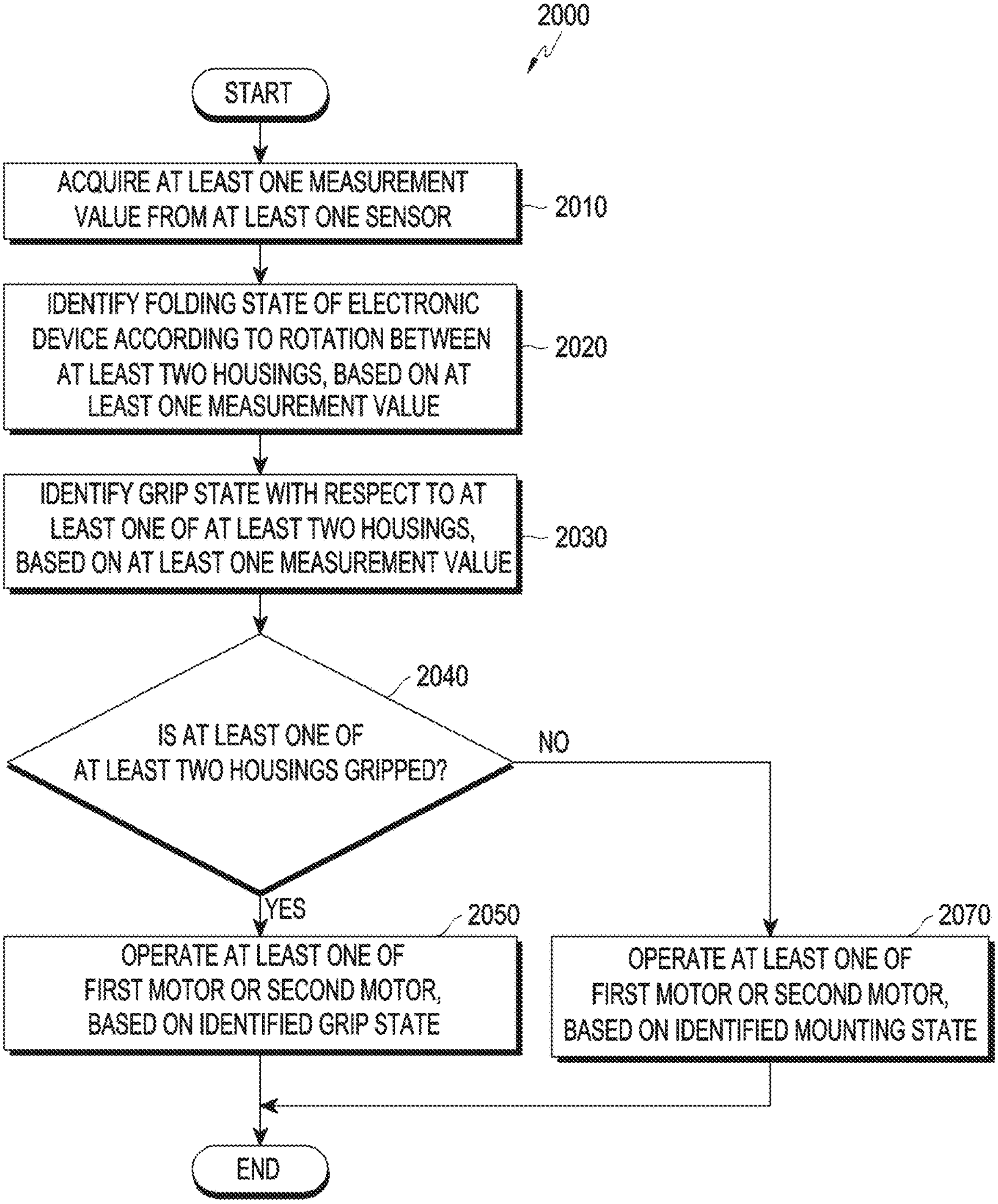
FIG. 20 is a flowchart illustrating an operation method of an electronic device according to an embodiment of the disclosure.

FIG. 20 is a flowchart 2000 illustrating an operation method of an electronic device 101 according to an embodiment of the disclosure. Referring to FIG. 20, the electronic device 101 according to an embodiment may acquire at least one measurement value from at least one sensor in operation 2010. For example, the at least one sensor may correspond to an acceleration sensor, a touch sensor 541, 545, or 549, or a grip sensor 551, 555, or 559 disposed in a first housing 510, a second housing 520, or a third housing 530.

According to an embodiment, the electronic device 101 may identify a folding state of the electronic device according to rotation between the at least two housings, based on the at least one measurement value in operation 2020.

For example, the electronic device 101 may identify whether the second housing 520 is gripped, based on at least one measurement value acquired from the second grip sensor 545 or the second touch sensor 555 disposed in the second housing 520.

For example, the electronic device 101 may identify whether the third housing 530 is gripped, based on at least one measurement value acquired from the third grip sensor 559 or the third touch sensor 549 disposed in the third housing 530.

According to an embodiment, the electronic device 101 may, in operation 2040, identify whether at least one of the first housing 510, the second housing 520, or the third housing 530 is gripped.

According to an embodiment, the electronic device 101 may, in case of identifying that at least one of the first housing 510, the second housing 520, or the third housing 530 is gripped (operation 2040—Yes), operate, in operation 2050, at least one of a first motor 910 or a second motor 920, based on the identified grip state.

According to an embodiment, the electronic device 101 may, in case that a designated first condition in relation to provision of repeated notifications or a designated second condition is satisfied in relation to provision of a notification once or more, operate at least one of a first motor 910 or a second motor 920, based on the identified grip state.

For example, the electronic device 101 may, in case of identifying that the first housing 510 is gripped, selectively operate the first motor 910. For example, the electronic device 101 may, in case of identifying that the third housing 530 is gripped, selectively operate the second motor 920. For example, the electronic device 101 may, in case of identifying that the second housing 520 is gripped, selectively operate the first motor 910 or the third motor 930 or concurrently operate the first motor 910 and the third motor 930.

According to an embodiment, the electronic device 101 may, in case of identifying that none of the first housing 510, the second housing 520, and the third housing 530 is gripped (operation 2040—No), operate, in operation 2070, at least one of the first motor 910 or the second motor 920, based on the identified folding state of the electronic device 101.

According to an embodiment, the electronic device 101 may identify a vibration direction of the first motor 910 or the second motor 920 with respect to the floor or the ground on which the electronic device 101 is mounted, based on the arrangement direction of at least one of the first housing 510, the second housing 520, or the third housing 530. In an embodiment, the electronic device 101 may select and operate one of the first motor 910 or the second motor 920 having a vibration direction having a relatively large angle with the floor or the ground on which the electronic device 101 is mounted.

According to an embodiment, the electronic device 101 may select and operate one of the first motor 910 or the second motor 920 having a vibration direction having a relatively small angle with the floor or the ground on which the electronic device 101 is mounted.

Figure 21:
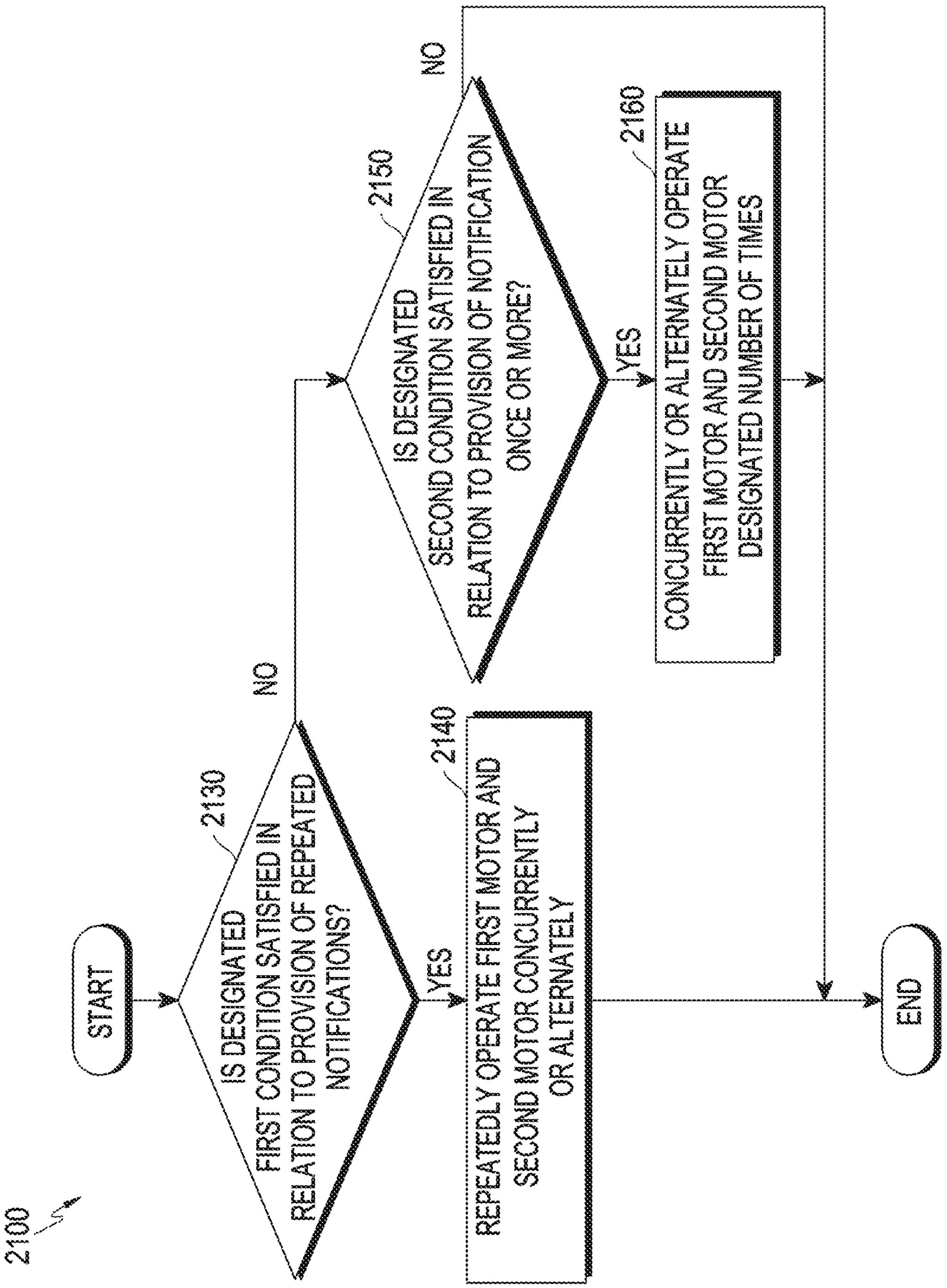
FIG. 21 is a flowchart illustrating an operation method of an electronic device according to an embodiment of the disclosure.

FIG. 21 is a flowchart 2100 illustrating an operation method of an electronic device 101 according to an embodiment of the disclosure.

Referring to FIG. 21, the electronic device 101 according to an embodiment may detect, in operation 2110, whether a designated first condition is satisfied in relation to provision of repeated notifications.

According to an embodiment, the electronic device 101 may, in case of identifying that the designated first condition is satisfied in relation to provision of repeated notifications (operation 2110—Yes), repeatedly operate the first motor 910 and the second motor 920 concurrently or alternately in operation 2140.

According to an embodiment, the electronic device 101 may, in case of identifying that the designated first condition is satisfied in relation to provision of repeated notifications, enter a ringtone/alarm mode. According to an embodiment, the electronic device 101 may alternately operate the first motor 910 and the second motor 920 in the ringtone/alarm mode. According to an embodiment, the electronic device 101 may, in case that the call is not answered, or the alarm is not turned off, alternately operate the first motor 910 and the second motor 920 in a continuous repetitive manner.

According to an embodiment, the electronic device 101 may concurrently operate the first motor 910 and the second motor 920 in the ringtone/alarm mode. According to an embodiment, the electronic device 101 may, in case that the call is not answered, or the alarm is not turned off, concurrently operate the first motor 910 and the second motor 920 in a continuous repetitive manner.

According to an embodiment, the electronic device 101 may, in case that a call is received, a designated time elapses, or a call or alarm is rejected, stop an operation of the first motor 910 and the second motor 920.

According to an embodiment, the electronic device 101 may, in case of identifying that the designated first condition in relation to provision of repeated notifications is not satisfied (operation 2110—No), identify, in operation 2150, whether the designated second condition is satisfied in relation to provision of a notification once or more.

According to an embodiment, the electronic device 101 may, in case of identifying that the designated second condition is satisfied in relation to provision of a notification once or more (operation 2150—Yes), concurrently or alternately operate the first motor 910 and the second motor 920 a designated number of times in operation 2160.

According to an embodiment, the electronic device 101 may, in case of identifying that the designated second condition is satisfied in relation to provision of a notification once or more, enter a notification mode.

According to an embodiment, the electronic device 101 may alternately operate the first motor 910 and the second motor 920 a designated number of times in the notification mode. For example, the electronic device 101 may alternately operate the first motor 910 and the second motor 920 once each and stop an operation of the motor 910, 920, or 930.

According to an embodiment, the electronic device 101 may concurrently operate the first motor 910 and the second motor 920 a designated number of times in the notification mode. For example, the electronic device 101 may concurrently operate the first motor 910 and the second motor 920 once each and stop an operation of the motor 910, 920, or 930.

According to an embodiment, the electronic device 101 may, in case of identifying that the designated second condition is not satisfied in relation to provision of a notification once or more (operation 2150—No), not operate the first motor 910 and the second motor 920.

Figure 22:
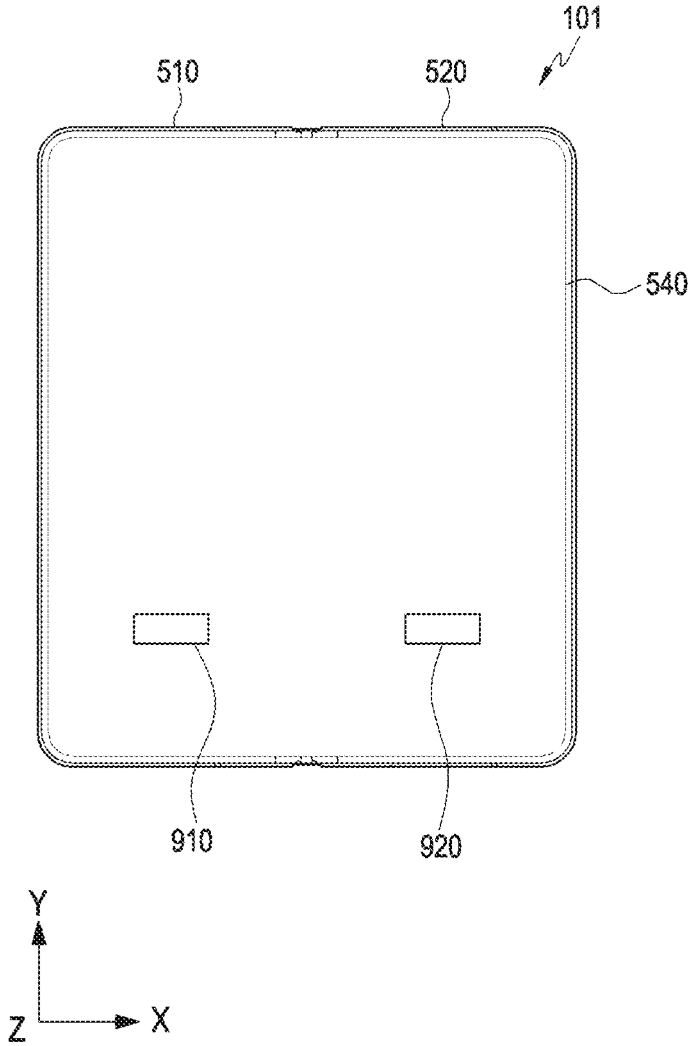
FIG. 22 is a front view illustrating an electronic device according to an embodiment of the disclosure.

FIG. 22 is a front view illustrating an electronic device 101 according to an embodiment of the disclosure.

Referring to FIG. 22, the electronic device 101 according to an embodiment may include a first housing 510 and a second housing 520 which are rotatably coupled to each other. In an embodiment, the electronic device 101 may include the first housing 510 and the second housing 520 rotatably coupled through a hinge structure such that a folding state may be changed by rotation between the first housing 510 and the second housing 520.

In an embodiment, the electronic device 101 may be fixed at various angles between a folded state of the electronic device 101 in which the first housing 510 and the second housing 520 are overlapped in an upward and downward direction so that the flexible display 540 is in contact with each other, and an unfolded state of the electronic device 101 in which the first housing 510 and the second housing 520 are positioned adjacent to each other in a lateral direction so that the flexible display 540 is unfolded.

In an embodiment, the first motor 910 may be mounted on the first housing 510, and the second motor 920 may be mounted on the second housing 520. For example, the first motor 910 and the second motor 920 may be configured to vibrate in different directions.

According to an embodiment, an electronic device 101 may include at least two housings 510, 520, 530, 210, and 220 rotatably coupled to each other, a flexible display 540, 160, or 250 disposed on the at least two housings 510, 520, 530, 210, and 220, a first vibration motor 910 or 400 disposed in a first housing 510 or 210 included in the at least two housings 510, 520, 530, 210, and 220, a second vibration motor 920 or 400 disposed in a second housing 520, 530, or 220 included in the at least two housings 510, 520, 530, 210, and 220 and configured to vibrate in a direction different from that of the first vibration motor 910 or 400, at least one first sensor 531, 535, or 539, at least one second sensor 551, 555, 559, 541, 545, or 549, memory 130 configured to store instructions, and at least one processor 120.

The instructions, when executed by the at least one processor 120, may cause the electronic device 101 to acquire at least one measurement value from the at least one first sensor 531, 535, or 539 and the at least one second sensor 551, 555, 559, 541, 545, or 549. The instructions, when executed by the at least one processor 120, may cause the electronic device 101 to identify a folding state of the electronic device 101 according to rotation between the at least two housings 510, 520, 530, 210, and 220, based on the at least one measurement value. The instructions, when executed by the at least one processor 120, may cause the electronic device 101 to identify a grip state with respect to at least one of the at least two housings 510, 520, 530, 210, and 220, based on the at least one measurement value. The instructions, when executed by the at least one processor 120, may cause the electronic device 101 to operate at least one of the first vibration motor 910 or 400 or the second vibration motor 920 or 400, based on the identified folding state and the identified grip state.

In the electronic device 101 according to an embodiment, a vibration direction of the first vibration motor 910 or 400 may be a direction intersecting a vibration direction of the second vibration motor 920 or 400.

In the electronic device 101 according to an embodiment, the vibration direction of the first vibration motor 910 or 400 may be configured to be parallel with a direction in which the first housing 510 or 210 and the second housing 520 or 220 are coupled to extend. The vibration direction of the second vibration motor 920 or 400 may be configured to be a direction intersecting a planar direction in which the flexible display 540, 160, or 250 extends.

In the electronic device 101 according to an embodiment, the at least one second sensor 551, 555, 559, 541, 545, or 549 may include at least one grip sensor 551, 555, or 559 provided in the at least two housings 510, 520, 530, 210, and 220. The instructions may be configured to cause the electronic device 101 to, as at least a portion of the operation of identifying the grip state with respect to at least one of the at least two housings 510, 520, 530, 210, and 220, identify the grip state with respect to at least one of the at least two housings 510, 520, 530, 210, and 220, based on the at least one measurement value acquired from the at last one grip sensor 551, 555, or 559.

In the electronic device 101 according to an embodiment, the at least one second sensor 551, 555, 559, 541, 545, or 549 may include a touch sensor 541, 545, or 549 configured to detect a touch onto the flexible display 540, 160, or 250. The instructions may cause the electronic device 101 to, as at least a portion of the operation of identifying the grip state with respect to at least one of the at least two housings 510, 520, 530, 210, and 220, identify the grip state with respect to at least one of the at least two housings 510, 520, 530, 210, and 220, based on the at least one measurement value acquired from the at last one touch sensor 541, 545, or 549.

In the electronic device 101 according to an embodiment, the instructions may cause the electronic device 101 to, as at least a portion of the operation of operating at least one of the first vibration motor 910 or 400 or the second vibration motor 920 or 400, operate at least one of the first vibration motor 910 or 400 or the second vibration motor 920 or 400 disposed in a housing having been identified to be gripped among the at least two housings 510, 520, 530, 210, and 220.

In the electronic device 101 according to an embodiment, the instructions may cause the electronic device 101 to, as at least a portion of the operation of identifying the folding state of the electronic device 101, identify an arrangement direction of the at least two housings 510, 520, 530, 210, and 220 based on the identified at least one measurement value, and identify the folding state of the electronic device 101 based on the identified arrangement direction.

In the electronic device 101 according to an embodiment, the instructions may cause the electronic device 101 to, as at least a portion of the operation of operating at least one of the first vibration motor 910 or 400 or the second vibration motor 920 or 400, select and operate one of the first vibration motor 910 or 400 or the second vibration motor 920 or 400 having a vibration direction having a relatively large angle with the floor or the ground on which the electronic device 101 is mounted, based on the identified arrangement direction.

In the electronic device 101 according to an embodiment, the instructions may cause the electronic device 101 to detect whether a designated first condition is satisfied in relation to provision of repeated notifications. The instructions may cause the electronic device 101 to, as at least a portion of the operation of operating at least one of the first vibration motor 910 or 400 or the second vibration motor 920 or 400, repeatedly operate the first vibration motor 910 or 400 and the second vibration motor 920 or 400 concurrently or alternately, based on satisfying of the designated first condition.

In the electronic device 101 according to an embodiment, the instructions may cause the electronic device 101 to detect whether a designated second condition is satisfied in relation to provision of a notification once or more. The instructions may cause the electronic device 101 to, as at least a portion of the operation of operating at least one of the first vibration motor 910 or 400 or the second vibration motor 920 or 400, operate the first vibration motor 910 or 400 and the second vibration motor 920 or 400 a designated number of times concurrently or alternately, based on satisfying of the designated second condition.

According to an embodiment, an operation method of an electronic device 101 including at least two housings 510, 520, 530, 210, and 220 rotatably coupled to each other, a flexible display 540, 160, or 250 disposed on the at least two housings 510, 520, 530, 210, and 220, a first vibration motor 910 or 400 disposed in a first housing 510 or 210 included in the at least two housings 510, 520, 530, 210, and 220, a second vibration motor 920 or 400 disposed in a second housing 520, 530, or 220 included in the at least two housings 510, 520, 530, 210, and 220 and configured to vibrate in a direction different from that of the first vibration motor 910 or 400, at least one first sensor 531, 535, or 539, at least one second sensor 551, 555, 559, 541, 545, or 549, memory 130 configured to store instructions, and at least one processor 120 may include an operation 2010 of acquiring at least one measurement value from the at least one first sensor 531, 535, or 539 and the at least one second sensor 551, 555, 559, 541, 545, or 549. According to an embodiment, the operation method of the electronic device may include an operation 2020 of identifying a folding state of the electronic device 101 according to rotation between the at least two housings 510, 520, 530, 210, and 220, based on the at least one measurement value. According to an embodiment, the operation method of the electronic device may include an operation 2030 of identifying a grip state for at least one of the at least two housings 510, 520, 530, 210, and 220, based on the at least one measurement value. According to an embodiment, the operation method of the electronic device may include an operation 2050 or 2070 of operating at least one of the first vibration motor 910 or 400 or the second vibration motor 920 or 400, based on the identified folding state and the identified grip state.

In the operation method of the electronic device 101, the operation 2030 of identifying the grip state with respect to at least one of the at least two housings 510, 520, 530, 210, and 220 may include identifying the grip state with respect to at least one of the at least two housings 510, 520, 530, 210, and 220, based on the at least one measurement value acquired from at last one grip sensor 551, 555, or 559 provided in the at least two housings 510, 520, 530, 210, and 220.

In the operation method of the electronic device 101, the operation 2030 of identifying the grip state with respect to at least one of the at least two housings 510, 520, 530, 210, and 220 may include identifying the grip state with respect to at least one of the at least two housings 510, 520, 530, 210, and 220, based on the at least one measurement value acquired from a touch sensor 541, 545, or 549 configured to detect a touch onto the flexible display 540, 160, or 250.

In the operation method of the electronic device 101, the operation 2050 or 2070 of operating at least one of the first vibration motor 910 or 400 or the second vibration motor 920 or 400 may include operating at least one of the first vibration motor 910 or 400 or the second vibration motor 920 or 400 disposed in a housing having been identified to be gripped among the at least two housings 510, 520, 530, 210, and 220.

An embodiment of the disclosure may provide a computer-readable storage medium 130 configured to store instructions, wherein the instructions, when executed by at least one processor 120 of an electronic device 101 including at least two housings 510, 520, 530, 210, and 220 rotatably coupled to each other, a flexible display 540, 160, or 250 disposed on the at least two housings 510, 520, 530, 210, and 220, a first vibration motor 910 or 400 disposed in a first housing 510 or 210 included in the at least two housings 510, 520, 530, 210, and 220, a second vibration motor 920 or 400 disposed in a second housing 520, 530, or 220 included in the at least two housings 510, 520, 530, 210, and 220 and configured to vibrate in a direction different from that of the first vibration motor 910 or 400, at least one first sensor 531, 535, or 539, and at least one second sensor 551, 555, 559, 541, 545, or 549, cause the electronic device 101 to acquire at least one measurement value from the at least one first sensor 531, 535, or 539 and the at least one second sensor 551, 555, 559, 541, 545, or 549.

The instructions may cause the electronic device 101 to identify a folding state of the electronic device 101 according to rotation between the at least two housings 510, 520, 530, 210, and 220, based on the at least one measurement value.

The instructions may cause the electronic device 101 to identify a grip state with respect to at least one of the at least two housings 510, 520, 530, 210, and 220, based on the at least one measurement value.

The instructions may cause the electronic device 101 to operate at least one of the first vibration motor 910 or 400 or the second vibration motor 920 or 400, based on the identified folding state and the identified grip state.

According to an embodiment, an electronic device 101 may include at least two housings 510, 520, 530, 210, and 220 rotatably coupled to each other, a flexible display 540, 160, or 250 disposed on the at least two housings 510, 520, 530, 210, and 220, a first vibration motor 910 or 400 disposed in a first housing 510 or 210 included in the at least two housings 510, 520, 530, 210, and 220, a second vibration motor 920 or 400 disposed in a second housing 520, 530, or 220 included in the at least two housings 510, 520, 530, 210, and 220 and configured to vibrate in a direction different from that of the first vibration motor 910 or 400, at least one sensor 531, 535, 539, 551, 555, 559, 541, 545, or 549, memory 130 configured to store instructions, and at least one processor 120. The instructions, when executed by the at least one processor 120, may cause the electronic device 101 to acquire at least one measurement value from the at least one sensor 531, 535, 539, 551, 555, 559, 541, 545, or 549. The instructions, when executed by the at least one processor 120, may cause the electronic device 101 to identify a folding state of the electronic device 101 according to rotation between the at least two housings 510, 520, 530, 210, and 220, based on the at least one measurement value. The instructions, when executed by the at least one processor 120, may cause the electronic device 101 to operate at least one of the first vibration motor 910 or 400 or the second vibration motor 920 or 400, based on the identified folding state of the electronic device 101.

In the electronic device 101 according to an embodiment, a vibration direction of the first vibration motor 910 or 400 may be a direction intersecting a vibration direction of the second vibration motor 920 or 400. The vibration direction of the first vibration motor 910 or 400 may be configured to be parallel with a direction in which the first housing 510 or 210 and the second housing 520 or 220 are coupled to extend. The vibration direction of the second vibration motor 920 or 400 may be configured to be a direction intersecting a planar direction in which the flexible display 540, 160, or 250 extends.

In the electronic device 101 according to an embodiment, the at least one sensor 531, 535, 539, 551, 555, 559, 541, 545, or 549 may include at least one inertial sensor 531, 535, or 539 provided in the at least two housings 510, 520, 530, 210, and 220. The instructions, when executed by the at least one processor 120, may cause the electronic device 101 to, as at least a portion of the operation of identifying the folding state of the electronic device 101, identify an arrangement direction of the at least two housings 510, 520, 530, 210, and 220 based on the at least one measurement value acquired from the at least one inertial sensor 531, 535, or 539.

In the electronic device 101 according to an embodiment, the instructions, when executed by the at least one processor 120, may cause the electronic device 101 to, as at least a portion of the operation of operating at least one of the first vibration motor 910 or 400 or the second vibration motor 920 or 400, select and operate one of the first vibration motor 910 or 400 or the second vibration motor 920 or 400 having a vibration direction having a relatively large angle with the floor or the ground on which the electronic device 101 is mounted, based on the identified arrangement direction of the at least two housings 510, 520, 530, 210, and 220.

In the electronic device 101 according to an embodiment, the instructions, when executed by the at least one processor 120, may cause the electronic device 101 to detect whether a designated first condition is satisfied in relation to provision of repeated notifications, and as at least a portion of the operation of operating at least one of the first vibration motor 910 or 400 or the second vibration motor 920 or 400, repeatedly operate the first vibration motor 910 or 400 and the second vibration motor 920 or 400 concurrently or alternately, based on satisfying of the designated first condition.

In the electronic device 101 according to an embodiment, the instructions, when executed by the at least one processor 120, may cause the electronic device 101 to detect whether a designated second condition is satisfied in relation to provision of a notification once or more, and as at least a portion of the operation of operating at least one of the first vibration motor 910 or 400 or the second vibration motor 920 or 400, concurrently or alternately operate the first vibration motor 910 or 400 and the second vibration motor 920 or 400 a designated number of times, based on satisfying of the designated second condition.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

at least two housings rotatably coupled to each other;

a flexible display disposed on the at least two housings;

a first vibration motor disposed in a first housing among the at least two housings;

a second vibration motor disposed in a second housing among the at least two housings and configured to vibrate in a different direction from the first vibration motor;

at least one first sensor;

at least one second sensor;

memory, comprising one or more storage media, storing instructions; and at least one processor communicatively coupled to the flexible display, the first vibration motor, the second vibration motor, the at least one first sensor, the at least one second sensor, and the memory, wherein the instructions, when executed by the at least one processor individually or collectively, cause the electronic device to:

acquire at least one measurement value from the at least one first sensor and the at least one second sensor, identify a folding state of the electronic device according to rotation between the at least two housings, based on the at least one measurement value measured from the at least one first sensor, identify a grip state with respect to at least one of the at least two housings, based on the at least one measurement value measured from the at least one second sensor, and operate the first vibration motor or the second vibration motor, based on the identified folding state and the identified grip state.

2. The electronic device of claim 1, wherein a vibration direction of the first vibration motor corresponds to a direction intersecting a vibration direction of the second vibration motor.

3. The electronic device of claim 2, wherein the vibration direction of the first vibration motor is configured to be parallel with a direction in which the first housing and the second housing are coupled and extend, and wherein the vibration direction of the second vibration motor is configured to be a direction intersecting a planar direction in which the flexible display extends.

4. The electronic device of claim 1, wherein the at least one second sensor comprises at least one grip sensor provided in the at least two housings, and wherein the instructions, when executed by the at least one processor individually or collectively, further cause the electronic device to, as at least a portion of identifying the grip state with respect to at least one of the at least two housings, identify the grip state with respect to at least one of the at least two housings, based on the at least one measurement value acquired from the at least one grip sensor.

5. The electronic device of claim 1, wherein the at least one second sensor comprises a touch sensor configured to detect a touch onto the flexible display, and wherein the instructions, when executed by the at least one processor individually or collectively, further cause the electronic device to, as at least a portion of identifying the grip state with respect to at least one of the at least two housings, identify the grip state with respect to at least one of the at least two housings, based on the at least one measurement value acquired from the touch sensor.

6. The electronic device of claim 1, wherein the instructions, when executed by the at least one processor individually or collectively, further cause the electronic device to, as at least a portion of operating at least one of the first vibration motor or the second vibration motor, operate at least one of the first vibration motor or the second vibration motor, disposed in a housing identified as being gripped among the at least two housings.

7. The electronic device of claim 1, wherein the instructions, when executed by the at least one processor individually or collectively, further cause the electronic device to:

as at least a portion of identifying the folding state of the electronic device:

identify an arrangement direction of the at least two housings, based on the at least one measurement value, and identify the folding state of the electronic device, based on the identified arrangement direction.

8. The electronic device of claim 7, wherein the instructions, when executed by the at least one processor individually or collectively, further cause the electronic device to, as at least a portion of operating at least one of the first vibration motor or the second vibration motor, select and operate one of the first vibration motor or the second vibration motor, which has a vibration direction having a relatively large angle with respect to a floor or a ground on which the electronic device is mounted, based on the identified arrangement direction.

9. The electronic device of claim 1, wherein the instructions, when executed by the at least one processor individually or collectively, further cause the electronic device to:

detect whether a first condition designated in connection with providing repeated notifications is satisfied, and as at least a portion of operating at least one of the first vibration motor or the second vibration motor, repeatedly operate the first vibration motor and the second vibration motor concurrently or alternately, based on the designated first condition being satisfied.

10. The electronic device of claim 1, wherein the instructions, when executed by the at least one processor individually or collectively, further cause the electronic device to:

detect whether a second condition designated in connection with providing a notification once or more is satisfied, and as at least a portion of operating at least one of the first vibration motor or the second vibration motor, concurrently or alternately operate the first vibration motor and the second vibration motor a designated number of times, based on the designated second condition being satisfied.

11. A method performed by an electronic device, the electronic device comprising at least two housings rotatably coupled to each other, a flexible display disposed on the at least two housings, a first vibration motor disposed in a first housing among the at least two housings, a second vibration motor disposed in a second housing among the at least two housings and configured to vibrate in a different direction from the first vibration motor, at least one first sensor, and at least one second sensor, the method comprising:

acquiring, by the electronic device, at least one measurement value from the at least one first sensor and the at least one second sensor;

identifying, by the electronic device, a folding state of the electronic device according to rotation between the at least two housings, based on the at least one measurement value;

identifying, by the electronic device, a grip state with respect to at least one of the at least two housings, based on the at least one measurement value; and operating, by the electronic device, at least one of the first vibration motor or the second vibration motor, based on the identified folding state and the identified grip state.

12. The method of claim 11, wherein the at least one second sensor comprises at least one grip sensor provided in the at least two housings, and wherein the method further comprises, as at least a portion of identifying the grip state with respect to at least one of the at least two housings, identifying the grip state with respect to at least one of the at least two housings, based on the at least one measurement value acquired from the at least one grip sensor.

13. The method of claim 11, wherein the at least one second sensor comprises a touch sensor configured to detect a touch onto the flexible display, and wherein the method further comprises, as at least a portion of identifying the grip state with respect to at least one of the at least two housings, identifying the grip state with respect to at least one of the at least two housings, based on the at least one measurement value acquired from the touch sensor.

14. The method of claim 11, further comprising, as at least a portion of operating at least one of the first vibration motor or the second vibration motor, operating at least one of the first vibration motor or the second vibration motor, disposed in a housing identified as being gripped among the at least two housings.

15. One or more non-transitory computer-readable storage media storing one or more computer programs including computer-executable instructions that, when executed by at least one processor of an electronic device individually or collectively, the electronic device comprising at least two housings rotatably coupled to each other, a flexible display disposed on the at least two housings, a first vibration motor disposed in a first housing among the at least two housings, a second vibration motor disposed in a second housing among the at least two housings and configured to vibrate in a different direction from the first vibration motor, at least one first sensor, and at least one second sensor, cause the electronic device to perform operations, the operations comprising:

acquiring at least one measurement value from the at least one first sensor and the at least one second sensor;

identifying a folding state of the electronic device according to rotation between the at least two housings, based on the at least one measurement value;

identifying a grip state with respect to at least one of the at least two housings, based on the at least one measurement value; and operating at least one of the first vibration motor or the second vibration motor, based on the identified folding state and the identified grip state.

* * * * *